(12) United States Patent
Auradkar et al.

(10) Patent No.: US 10,275,603 B2
(45) Date of Patent: Apr. 30, 2019

(54) CONTAINERLESS DATA FOR TRUSTWORTHY COMPUTING AND DATA SERVICES

(71) Applicant: Microsoft Technology Licensing, LLC, Redmond, WA (US)

(72) Inventors: Rahul V. Auradkar, Sammamish, WA (US); Roy Peter D'Souza, Sunnyvale, CA (US); Darrell J. Cannon, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/588,399

(22) Filed: Dec. 31, 2014

(65) Prior Publication Data

US 2015/0113290 A1    Apr. 23, 2015

Related U.S. Application Data

(63) Continuation of application No. 13/895,856, filed on May 16, 2013, now abandoned, which is a
(Continued)

(51) Int. Cl.
*H04L 29/06* (2006.01)
*G06F 21/60* (2013.01)
*G06F 21/62* (2013.01)

(52) U.S. Cl.
CPC ........ *G06F 21/602* (2013.01); *G06F 21/6209* (2013.01)

(58) Field of Classification Search
CPC .............................. G06F 21/62; G06F 21/6209
(Continued)

(56) References Cited

U.S. PATENT DOCUMENTS 5,592,468 A    1/1997  Sato
6,161,181 A   12/2000  Hayne et al.
(Continued)

FOREIGN PATENT DOCUMENTS

CN       1596521 A     3/2005
CN     102687133 A     9/2012
(Continued)

OTHER PUBLICATIONS

Stern, Claudius, et al. "Reliable evidence of data integrity from an untrusted storage service." Networking and Services, 2008. ICNS 2008. Fourth International Conference on. IEEE, 2008.*
(Continued)

*Primary Examiner* — Samson B Lemma
(74) *Attorney, Agent, or Firm* — Alleman Hall Creasman & Tuttle LLP

(57) ABSTRACT

A digital escrow pattern and trustworthy platform is provided for data services including mathematical transformation techniques, such as searchable encryption techniques, for obscuring data stored at remote site or in a cloud service, distributing trust across multiple entities to avoid a single point of data compromise. Using the techniques of a trustworthy platform, data (and associated metadata) is decoupled from the containers that hold the data (e.g., file systems, databases, etc.) enabling the data to act as its own custodian through imposition of a shroud of mathematical complexity that is pierced with presented capabilities, such as keys granted by a cryptographic key generator of a trust platform. Sharing of, or access to, the data or a subset of that data is facilitated in a manner that preserves and extends trust without the need for particular containers for enforcement.

19 Claims, 54 Drawing Sheets

Data as Custodian
- Policy Set by Owner
- Access is Enforced/Guaranteed by Data
- Containers are Redundant Trust Guarantees
- Enforced by Data, Controlled by Owner

Related U.S. Application Data continuation of application No. 12/817,487, filed on Jun. 17, 2010, now Pat. No. 8,468,345.

(60) Provisional application No. 61/261,598, filed on Nov. 16, 2009.

(58) Field of Classification Search
USPC .......................................................... 713/167
See application file for complete search history.

(56) References Cited

U.S. PATENT DOCUMENTS

| | | | |
|---|---|---|---|
| 6,792,466 | B1 | 9/2004 | Saulpaugh et al. |
| 6,868,160 | B1 | 3/2005 | Raji |
| 6,931,532 | B1 | 8/2005 | Davis et al. |
| 6,941,459 | B1 | 9/2005 | Hind et al. |
| 7,020,645 | B2 | 3/2006 | Bisbee et al. |
| 7,103,773 | B2 | 9/2006 | Erickson et al. |
| 7,178,033 | B1 | 2/2007 | Garcia |
| 7,246,246 | B2 | 7/2007 | Kupka |
| 7,296,163 | B2 | 11/2007 | Cybenko |
| 7,693,877 | B1 | 4/2010 | Zasman |
| 7,783,899 | B2 | 8/2010 | Golle et al. |
| 7,921,284 | B1 | 4/2011 | Kinghorn et al. |
| 7,921,288 | B1* | 4/2011 | Hildebrand ............. H04L 63/04 713/165 |
| 8,229,112 | B2 | 7/2012 | Fuhr et al. |
| 8,413,256 | B2 | 4/2013 | Gonzalez et al. |
| 8,458,451 | B2 | 6/2013 | Shasha et al. |
| 9,395,929 | B2 | 7/2016 | Bojinov et al. |
| 2002/0069361 | A1* | 6/2002 | Watanabe ............. H04L 9/3231 713/185 |
| 2002/0099947 | A1 | 7/2002 | Evans |
| 2004/0010591 | A1 | 1/2004 | Sinn et al. |
| 2004/0078577 | A1* | 4/2004 | Feng ...................... G06F 21/10 713/182 |
| 2004/0143792 | A1 | 7/2004 | Demopoulos et al. |
| 2004/0172618 | A1 | 9/2004 | Marvin |
| 2004/0181667 | A1 | 9/2004 | Venters et al. |
| 2004/0181679 | A1 | 9/2004 | Dettinger et al. |
| 2005/0033724 | A1 | 2/2005 | Antognini et al. |
| 2005/0039031 | A1* | 2/2005 | Mont .................. H04L 63/0435 713/189 |
| 2005/0039034 | A1 | 2/2005 | Doyle et al. |
| 2005/0060568 | A1 | 3/2005 | Beresnevichiene et al. |
| 2005/0074125 | A1* | 4/2005 | Chavanne ............... G06F 21/10 380/278 |
| 2005/0273616 | A1 | 12/2005 | Nishio |
| 2006/0129545 | A1 | 6/2006 | Golle et al. |
| 2007/0008927 | A1 | 1/2007 | Herz et al. |
| 2007/0055629 | A1 | 3/2007 | Walker et al. |
| 2007/0101145 | A1 | 5/2007 | Sachdeva et al. |
| 2007/0136200 | A1 | 6/2007 | Frank |
| 2007/0162518 | A1* | 7/2007 | Tian ....................... H04L 9/0838 |
| 2007/0174284 | A1 | 7/2007 | Hashimoto et al. |
| 2007/0250821 | A1 | 10/2007 | Mola marti et al. |
| 2007/0282870 | A1 | 12/2007 | Jonker et al. |
| 2007/0283150 | A1 | 12/2007 | Cozianu |
| 2008/0066185 | A1 | 3/2008 | Lester et al. |
| 2008/0071814 | A1 | 3/2008 | Mittal et al. |
| 2008/0080718 | A1 | 4/2008 | Meijer et al. |
| 2008/0083036 | A1 | 4/2008 | Ozzie |
| 2008/0091763 | A1 | 4/2008 | Devonshire et al. |
| 2008/0098236 | A1 | 4/2008 | Pandey et al. |
| 2008/0133935 | A1 | 6/2008 | Elovici et al. |
| 2008/0148071 | A1 | 6/2008 | Dettinger et al. |
| 2009/0010436 | A1 | 1/2009 | Fuhr et al. |
| 2009/0063872 | A1 | 3/2009 | Tanaka et al. |
| 2009/0100268 | A1 | 4/2009 | Garcia et al. |
| 2009/0119757 | A1 | 5/2009 | Acuna et al. |
| 2009/0204964 | A1 | 8/2009 | Foley et al. |
| 2009/0268903 | A1 | 10/2009 | Bojinov et al. |
| 2009/0276784 | A1 | 11/2009 | Grieve et al. |
| 2009/0300351 | A1* | 12/2009 | Lei .................. G06F 17/30864 713/165 |
| 2010/0011282 | A1 | 1/2010 | Dollard et al. |
| 2010/0058072 | A1 | 3/2010 | Teow et al. |
| 2010/0058485 | A1 | 3/2010 | Gonzalez |
| 2010/0138399 | A1 | 6/2010 | Jho et al. |
| 2010/0185847 | A1 | 7/2010 | Shasha et al. |
| 2010/0325155 | A1 | 12/2010 | Skinner et al. |
| 2011/0099203 | A1 | 4/2011 | Fastring |
| 2011/0145580 | A1 | 6/2011 | Auradkar et al. |
| 2011/0145593 | A1 | 6/2011 | Auradkar et al. |

FOREIGN PATENT DOCUMENTS

| | | |
|---|---|---|
| EP | 1936908 A1 | 6/2008 |
| JP | 2004234344 A | 8/2004 |
| JP | 2009181188 A | 8/2009 |
| JP | 2009187394 A | 8/2009 |
| JP | 2009529714 A | 8/2009 |
| TW | I280488 B | 5/2007 |
| TW | 200821866 A | 5/2008 |
| WO | 2001098936 A2 | 12/2001 |
| WO | 2007104705 A1 | 9/2007 |
| WO | 2008092166 A2 | 7/2008 |
| WO | 2008105937 A2 | 9/2008 |

OTHER PUBLICATIONS

"Office Action Received for Japanese Patent Application No. 2012-539921", dated Dec. 5, 2014, 5 Pages.

"Office Action Received for Japan Patent Application No. 2012-539921", dated Jun. 9, 2014, 16 Pages.

Katayama, et al., "An ID-based Conjunctive Keyword Searchable Encryption", In Collection of Papers Presented at Computer Security Symposium and Published by Information Processing Society, Oct. 19, 2009, pp. 577-582.

"Non-Final Office Action Issued in U.S. Appl. No. 13/895,856", dated Mar. 12, 2015, 8 Pages.

"Notice of Allowance Issued in Japanese Patent Application No. 2012-539921", dated Apr. 27, 2015, 4 Pages.

Armbrust et al., "Above the Clouds: A Berkeley View of Cloud Computing", https://www.xintegrate.de/x-in-ms.nsf/id/DE_Von_Regenmachern_und_Wolkenbruechen_-_Impact_2009_Nachlese/$file/abovetheclouds.pdf, Feb. 10, 2009.

Jinesh Varia, "Cloud Architectures", https://www.systems.ethz.ch/education/courses/fs09/HotDMS/pdf/amazoncloud.pdf, retrieved Oct. 12, 2009.

Jaeger et al., "Cloud Computing and Information Policy: Computing in a Policy Cloud?", http://www.umiacs.umd.edu/~jimmylin/publications/Jaeger_etal_2008.pdf, 2008.

Daniel J. Abadi, "Data Management in the Cloud: Limitations and Opportunities", http://sites.computer.org/debull/A09mar/abadi.pdf, Bulletin of the IEEE Computer Society Technical Committee on Data Engineering, 2009.

Siani Pearson, "Taking Account of Privacy when Designing Cloud Computing Services", http://www.chinacloud.cn/upload/2009-04/temp_09043009508106.pdf, Mar. 6, 2009.

Schwarz et al., "An Encrypted, Content Searchable Scalable Distributed Data Structure", 2006, Proceedings of the 22nd International Conference on Data Engineering Workshops (ICDEW'06), pp. 10.

"International Search Report", dated Jun. 27, 2011, Application No. PCT/US2010/054697, Filed Date: Oct. 29, 2010, pp. 9.

"First Office Action", dated Apr. 25, 2013, Application No. 201080051694.1, Filed Date: Oct. 29, 2010, pp. 12.

Non-Final Office Action cited in U.S. Appl. No. 12/817,487 dated Aug. 31, 2012, 26 pgs.

Reply Non-Final Office Action cited in U.S. Appl. No. 12/817,487 dated Nov. 30, 2012, 12 pgs.

Notice of Allowance cited in U.S. Appl. No. 12/817,487 dated Feb. 4, 2013, 10 pgs.

Preliminary Report cited in PCT Application No. PCT/US2010/054697 dated May 22, 2012, 5 pgs.

First Chinese Office Action cited in Chinese Application No. 201080051694.1 dated Apr. 25, 2013, 12 pgs.

(56) References Cited

OTHER PUBLICATIONS

Reply First Chinese Office Action cited in Chinese Application No. 201080051694.1 dated May 21, 2013, 3 pgs.
Second Chinese Office Action cited in Chinese Application No. 201080051694.1 dated Aug. 12, 2013, 6 pgs.
Reply second Chinese Office Action cited in Chinese Application No. 201080051694.1 dated Sep. 2, 2013, 3 pgs.
Chinese Notice of Allowance cited in Chinese Application No. 201080051694.1 dated Jan. 16, 2014, 4 pgs.
Japanese Notice of Allowance cited in Japanese Application No. 2012-539921 dated May 19, 2012, 2 pgs.
"Non-Final Office Action Issued in U.S. Appl. No. 13/895,856", dated Sep. 21, 2017, 42 Pages.
"Extended Search Report Issued in European Patent Application No. 10830498.1", dated Mar. 22, 2018, 10 Pages.
"Partial Search Report Issued in European Patent Application No. 10830498.1", dated Dec. 19, 2017, 12 Pages.
"Search Report Issued in European Patent Application No. 10841445.9", dated Feb. 22, 2017, 13 Pages.
"Search Report Issued in European Patent Application No. 10841445.9", dated Nov. 11, 2016, 7 Pages.
"Final Office Action Issued in U.S. Appl. No. 12/832,433", dated May 23, 2013, 30 Pages.
"Final Office Action Issued in U.S. Appl. No. 12/832,433", dated Dec. 3, 2015, 25 Pages.
"Final Office Action Issued in U.S. Appl. No. 12/832,433", dated Dec. 6, 2017, 20 Pages.
"Non-Final Office Action Issued in U.S. Appl. No. 12/832,433", dated Feb. 24, 2017, 23 Pages.
"Non-Final Office Action Issued in U.S. Appl. No. 12/832,433", dated May 20, 2015, 23 Pages.
"Non-Final Office Action Issued in U.S. Appl. No. 12/832,433", dated Oct. 5, 2012, 22 Pages.
"Final Office Action Issued in U.S Appl. No. 13/895,856", dated Jun. 4, 2018, 39 Pages.
"Non-Final Office Action Issued in U.S. Appl. No. 13/895,856", dated Jun. 5, 2014, 18 Pages.
"First Office Action Issued in Chinese Patent Application No. 201080056778.4", dated Apr. 16, 2013, 10 Pages.
"Office Action Issued in Japanese Patent Application No. 2012-544540", dated Aug. 31, 2015, 11 Pages.
"Office Action Issued in Japanese Patent Application No. 2012-544540", dated Oct. 28, 2014, 28 Pages.
"Office Action and Search Report Issued in Taiwan Patent Application No. 099139228", dated Jan. 26, 2015, 4 Pages.
Abdalla, et al., "Searchable Encryption Revisited: Consistency Properties, Relation to Anonymous IBE, and Extensions", In Journal of Cryptology, vol. 21, Issue 3, Nov. 3, 2008, 17 Pages.
Boneh, et al., "PORTIA: Privacy, Obligations, and Rights in Technologies of Information Assessment", In Proceedings of the IEEE Computer Society Technical Committee on Data Engineering, vol. 27, Issue 1, Mar. 2004, 9 Pages.
Brinkman, et al., "Efficient Tree Search in Encrypted Data", In Proceedings of the Information Systems Security, vol. 13, Issue 3, May/Jun. 2004, 14-21 Pages.
Chow, et al., "Controlling Data in the Cloud: Outsourcing Computation without Outsourcing Control", In Proceedings of the ACM Workshop on Cloud Computing Security, Nov. 13, 2009, pp. 85-90.

Golle, et al., "Secure Conjunctive Keyword Search over Encrypted Data", In Proceedings of the Lecture Notes in Computer Science, vol. 3089, 2004, 15 Pages.
Hartig, et al., "The Nizza Secure-System Architecture", In Proceedings of the IEEE International Conference on Collaborative Computing: Networking, Applications and Work sharing, Dec. 19, 2005, 10 Pages.
Jammalamadaka, et al., "Querying Encrypted XML Documents", In Proceedings of the 10th IEEE International Database Engineering and Applications Symposium, 2006, 8 Pages.
Kamara, et al., "Cryptographic Cloud Storage", In Proceedings of the 14th International Conference on Financial Cryptograpy and Data Security, Nov. 13, 2009, 12 Pages.
Kamara, et al., "Cryptographic Cloud Storage: A Proposal", In Proceedings of the ACM Cloud Computing Security Workshop, Nov. 13, 2009, 4 Pages.
Miklau, et al., "Controlling Access to Published Data Using Cryptography", In Proceedings of the 29th International Conference on Very large Data Bases, vol. 29, 2003, 12 Pages.
Mont, et al., "Towards Accountable Management of Identity and Privacy: Sticky Policies and Enforceable Tracing Services", In Proceedings of the International Workshop on Database and Expert Systems Applications, Mar. 19, 2003, 17 Pages.
"International Search Report and Written Opinion Issued in PCT Application No. PCT/US2010/057258", dated Jul. 12, 2011, 8 Pages.
"International Search Report and Written Opinion Issued in PCT Application No. PCT/US2010/057259", dated Aug. 29, 2011, 10 Pages.
Schunter, Matthias, "D05.4 Design of the Cross-Domain Security Services", Retrieved From: http://www.opentc.net/deliverables2008_2009/OpenTC_D05.4_DesignOfSecServices_FINAL.pdf, May 26, 2008, 80 Pages.
Talbot, David, "Search an Encrypted Cloud", In Proceedings of the MIT Technology Review, Nov. 12, 2009, 4 Pages.
Unay, et al., "A Survey on Querying Encrypted XML Documents for Databases as a Service", In Proceedings of the ACM SIGMOD Record, vol. 37, No. 1, Mar. 2008, pp. 12-20.
Vaughan-Nichols, Steven J., "XML Raises Concerns as It Gains Prominence", In Proceedings of the Computer, vol. 36, Issue 5, May 2003, 3 Pages.
Wang, et al., "An Effective Wrapper Architecture to Heterogeneous Data Source", In Proceedings of the 17th International Conference on IEEE Advanced Information Networking and Applications, 2003, 4 Pages.
Wang, et al., "Efficient Secure Query Evaluation Over Encrypted XML Databases", In Proceedings of the 32nd International Conference on very large Database, Sep. 2006, pp. 127-138.
Waters, et al., "Building an Encrypted and Searchable Audit Log", In Proceedings of the 11th Annual Network and Distributed System Security Symposium, vol. 4, Feb. 2004, 14 Pages.
Weerasinghe, et al., "XML Security based Access Control for Healthcare Information in Mobile Environment", In Proceedings of the IEEE Pervasive Health Conference and Workshops, Nov. 29, 2006, 5 Pages.
"Non Final Office Action Issued in U.S. Appl. No. 12/832,433", dated Nov. 30, 2018, 15 Pages.

* cited by examiner

CONTAINERLESS DATA FOR TRUSTWORTHY COMPUTING AND DATA SERVICES

CROSS-REFERENCE TO RELATED APPLICATIONS

This application is a continuation of Ser. No. 13/895,856, filed on May 16, 2013, entitled CONTAINERLESS DATA FOR TRUSTWORTHY COMPUTING AND DATA SERVICES, which is a continuation of Ser. No. 12/817,487, filed on Jun. 17, 2010, entitled "CONTAINERLESS DATA FOR TRUSTWORTHY COMPUTING AND DATA SERVICES" which claims the benefit of provisional application Ser. No. 61/261,598, filed on Nov. 16, 2009, entitled "CONTAINERLESS DATA FOR TRUSTED COMPUTING AND DATA SERVICES", the entirety of which is incorporated herein by reference.

TECHNICAL FIELD

The subject disclosure relates to providing trustworthy computing and data services for device(s), such as network or cloud services, and more specifically, to data or network services enabling secure, selectively accessible and private storage of data without regard to which container(s) are used for actual storage of bits.

BACKGROUND

By way of background concerning some conventional systems, computing devices have traditionally executed applications and data services locally to the device. In such case, as data is accessed, processed, stored, cached, etc., the data may travel on the device over local buses, interfaces and other data pathways, however, the user of the device has not had to worry about interference or exposure of user data unless the device itself is lost, stolen or otherwise compromised.

The evolution of network storage farms capable of storing terabytes of data (with potential for petabytes, exabytes, etc. of data in the future) has created an opportunity to mimic applications that have historically operated against local data, but instead operating against data stored in the cloud, with separation of the primary device and the external storage. Cloud storage of application or system (or any) data allow many devices to store their data without the need for separate dedicated storage for each device.

Yet, with the evolution of on-line and cloud services, applications and services are increasingly being moved to third party network providers who perform some or all of a given service on behalf of device(s). In such case, the user of the device(s) may become concerned with who can access, or potentially worse, interfere with, the user's data while it is uploaded to a service, while it is stored or processed by the service or while it is retrieved from the service. In short, when the data of a user's device leaves the domain of physical possession and enters a network environment physically away from the user, a concern over sloppy or malicious handling of or interference with the data by third parties arises. Accordingly, it is desirable to increase the trust, security and privacy for cloud services and the handling of data in connection with cloud services. Similar concerns can arise over the storage of data even within an enterprise, for instance, where the data leaves one region of control (e.g., first division) where the data is generated and enters another (e.g., second division) for storage.

However, as alluded to above, the problem remains that no cloud service or network storage provider has been able to effectively alleviate the problems of and demands for security, privacy and integrity of the data while stored in the cloud. In short, users require elevated trust that their data remains secure and private when physical control over the storage vehicle is surrendered, and this hurdle has significantly prevented enterprises and consumers from adopting the backup of important data via third party network services and solutions.

The above-described deficiencies of today's devices and data services provided to devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of one or more of the exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Network or cloud data services, including mathematical transformation techniques, such as searchable encryption, deassembling/reassembling or distribution techniques, for data, are provided in a way that distributes trust across multiple entities to avoid a single point of data compromise, and decouples data protection requirements from the container(s) in which the data may be stored, processed, accessed or retrieved. In one embodiment, a mathematical transformation predicate generator (e.g., a key generator), a mathematical transformation provider (e.g., a cryptographic technology provider) and a cloud services provider are each provided as separate entities, enabling a trustworthy platform for publishers of data to publish data confidentially (obscured, e.g., encrypted) to a cloud services provider, and enabling selective access to the obscured, e.g., encrypted, data to authorized subscribers based on subscriber capabilities.

Using the techniques of a trustworthy platform, data (and associated metadata) is decoupled from the containers that hold the data (e.g., file systems, databases, etc.) enabling the data to act as its own custodian through imposition of a shroud of mathematical complexity that is pierced with presented capabilities, such as keys granted by a cryptographic key generator of a trust platform as on non-limiting example. Sharing of, or access to, the data or a subset of that data is facilitated in a manner that preserves and extends trust without the need for particular containers for enforcement. The mathematical complexities, such as searchable encryption techniques, applied to the data protect the data without regard to the container or hardware in which the particular bits are recorded, i.e., the data is protected containerlessly or without regard to the container and is thus not subject to attack on the basis of a compromise of container security. If the particular "safe" is cracked, the contents are still protected.

In one non-limiting embodiment, extensible markup language (XML) data is the data acting as its own custodian. With XML data, tags can be augmented or added with description information that selectively enables or prevents access to the underlying data, enabling the XML data, or XML data fragments, as encapsulated by tag information in the trust envelope applied to the XML data or fragments, to act as its own custodian. XML data or tags can, for instance, represent searchable metadata that encodes any one or more of authentication information, authorization information, schemas information, history information, trace information, consistency information, etc. It is noted that any of the embodiments based on XML can also apply to a range of alternate formats, such as but not limited to, JaysScript Object Notation (JSON), S-Expressions, electronic data interchange (EDI), etc., and thus XML is merely used for illustrative purposes in such embodiments.

A "trusted envelope" for any kind of payload, such as but not limited to database fields, XML fragments or full records, thus provides curtained access through a variety of decorations or seals placed on the envelope that allow for a gamut of trust ranging with guarantees such as, but not limited to, confidentiality, privacy, anonymity, tamper detection, integrity, etc. For instance, XML tags can be applied or augmented to create trust envelopes for structured XML data, a common format used for data exchange in networked environments, enabling containerless XML data in a trustworthy cloud services environment.

Some other examples of cryptographic techniques or 'decorations' that can be applied to facilitate establishing a high level of trust over security and privacy of data include, but are not limited to, size-preserving encryption, searchable-encryption, or Proof(s) of Application, blind fingerprints, Proof(s) of Retrievability, etc.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
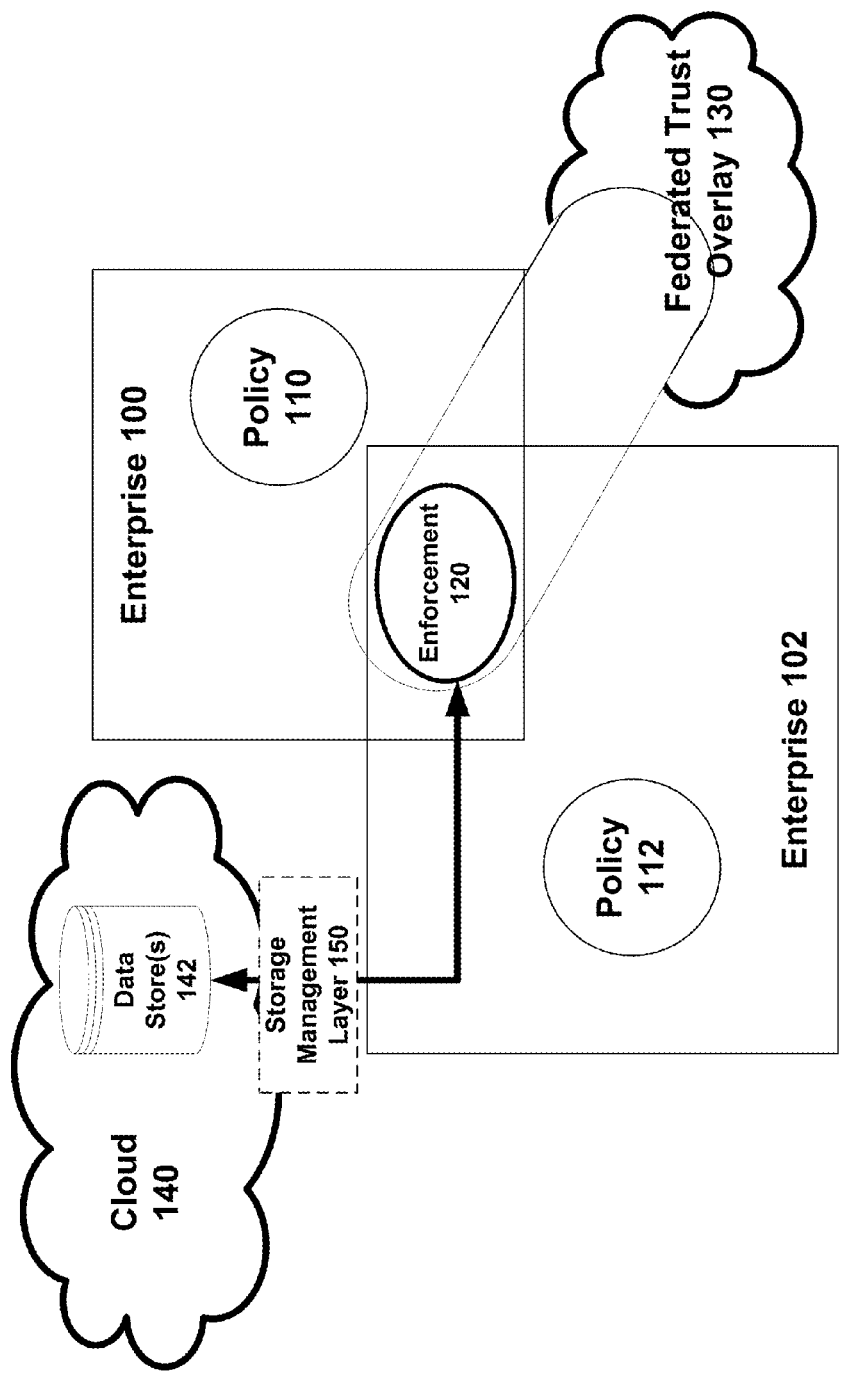
FIG. 1 is a block diagram of a general environment for providing one or more embodiments of secure, private and selectively accessible network data services.

As discussed in the background, data sent to a network service can create discomfort with respect to privacy, potential for tampering, etc., e.g., when data is transmitted from a user's device to a network application, service or data store, a user desires sufficient assurance that no malevolent third party can cause harm. By definition, the user has lost control over the data. It is thus desirable to increase trust so that publishers and/or owners of data are willing to surrender physical control over their data, trusting that their data will remain private, and inviolate, while in the network, except when accessed by the publishers and/or owners or to anyone to whom privileges have been granted as verified based on requester identity.

In this regard, the problem remains that no cloud service or network storage provider has been able to effectively alleviate the problems of and demands for security, privacy and integrity of the data while stored in the cloud. In short, users are interested in elevated trust that their data remains secure and private when physical control over the storage vehicle is surrendered, and this hurdle has significantly prevented enterprises and consumers from adopting the backup of important data via third party network services and solutions.

As used herein, the term network storage provide includes, but is not limited to, content delivery (or distribution) networks (CDNs), hybrid scenarios, e.g., spanning enterprise storage, cloud storage and/or CDNs, and/or broader federation scenarios, e.g., spanning multiple enterprises, multiple clouds, or multiple CDNs, or any combinations of the foregoing.

Traditionally, to keep data safe, data has been locked away or kept underground, e.g., on a physical medium. In this regard, the data owner knows that the custodian of the safe has to be a completely trustworthy party, or have no access to the contents of the safe. In this regard, while the premise of cloud services has been that customers do not necessarily need to know exactly where their data is physically located, it is not true that the question can be entirely ignored. This is because it has been a challenge to take full responsibility for who (what devices) can access the data, who sees the data, who maintains the data and how it is stored. Accordingly, in reality, customers have cared a lot about who the third parties are who are controlling the various computing and storage devices in the cloud chain due to inherent mistrust and a variety of other concerns.

Eliminating human or external entity controlled active custodianships, which have inherent biases that may not be congruent with data owners or publishers, various embodiments herein provide a system where data is transformed mathematically, e.g., selectively encrypted or searchably encrypted, such that the data acts as a custodian for itself regardless of the third party machine(s), mechanism(s), device(s) or container(s) holding the data. In this respect, various implementations of a federated trust overlay enable containerless data along with guarantees of security, confidentiality, tamper-proof, etc., which are made transparent to the user.

Accordingly, in various embodiments, a trustworthy cloud platform is used as a transformative framework for mathematically obscuring data by publishers such that subscribers can selectively access pieces for which the subscribers are authorized. In this regard, the platform achieves data that acts as its own custodian by simultaneously protecting data but also allowing access to authorized subscribers, while preserving integrity and security.

Data as its own custodian can be implemented with a federated trust overlay with pluggable services, as described in various embodiments and detailed sections below. Achieving more than mathematical obfuscation, e.g., encryption, various embodiments provide assurances to users and escrow agents data that data, wherever and however it is stored, preserves confidentiality and integrity requirements as properly defined by publishers or owners of data. In this regard, focus is shifted or augmented from securing boundaries, pipes and containers for data to securing data and associated metadata through the provision of a cryptographically secure trust envelope that allows access to the data/metadata, or a specific subset, when presented with proper capabilities (e.g., keys).

In one embodiment, a method for hosting data is provided comprising receiving, by computing device(s) in a first region of control from computing device(s) in a second region of control, obscured data formed from mathematical transformation of data for a defined data set of the computing device(s) in the second region of control. The method further comprises receiving, by the computing device(s) in the first region of control, obscured metadata formed from an analysis of the data and at least one other mathematical transformation of an output of the analysis. Next, it is determined which of one or more container of a set of containers having at least two disparate container types in which to store the obscured data and/or the obscured metadata.

In a non-limiting implementation of a system, one or more mathematical transformation components are distributed at least partially by a mathematical transformation algorithm provider, which is implemented independently from a generator that generates mathematical transformation predicate information (e.g., key information) for at least one of publishing data and metadata or subscribing to data and metadata. The one or more mathematical transformation components perform at least one searchable data obfuscation algorithm (e.g., searchable encryption) or searchable data revelation (e.g., searchable decryption) algorithm based on the mathematical transformation predicate information generated by the generator. A network service provider, implemented independently from the generator and the one or more mathematical transformation components, implements a network service with respect to the data or the metadata obscured by the one or more mathematical transformation components, and the network service provider includes a data container management component that manages where the data or the metadata obscured by the at least one mathematical transformation component is stored based on at least one of a data latency requirement, data reliability requirement, distance from data consumption requirement, or data scale requirement of the network service.

Data as a custodian provides access entitlements to data when needed, or when anticipated to be needed, at a fine, or specified, grain level rather than requiring entitlement to all of a given set of data. Operations staff at a cloud storage provider are also unable to view, modify, tamper or delete data without detection, unless such viewing, modifying, tampering or deletion is expressly authorized according to capabilities granted to the operations staff, such as maintenance of server logs, or some other limited operations over the metadata to plan storage capacity or the like. In addition, container-less data enables proactive replication that facilitates tamper prevention, which is otherwise a requirement conventional systems have failed to adequately address.

In one embodiment, a federated trust overlay is achieved with one or more of the following components: Cloud Data Service (CDS) or Cloud Storage Provider, Crypto Technology Provider (CTP) and Center for Key Generation (CKG). The CDS can be provided by any storage provider, i.e., containerless data requires no particular container. The CTP can also be provided by any party provided it operates in a separate region of control from the CDS, whether based on an open specification for implementing a CTP or a proprietary implementation of the CTP. Separating the key generation function and subjecting the mathematical principles, such as encryption principles, to public inspection inspires confidence that the methodology of the CTP remains free from bias, and can be implemented by an enterprise or single user, or sourced to a third party with CTP expertise. Moreover, proprietary versions, open versions for companies, open or closed versions for governments or sovereigns, reference open source versions, or other categories, can all be created for pre-packaged use or implementation by a given entity.

The CKG entity generates key information according to the technology specified by the CTP and is also provided as a separate component of the federated trust overlay (though the CKG can also be combined with other components depending on level of trust wanted for a given implementation of a FTO). In various embodiments, though the CKG can be a centralized entity, the word "Center" as used herein is a logical reference, not an indication of a centralized entity and thus, the CKG can be distributed and federated as well. A CKG can serve a single entity or multiple partners, e.g., a multi-partner collaboration between pharmaceutical companies for sharing and accessing the information according to key exchanges from an agreed upon CKG. With a FTO, therefore, trust and confidentiality are maintained by separating powers, preventing insight into stored information, logs or access patterns without express authority, and tamper detection and integrity, e.g., verification are also enabled. For instance, a service provider cannot modify or delete data without detection. Auditability with non-repudiation enables customers the comfort to let go of data and ensure no one has interfered with it either accidentally or on purpose. Logs have the same guarantees as data and metadata as well.

Results 'validation' is another feature that can be included in a FTO implementation, and which is described in more detail below. Validation ensures the cloud cannot withhold information that is being asked of it, e.g., cannot deliver two documents when asked for three documents. The notion of separation can be taken even further by considering separated implementations of the CKG and any service that performs validation of the data, as well as by separating the data from application service providers that receive, alter, retrieve, alter, augment or delete the data or metadata based on capabilities granted to the application service providers. This also has the added benefit of maintaining application capabilities according to then-current characteristics of access, updated security model, updated roles, time of day, etc.

Combining all or even some of the above described features, such as described in various embodiments below in more detail, enhances the possibility of disarming trust concerns over cloud storage of data. At the enterprise level, enterprises can own policy and control enforcement in a granular manner, even if data and application are hosted in the cloud. The system can mesh with enterprise security infrastructures, such as identity metasystems (e.g., Claims, identity lifecycle management, active directory, etc.). An enterprise can be exposed to as much or as little of implementation of the FTO as desirable.

The provision of data services as described herein involves various combinations and permutations of storage and cryptography techniques that enable cost-effective as well as secure and private solutions. For instance, various optional embodiments described in more detail below implement a data protection technique that includes size-preserving encryption, searchable-encryption, and/or a cryptographic technique termed Proof(s) of Application (referring to the general technique). Such embodiments enable new business scenarios for outsourced cloud data protection, disaster recovery, or analytics. As discussed in the background, no conventional systems have implemented cloud or network data services in a way that has not failed the privacy or security need of customers.

In this regard, to eliminate the trust barriers that surround conventional provision of network services, a trustworthy cloud computing and data services ecosystem or framework is provided that achieves the above-identified objectives as well as other advantages highlighted in the various embodiments described below. The term "cloud" services generally refers to the notion that a service is performed not locally from a user's device, but rather delivered from one or more remote devices accessible via one or more networks. Since the user's device does not need to understand the details of what happens at the one or more remote devices, the service appears to be delivered from a "cloud" from the perspective of the user's device.

In one embodiment, a system comprises a key generator that generates key information for publishing or subscribing to data. A cryptographic technology provider, implemented independently from the key generator, implements searchable encryption/decryption algorithm(s) based on the key information generated by the key generator. In addition, a network service provider, implemented independently from the key generator and the cryptographic technology provider, provides a network service with respect to data encrypted by the cryptographic technology provider.

In one embodiment, a data store is provided that exposes selectively accessible, e.g., searchable, encrypted data wherein at least one publisher publishes data representing resource(s) to the data store. Providing a division of the potential for abuse of trust, a first independent entity performs generating of cryptographic key information. A second independent entity in turn performs encrypting of the published data prior to storing based on the cryptographic key information generated by the first independent entity. A set of network or cloud services then selective access to the encrypted data for a given request to the network service based on late bound selected privileges granted by the publisher(s) or owner(s) of the resource(s).

In other embodiments, a data store stores selectively accessible encrypted data wherein subscriber(s) subscribes to a specified subset of the encrypted data. A first independent entity generates cryptographic key information based on identity information associated with the subscriber(s), and a second independent entity performs decrypting of the specified subset based on the cryptographic key information generated by the first independent entity. Network service(s) respond to requests by the subscriber(s) and provide selective access to the encrypted data based on late bound selected privileges granted by the publishers or owners of the specified subset.

In this respect, the terms publisher and subscriber generally refer to anyone that publishes or subscribes to data of a trustworthy cloud service, respectively. However, in practice, depending on the industry, field, or application of the trustworthy cloud services ecosystem and digital escrow pattern, publishers and subscribers will take on more specific roles. For instance, in the context of data of an entire system, typically only a small group of subscribers will have privileges to access the data. For an example in the context of data, an auditor of an encrypted data store may have certain capabilities based on the role of auditor of the data, to make sure certain requirements are met, such as frequency of backup, without being granted access to the content itself.

In one non-limiting embodiment, a method for hosting data comprises receiving, by first computing device(s) in a first region of control from second computing device(s) in a second region of control, encrypted data formed from encryption of data for a defined data set of the second computing device(s) according to searchable encryption algorithm(s) based on cryptographic key information, receiving, by the first computing device(s), encrypted metadata formed from an analysis of the data and encryption of an output of the analysis based on the cryptographic key information; and automatically determining container(s) from containers of at least two disparate container types in which to store the encrypted data or the encrypted metadata. Trapdoor data is received that enables visible access to the encrypted data or metadata as defined by at least one cryptographic trapdoor of the trapdoor data.

The container(s) in which the encrypted data or metadata is stored can be automatically switched or changed if a pre-defined condition of the plurality of containers is met. For instance, if certain data or metadata becomes high priority to a customer, then it may be moved from slower, longer term storage to nimble container with low access latency. Or, data or metadata might be moved, copied or deleted for other efficiency reasons, e.g., based on storage size associated with the encrypted data or metadata, based on a speed of access requirement specified for the encrypted data or metadata, based on a reliability of recovery requirement specified for the encrypted data or metadata, based on proximity to one or more devices that have access to the encrypted data or metadata, etc.

In another non-limiting embodiment, a system comprises a cryptographic component distributed at least partially by a cryptographic technology provider, implemented independently from a key generator that generates key information for publishing data and metadata or subscribing to data and metadata, the cryptographic component searchably encrypting data and metadata or searchably decrypting data and metadata based on the key information generated by the key generator.

The system can also include a network service provider, implemented independently from the key generator and the cryptographic component, providing a network service with respect to data or metadata encrypted by the cryptographic component, the network service provider including a data container management component that manages where the data or metadata encrypted by the cryptographic component is stored based on a data latency requirement, data reliability requirement, distance from data consumption requirement, or data scale requirement of the network service. The key information can include capability information that defines access privileges with respect to the data or metadata encrypted by the cryptographic component. The capability information can be late bound so that up to date access privileges are granted to a given subscriber.

In another non-limiting embodiment, a computing system comprises data store(s) storing selectively accessible encrypted data or metadata wherein a publisher publishes data or metadata representing resource(s) to the data store(s), a first independent entity generates cryptographic key information, and a second independent entity encrypts the published data or metadata prior to storing in the data store(s) based on the cryptographic key information generated by the first independent entity. The system provides a network service that enabling selective access to the encrypted data or metadata for a given request to the network service based on late bound selected privileges granted by the publisher or owner of the resource(s). In this regard, the system is agnostic to container type and thus the data store(s) include containers of disparate container type and the data store(s) automatically distribute storage of the selectively accessible encrypted data or metadata across various container(s) based on an analysis of the current storage resources represented by the containers.

In one embodiment, the "data" is XML data including XML payload data (e.g., text string "Michael Jackson") and XML tag information (e.g., </Name>) applying to the payload. The XML tag information can be augmented with additional metadata relevant to the searchable encryption and selective decryption of the XML data. In this regard, applying XML tags in this manner creates "trust envelopes" for structured XML data to leverage the federation of the cryptographic key generating entity (CKG) and cryptographic technology providing entity (CTP) to provide a range of trust guarantees like confidentiality, privacy, anonymity, tamper detection and integrity. As mentioned, any of the embodiments herein regarding XML data or metadata can also apply to other formats such as, but not limited to, JSON, S-Expressions, EDI, etc., and thus XML is merely used for illustrative purposes in the presently described embodiments.

XML data can also encode manifest information for locating other related fragments if it is a dispersed sliver of a larger document. Because of the way dispersal across different containers occurs, i.e., one or more middle layers handle the storage details of the particular container, implementations are technology independent (any CKG/CTP can be used). Moreover, other than a trust wrapper, implementations are open ended in that any number of wrappers, in addition to searchable encryption and validation or verification, can be applied and as new wrapper technologies become applicable. Tags can also be added on top of the pre-existing data and metadata (or by augmenting the metadata) that help modulate consistency, trails, etc.

If the data/information is in XML format, then any of these techniques or wrappers can be applied to structured XML data so the data can be selectively queried to obtain access to XML fragments. Present day, XML has a standard format that is <tag "value"> or <tag "value"|XML end-tag>. Advantageously, with structured XML documents, there are way(s) to represent the structure hierarchically so that there is an outer wrapper that will point to a CKG/CTP 'frame' that is unique to a digital escrow pattern. So, when there is need or want for access an embedded fragment, existing trust with that <CKG> and <CTP> wrapper can be leveraged or a new set of trust can be established with a new CKG/CTP frame.

This can provided through standard public key infrastructures PKI, though specific schemes selected are to be considered non-limiting on the techniques described herein. In this regard, whatever particular set of encryption technologies are selected, embodiments described herein enable users to search, extract and decrypt segments, subsets or parts of encrypted data or metadata. In addition, public proof(s) of data possession mechanism (a trustworthy third party running on a device's behalf) can be executed to verify that a specific XML segment being accessed has not been tampered with since it was originally authored.

In essence, a "trusted envelope" for XML fragments or full records (e.g., "payload") is provided through variety of "decorations" that allow for the trust to run a gamut of trust guarantees like, but not limited to, confidentiality, privacy, anonymity and integrity.

As an example of the type of information that can be represented in XML tag information as part of the trusted envelope, fragments of XML documents can be designated for various levels of sensitivity. For example, a document may exist that has Public, Secret and Top Secret paragraphs. A person performing a search and requesting access with a Secret clearance would only get access to Public and Secret paragraphs. A paragraph's classification can also be used to determine encryption mechanism, key and access policy. For example, a policy can be implemented that Top Secret content cannot be accessed from a wireless or remote device.

Similarly, such a classification can be used to create a policy on how data could be stored, where it could be stored, how long it could be stored, etc. For example, a policy could be created that requires that (sensitive) medical data must be backed up once a day using AES 256 encryption to a secure server in a trusted datacenter.

In an embodiment, a method for hosting extensible markup language (XML) data includes a first computing device in a first region of control receiving encrypted XML data including encrypted XML payload data and encrypted XML tags from a second computing device in a second region of control. The encrypted XML data is formed from encryption of a defined XML data set of the second computing device according to searchable encryption algorithm(s) based on cryptographic key information. A request for data includes capabilit(ies) based on the cryptographic key information defining privilege(s) for accessing at least some of the encrypted XML payload data or the encrypted XML tags and enabling selective access to the encrypted XML data as defined by the capabilit(ies).

The capabilit(ies) can include trapdoor data including cryptographic trapdoor(s) for selectively accessing the encrypted XML payload data or encrypted XML tags. The encrypted data include auxiliary encrypted metadata formed from an analysis of the encrypted XML payload data or encrypted XML tags. For instance, the confidentiality level labels of public, secret or top secret can be applied to each payload element of the XML document on a fragment by fragment basis, and included in the auxiliary encrypted metadata to achieve highly granular policy around access to parts of the XML document.

In another embodiment, a method for subscribing to searchably encrypted XML data includes receiving cryptographic key information from a key generation component that generates the cryptographic key information based on identity information associated with the subscriber device, requesting a subset of searchably encrypted XML data and corresponding XML tag data by the subscriber device including transmitting the cryptographic key information to a storage provider for the searchably encrypted XML data and corresponding tag data; and decrypting the subset of encrypted XML data and corresponding XML tag data as allowed by capabilities defined in the cryptographic key information.

For each XML fragment of the encrypted XML data, XML tag data representing a level of confidentiality of the corresponding encrypted XML data can be decrypted and it can be determined whether the capabilities allow access to data having the level of confidentiality. This includes a public level of confidentiality with open access privileges, or a secret level of confidentiality that is less open as defined consistent with policy.

The methods can include validating that a correct subset of encrypted XML data and corresponding XML tag data is received by the subscriber device consistent with the requesting. An example of validating includes performing proof(s) of data possession to prove that the correct subset is received by the subscriber device. The methods can also include verifying content of the subset of encrypted XML data and corresponding XML tag data was not deleted or modified prior to receiving the subset of encrypted XML data and corresponding XML tag data. An example of verifying includes performing proof(s) of retrievability to prove lack of interference with the content. Among other optional features, anonymizing credentials associated with the subscriber device can be applied when requesting access to encrypted XML data or key information.

In another embodiment, a method for publishing extensible markup language (XML) data can includes encrypting XML data according to searchable encryption algorithm(s) to form encrypted XML data including encrypted XML tag information based on cryptographic key information received from a separate key generator that generates the cryptographic key information and transmitting the encrypted XML data to a network service provider for storage of the encrypted data wherein the encrypted data is selectively accessible according to late binding of selected privileges granted to a requesting device based on identity information of the requesting device. The encrypting can include receiving cryptographic key information from the key generator executing in a separate region of control that generates the cryptographic key information based on an identity of publishing device performing the encrypting of the XML data.

In another embodiment, a method for subscribing to extensible markup language (XML) data includes, in response to a request for a subset of searchably encrypted XML data including encrypted XML tags by a subscriber device, receiving cryptographic key information from a key generation component that generates the cryptographic key information based on identity information associated with the subscriber device and decrypting the subset of encrypted XML data as a function of privileges granted the subscriber device defined in the cryptographic key information.

The various techniques can include requesting proof with respect to data items of the subset of encrypted XML data by the subscriber device that the correct data items are received, which can include receiving information proving to the subscriber device that the data items in the subset of encrypted XML data requested by the subscriber device are correct. The various techniques can include requesting proof that the subset of encrypted XML data has not been interfered with prior to the request by the subscriber device, which can include receiving information proving to the subscriber device that the subset of encrypted XML data has not been interfered with prior to the request by the subscriber device.

In yet another embodiment, a system includes data store(s) storing selectively accessible encrypted XML payload data and corresponding encrypted XML tag data corresponding to the encrypted XML payload data, wherein a subscriber requests a subscription to a subset of the encrypted XML payload data or the encrypted XML tag data, a first independent entity generates cryptographic key information based on identity information associated with the subscriber, and a second independent entity performs decrypting of the subset based on the cryptographic key information generated by the first independent entity. The system further includes a network service, for handling a request by the subscriber, which provides selective access to the subset of the encrypted XML payload data or the encrypted XML tag data. The system can be configured to validate that the subset of the encrypted XML payload data or the encrypted XML tag data is a correct subset consistent with the subscription and/or to verify that the subset of the encrypted XML payload data or the encrypted XML tag data has not been altered or deleted without authorization prior to the selective access to the subset of the encrypted XML payload data or the encrypted XML tag data.

In another embodiment, a system includes a cryptographic component distributed at least partially by a cryptographic technology provider, implemented independently from a key generator that generates key information for of publishing XML data and corresponding tag data or subscribing to XML data and corresponding tag data, the cryptographic component including processor configured to perform searchable encryption/decryption algorithm(s) based on the key information generated by the key generator and a network service provider, implemented independently from the key generator and the cryptographic component, including processor configured to implement a network service with respect to XML data or the corresponding tag data encrypted by the cryptographic component. The key information includes "late bound" capability information whereby up to date access privileges are granted to a given subscriber to XML data or the corresponding tag data.

Further details of these and other various exemplary, non-limiting embodiments and scenarios are provided below.

Containerless Data for Trustworthy Computing and Data Services

As alluded to in the background, the maintenance of sensitive enterprise data at a remote site owned by a service organization can put that data at risk ranging from privacy violations to data loss. As described for various embodiments herein, network or cloud data services, including searchable encryption techniques for data, are provided in a way that distributes trust across multiple entities to avoid a single point of data compromise, in a way that decouples data protection requirements from the container(s) in which the data may be stored, processed, accessed or retrieved. In one embodiment, a key generator, a cryptographic technology provider and a cloud services provider are each provided as separate entities, enabling a trustworthy platform for publishers of data to publish data confidentially (encrypted) to a cloud services provider, and enabling selective access to the encrypted data to authorized subscribers based on subscriber capabilities.

Using the techniques of a trustworthy platform, data (and associated metadata) is decoupled from the containers that hold the data (e.g., file systems, databases, etc.) enabling the data to act as its own custodian through imposition of a shroud of mathematical complexity that is pierced with presented capabilities, such as keys granted by a cryptographic key generator of a trust platform as described in various embodiments. Sharing of, or access to, the data or a subset of that data is facilitated in a manner that preserves and extends trust without the need for particular containers for enforcement. The mathematical complexities, such as searchable encryption techniques, applied to the data protect the data without regard to the container or hardware in which the particular bits are recorded, i.e., the data is protected containerlesly or without regard to the container and is thus not subject to attack on the basis of a compromise of container security. If the particular "safe" is cracked, the contents are still protected.

FIG. 1 is a block diagram of a general environment for providing one or more embodiments of secure, private and selectively accessible network data services as described herein. For illustrative purposes, multiple enterprises 100, 102 are illustrated, though the techniques are applicable to a single enterprise or many collaborative enterprises too. In various embodiments, using a federated trust overlay 130 as described in more detail below, enforcement 120 of policy 110 of enterprise 100 and policy 112 of enterprise 102 can be shared based on the FTO infrastructure 130 for collaborative efforts. Enforcement 120 can also be applied separately by each enterprise 100, 102. In this regard, since policy and enforcement are entirely within the province of the enterprises 100, 102 as based on trust overlay 130, the location of the actual data in cloud 140 and what particular containers 142 are used become irrelevant from the customer standpoint, except with respect to what the customer actually cares about: latency, reliability, quality of service guarantees, backup, time to retrieval, size guarantees, etc.

Accordingly, in recognition of the freeing of data from the containers that hold data by the trust overlay 130, in various embodiments, a data storage management layer 150 automatically takes care of what the customer cares about based on an analysis of real-time availability of storage resources and their respective characteristics in order to optimize data storage in containers that suit the customers need and wants. Storage management layer 150 is dashed indicating that its location is not critical either. The storage management layer 150 normally has no cryptographic privileges to access, view or change the data stored in one or more data store(s) 142, however, it may be desirable to expose some of the metadata, such as file size or file type, in order to facilitate an understanding of how the customer will want to use the data in the future so that the storage management layer 150 can make intelligent storage choices. For instance, the storage management layer 150 can maintain video in a media store that meets the requirements for streaming media if it is given enough of a view over the data to understand that the data is video.

Figure 2:
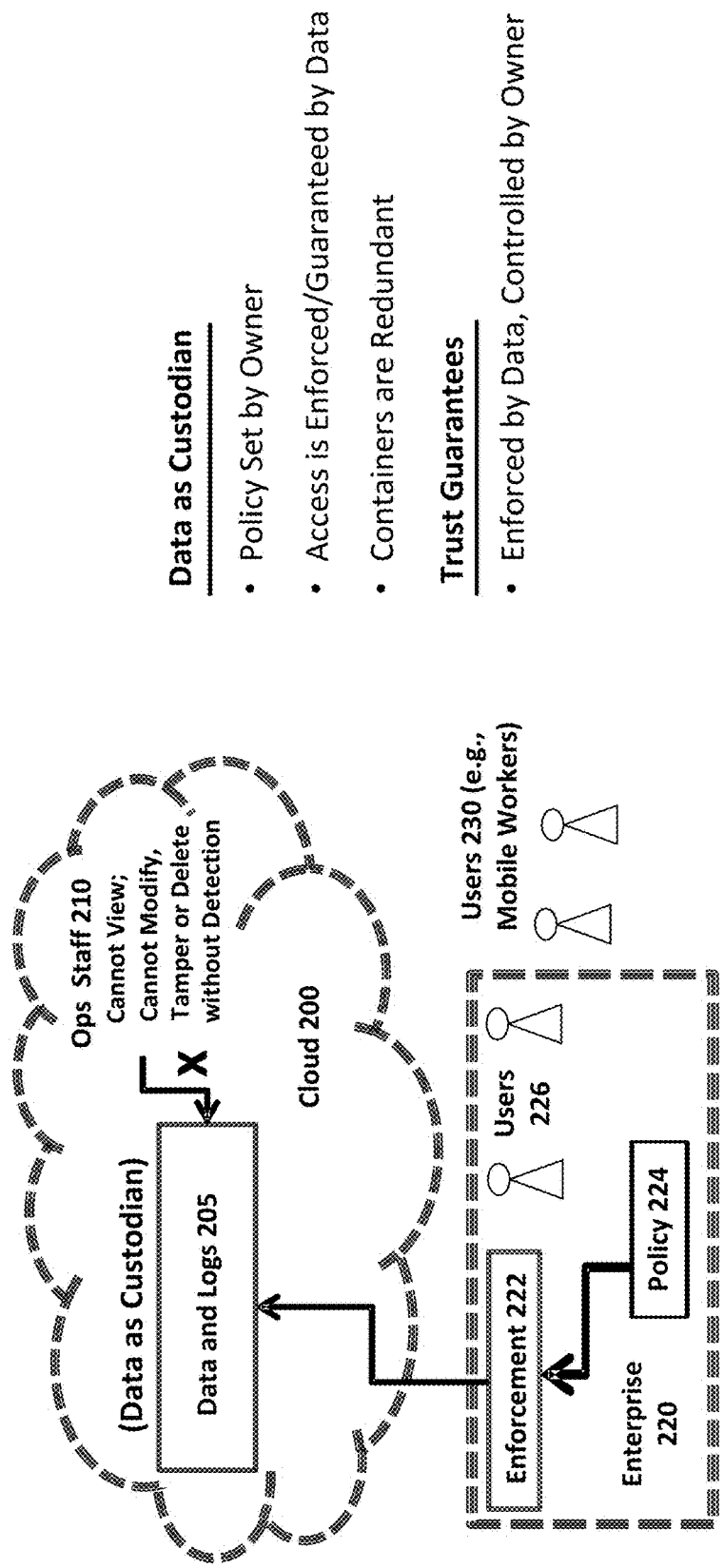
FIG. 2 is a block diagram illustrating one or more aspects of "data as its own custodian"

FIG. 2 is a block diagram illustrating a general "data as its own custodian" concept. With policy and enforcement within the control of users or an enterprise, data and corresponding logs are encrypted and accessible only with specific capabilities granted to a user as described in more detail below. For instance, normally, someone with no capabilities such as operations staff of the cloud storage provider cannot view, modify, tamper with or delete without detection since they do not have data privileges. With data as its own custodian, policy is set by the owner/publisher of the data, access is enforced/guaranteed by the data itself wherever it is stored, making container choices superfluous. Trust guarantees are enforced by the data, but controlled by the owner/publisher by describing what subscribers/customers can do with respect to the data.

As shown, in a non-limiting embodiment, an enterprise 220 "owns" its policy 224 and enforcement 222 of the policy 224 with respect to users 226 and their use of system resources of the enterprise 220 as well as with respect to external users 230 (e.g., mobile workers). With data as its own custodian, the actual data and/or logs 205 can be separated from policy 224 and enforcement 222 by storing the data in cloud 200, however, the operations staff 210 of the cloud 200 are unable to view, modify, tamper or delete the data and/or logs 205 without detection.

Figure 3:
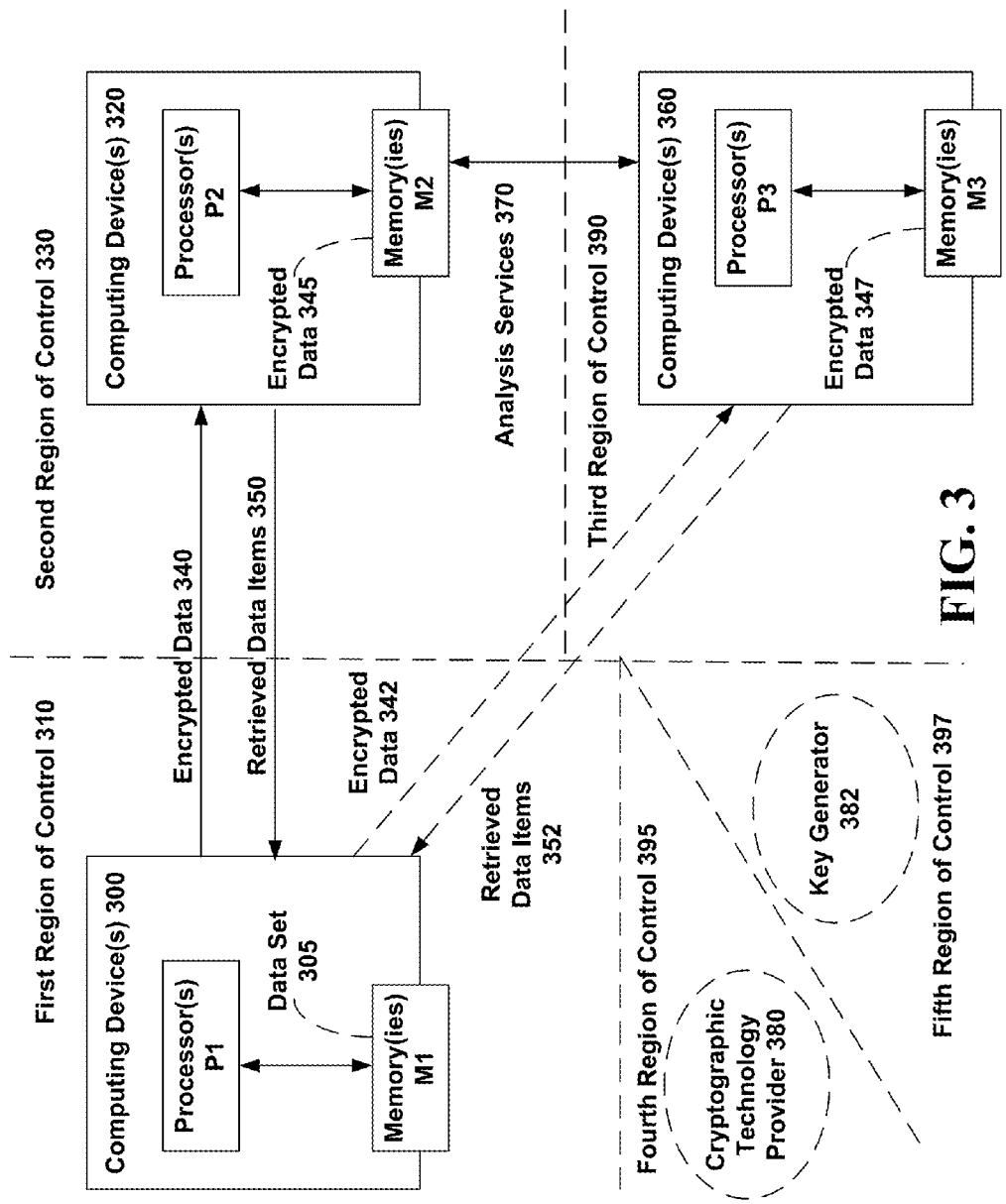
FIG. 3 is a block diagram of a general environment for providing one or more embodiments of secure, private and selectively accessible network data services.

FIG. 3 is a block diagram of a general environment for providing one or more embodiments of secure, private and selectively accessible network data services as described herein. In general, illustrating a non-limiting example of distributing trust using a federated trust overlay, computing device(s) 300 (e.g., customers) are in a first region of control 310, computing device(s) 320 (e.g., the cloud service providers) are in a second region of control 330, computing device(s) 360 are in a third region of control 390, cryptographic technology provider 380 is provided within a fourth region of control 395 and key generator 382 can be provided in a fifth region of control 397. Each of the computing device(s) 300, 320, 360 may include processor(s) P3, P2, P3, respectively and storage M3, M2, M3, respectively. In this regard, as described in accordance with various non-limiting embodiments, techniques for enabling encrypted data 340 in the cloud are provided so that items 350, or parts of items, can be selectively retrieved from the cloud based on access privileges. In this regard, a set of analytical services 370 can be provided as a layer on top of encrypted data 345, 347 to be stored, which automatically determines where to optimally store the encrypted data 340 or encrypted data 342 that is maintained in the cloud based on the local data set 305 from device(s) 300. In this regard, services 370 ensure that when the data is retrieved by computing devices 300 based on the CTP 380/CKG 382 federated trust overlay, the retrieved data 352 or retrieved data 350 are retrieved from optimal containers for the given request, or if sub-optimal, the containers are automatically switched. For instance, if a current container from computing devices 360 is operating poorly for a customer's needs or if the customer's needs change, the analytic storage services 370 can move or copy the data in real-time to another storage container and seamlessly switchover services to more suitable containers, e.g., for meeting quality of service requirements.

Figure 4:
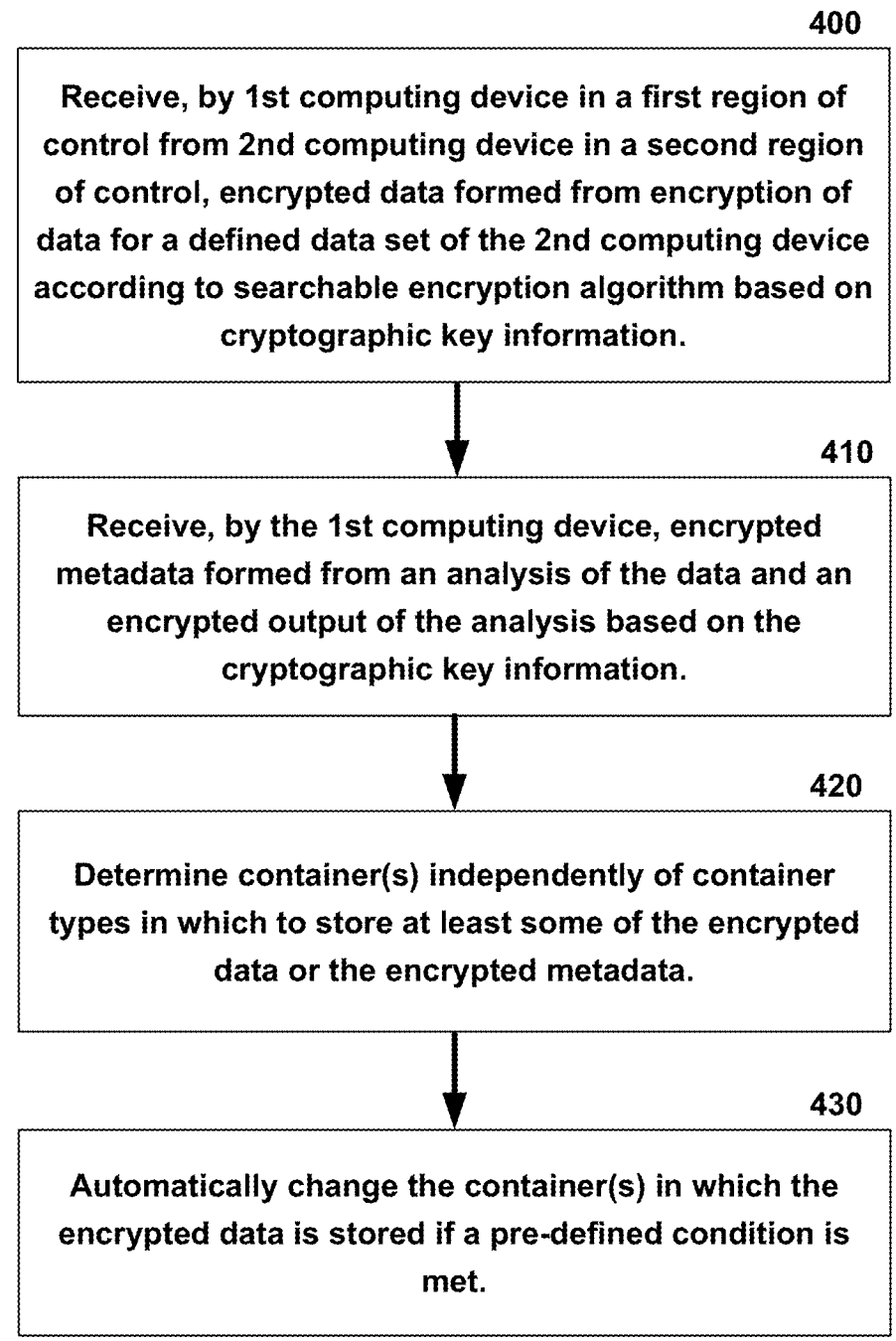
FIG. 4 is a flow diagram of a process for managing containers where data acts as its own custodian.

FIG. 4 is a flow diagram of a process for managing containers where data acts as its own custodian as described herein. At 400, encrypted data is received by 1st computing device in a first region of control from 2nd computing device in a second region of control. The encrypted data is formed from encryption of data for a defined data set of a 2nd computing device according to searchable encryption algorithm based on cryptographic key information. At 410, encrypted metadata is also received which is formed from an analysis of the data and an encrypted output of the analysis based on the cryptographic key information. At 420, which container(s) to store at least some of the encrypted data or the encrypted metadata is determined. At 430, the container(s) in which the encrypted data is stored can be automatically changed if a pre-defined condition is met.

Figure 5:
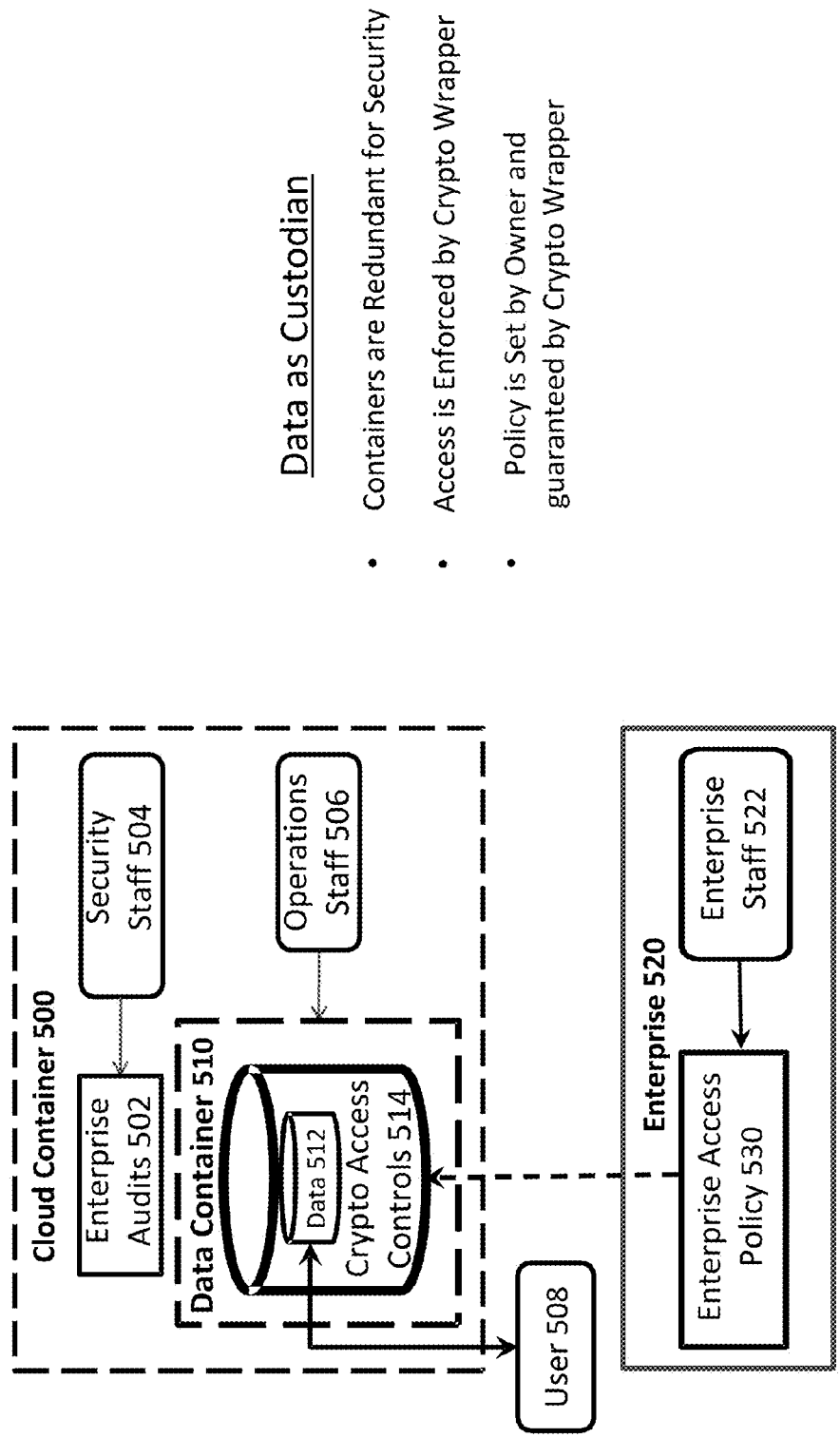
FIG. 5 is another block diagram illustrating one or more aspects of data acting as its own custodian.

FIG. 5 is another block diagram illustrating one or more aspects of data acting as its own custodian. In this regard, containers are redundant for security, access is enforced by a cryptographic wrapper and policy is set by the owner/publisher and guaranteed by the cryptographic wrapper. The wrapper can include a variety of cryptographic techniques depending on the specific security needs of the situation, as described in various embodiments below. For instance, as illustrated policy is set at the enterprise level, and then users seek access to data, which is wrapped by crypto access controls that either allow or deny entry. Other users such as enterprise auditors, security staff, operations staff, etc. may or may not have access privileges defined by the wrapper depending on the policy set at the enterprise.

As shown in the example of FIG. 5, an enterprise 520 has enterprise staff 522 that can are subject to enterprise access policy 530, and some of whom enterprise staff 522 can set enterprise access policy 530. Enterprise access policy 530 can affect how data 512 stored in a data container 510 of a cloud container 500 can be accessed, manipulated, retrieved, searched, etc. Accordingly, when users 508 of data 512 attempt to access such data 512, various crypto access controls 514 guided by, but separated from, enterprise access policy 530 protect the data 512 from unwarranted access by users 508. Different enterprise access policy 530 can be reflected by the crypto access controls 514 of data container 510 to apply to different accessing entities or tasks, such as enterprise audits 502 performed by security staff 504, or cloud operations staff 506, to ensure that visibility is restricted to those to whom access should be enabled. Data containers 510 can be located anywhere and made redundant for security, and access is enforced by the crypto access controls 514. In this regard, enterprise access policy 530 can be set by the enterprise owners and guaranteed by the crypto wrapper as implemented by the crypto access controls 514.

Figure 6:
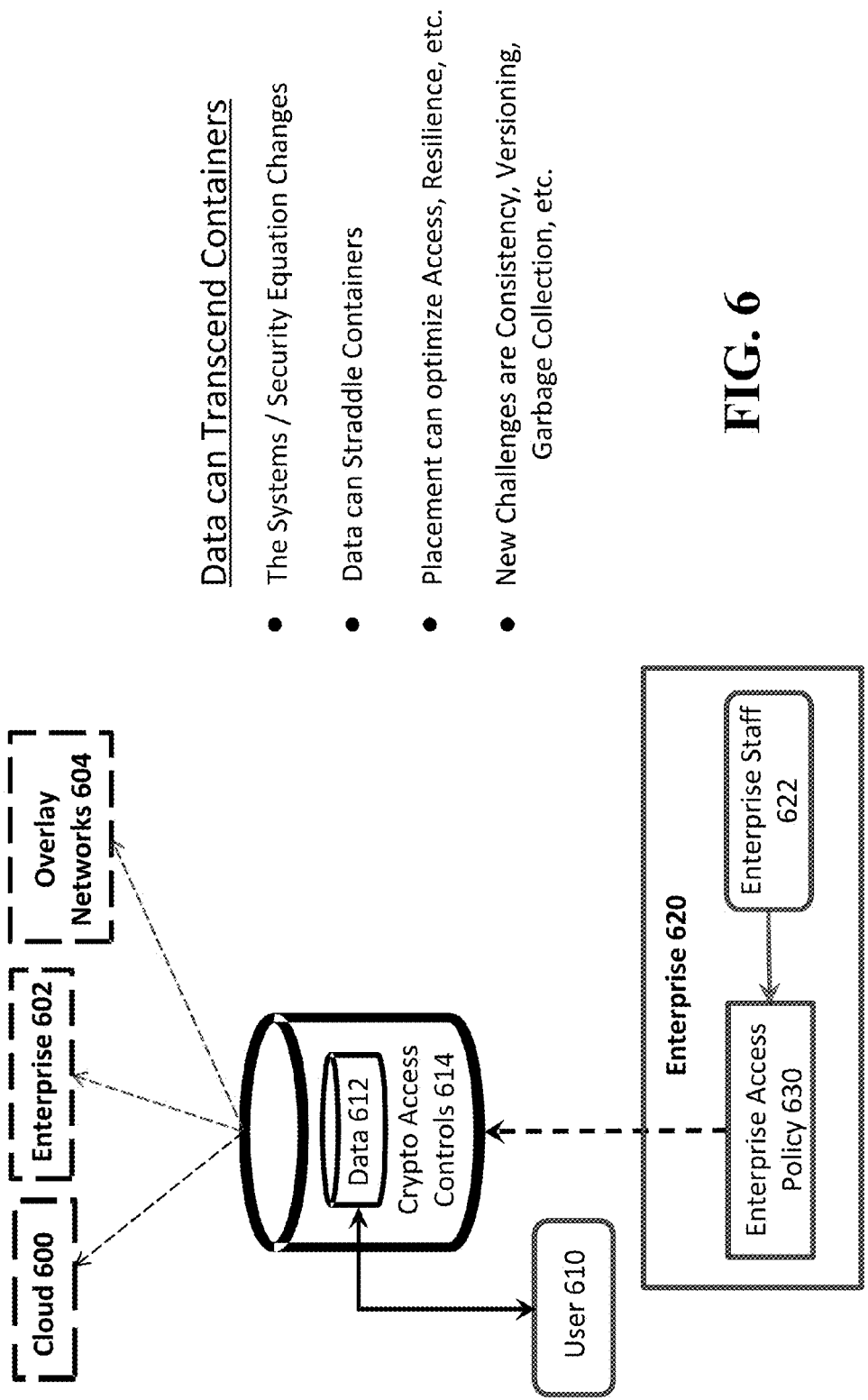
FIG. 6 is another block diagram illustrating aspects of data as its own custodian illustrating that data can transcend conventional container security models.

FIG. 6 is another block diagram illustrating aspects of data as its own custodian illustrating that data can transcend conventional container security models. In this regard, as recognized herein, data can not only be located anywhere, it can be spliced or divided to straddle multiple containers in a way that is optimal for a given situation. Placement can optimize, access, resilience, etc. and a storage management layer can handle consistency, versioning, garbage collection, etc.

As shown in FIG. 6, an enterprise 620 defines its enterprise access policy 630 applicable to enterprise staff 622, while data 612 is stored remotely and protected by cryptographic access controls 614 applicable to users 610 wishing to access data 612. The system and users 610 are agnostic whether containers storing data 612 are stored in a cloud 600, somewhere at the enterprise 602, or stored via overlay networks 604, or combinations thereof, and data can straddle containers.

Figure 7:
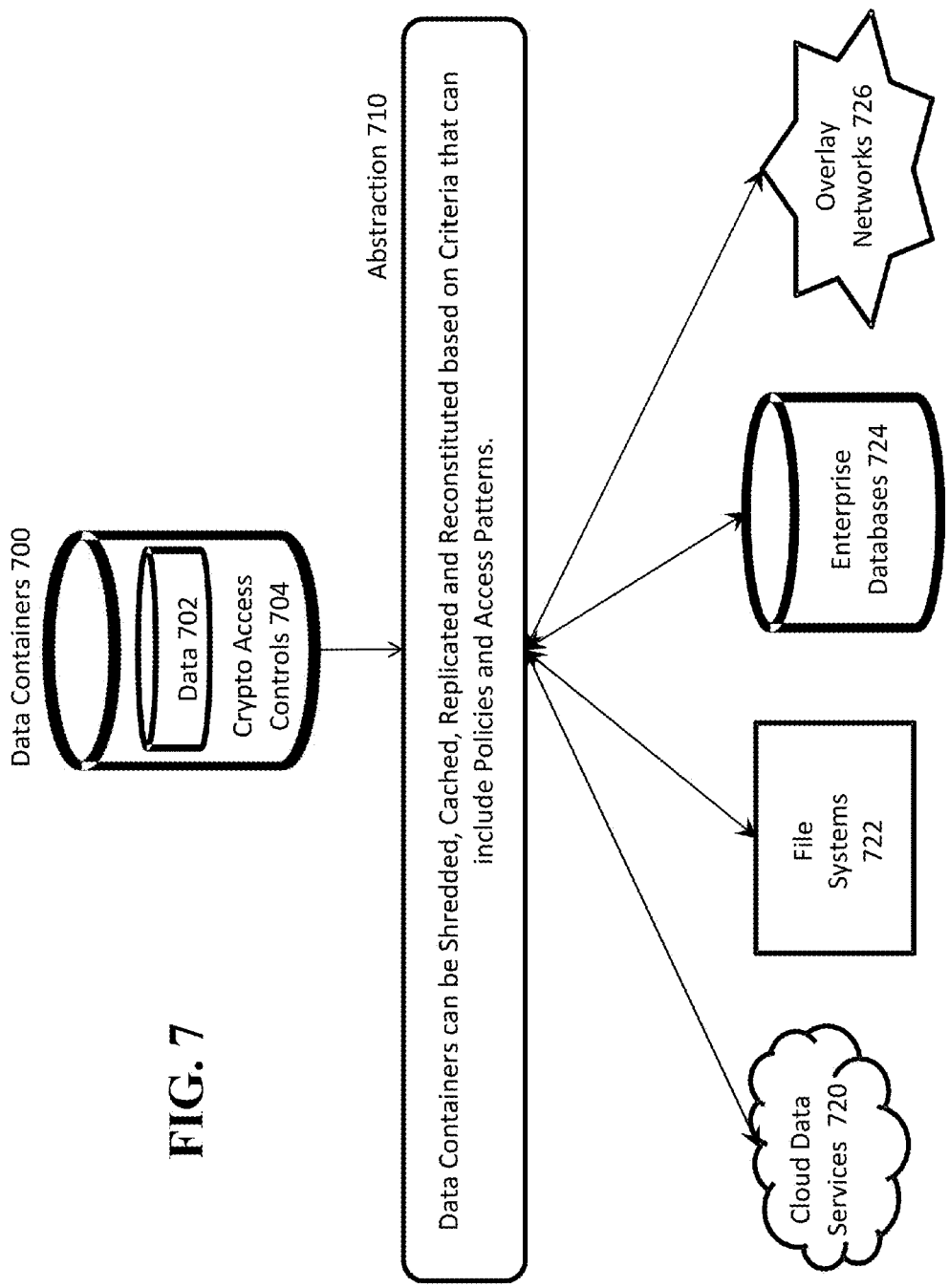
FIG. 7 illustrates a storage management layer that performs such functions as automatic shredding, caching, replication, reconstitution of data from multiple data containers of disparate types.

FIG. 7 illustrates a storage management layer that performs such functions as automatic shredding, caching, replication, reconstitution of data from multiple data containers of disparate types. Such processes can be performed based on criteria including explicit policies and access patterns. As shown data containers 700 including data 702 and crypto access controls 704, from the users standpoint, are stored at an abstraction storage layer 710 for storing all data, however, in reality, the data 702 as protected by the crypto access controls 704 can be shredded, cached, replicated and reconstituted based on criteria, which can include policies and access patters, across any one or more of cloud data services 720, files systems, 722, enterprise databases 724, overlay networks 726, etc.

Figure 8:
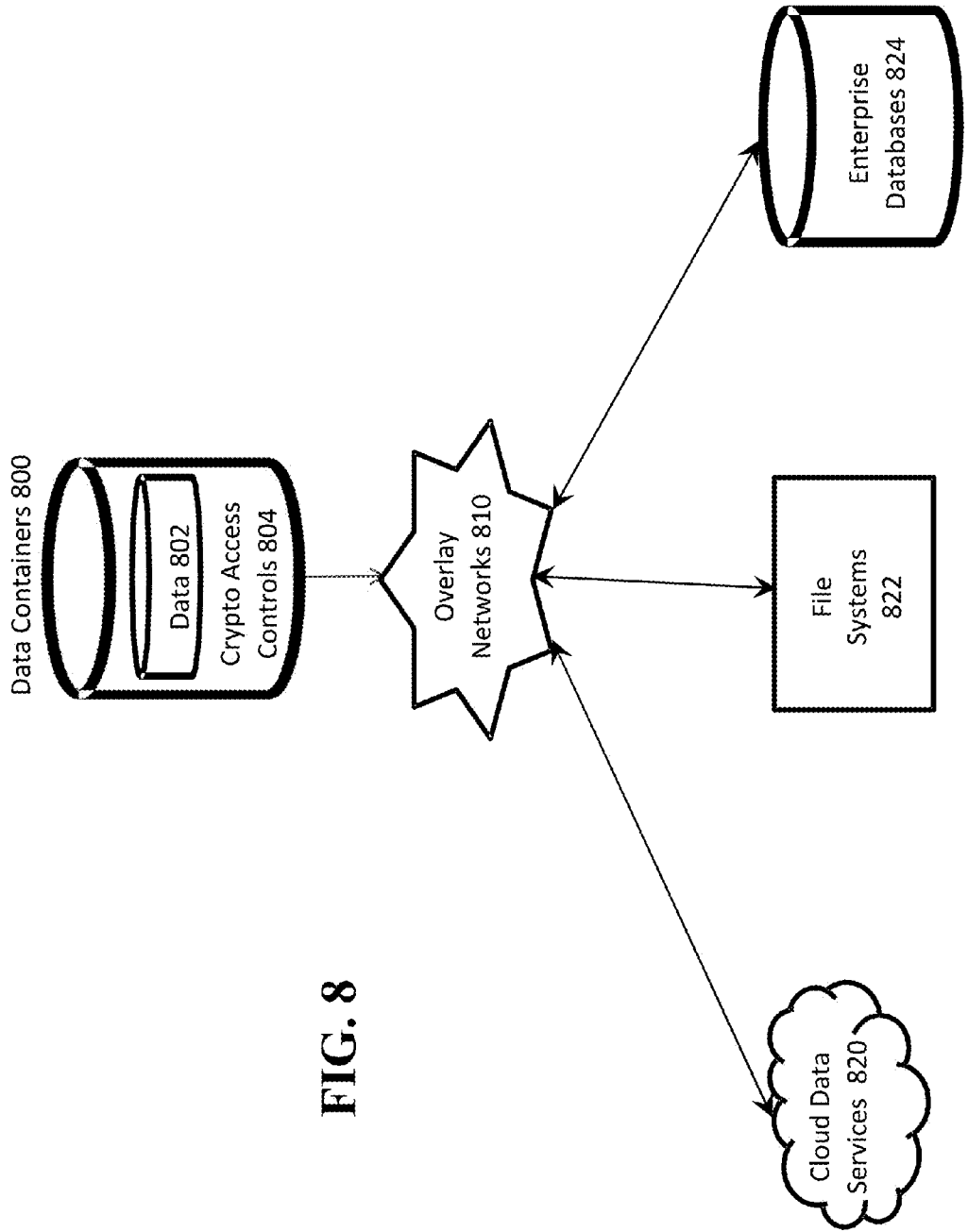
FIG. 8 is a block diagram illustrating secure overlay networks that add the cryptographic access wrapper to data wherever it is stored across various data containers.

FIG. 8 illustrates more generally that the pivot point for security, privacy, reliability, etc., enabling data to act as its own custodian, is the secure overlay networks that add the cryptographic access wrapper to data wherever it is stored across various data containers. Specifically, overlay networks 810 can be an intermediate storage medium for further storage of containers 800 of data 802 as protected by crypto access controls 804 in any one or more of cloud data services 820, file systems 822, or enterprise databases 824. Storage can thus be hierarchical in terms of its ultimate destination.

Figure 9:
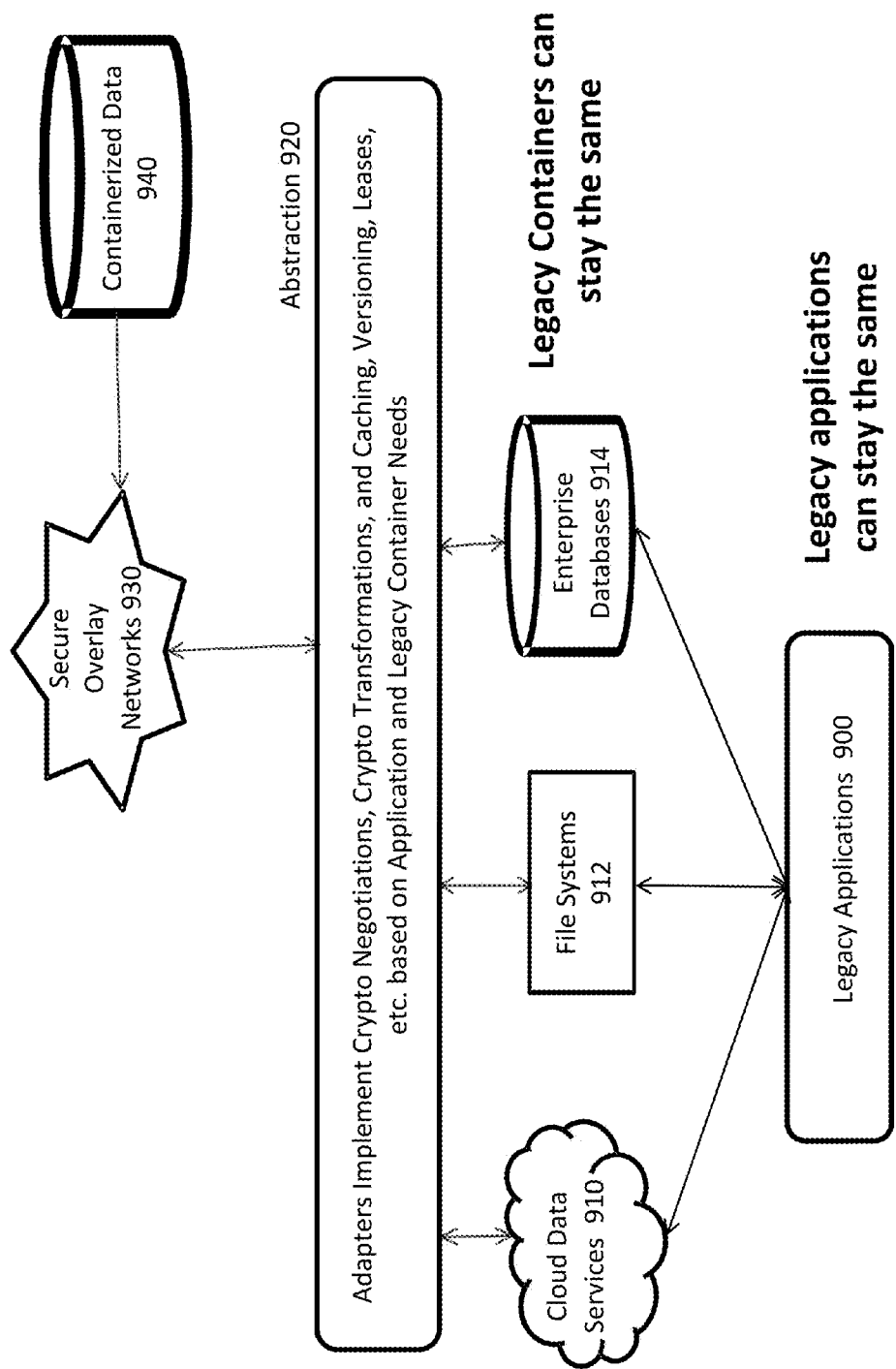
FIG. 9 is a block diagram illustrating an aspect relating to legacy applications.

FIG. 9 is a block diagram illustrating that legacy applications and their container based views of the world (e.g., database files) do not need to change. Rather, for use in a federated trust overlay storage scenario, adapters can be provided that perform the cryptographic negotiations, cryptographic transformations and caching, versioning, leasing, etc. based on application and legacy container needs. More specifically, legacy applications 900 can interact with cloud data services 910, file systems 912 and enterprise databases 914 just the same as always, however, then the abstraction storage layer 920 can still make containerless data happen behind the scenes. The abstraction storage layer 920 can expose adapters that implement crypto negotiations, crypto transformations, and caching, versioning, leasing, etc. based on application and legacy container characteristics, and then shepherd the containerized data 940 to containerless data, e.g., via secure overlay networks 930 as described in connections with FIG. 8, for instance.

Figure 10:
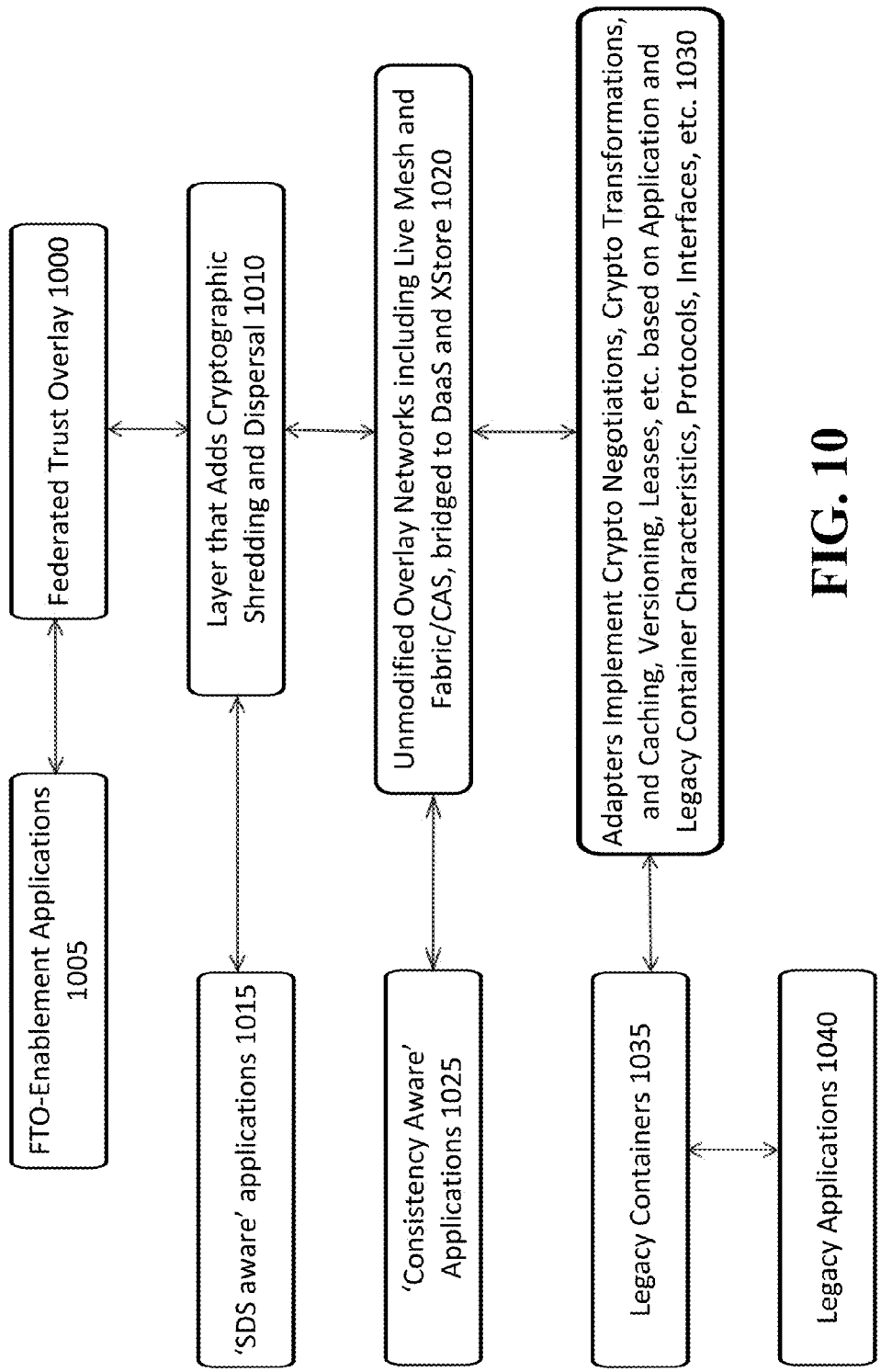
FIG. 10 is a sample architectural model that can be used in connection with legacy applications as well as FTO aware applications.

FIG. 10 is a sample architectural model that can be used in connection with legacy applications as well as FTO aware applications. In this regard, FTO-enabled applications 1005 can plug directly into the FTO 1000 and advantageously make use of the secure and private storage, processing, etc. of data. For SDS aware applications 1015, a layer 1010 can be provided that adds cryptographic shredding and dispersal of data. For consistency aware applications 1025, existing, unmodified overlay networks can be used and bridged to the system as shown by layer 1020. For example, Live Mesh, Fabric/CAS can be bridged to DaaS and XStore via layer 1020. Lastly, as described with FIG. 9, adapters 1030 can be provided that perform the cryptographic negotiations, cryptographic transformations and caching, versioning, leasing, etc. based on legacy application 1040 and legacy container 1035 characteristics. Together, such layers and applications can take advantage of the benefits offered by cloud storage based on a federated trust overlay.

Figure 11:
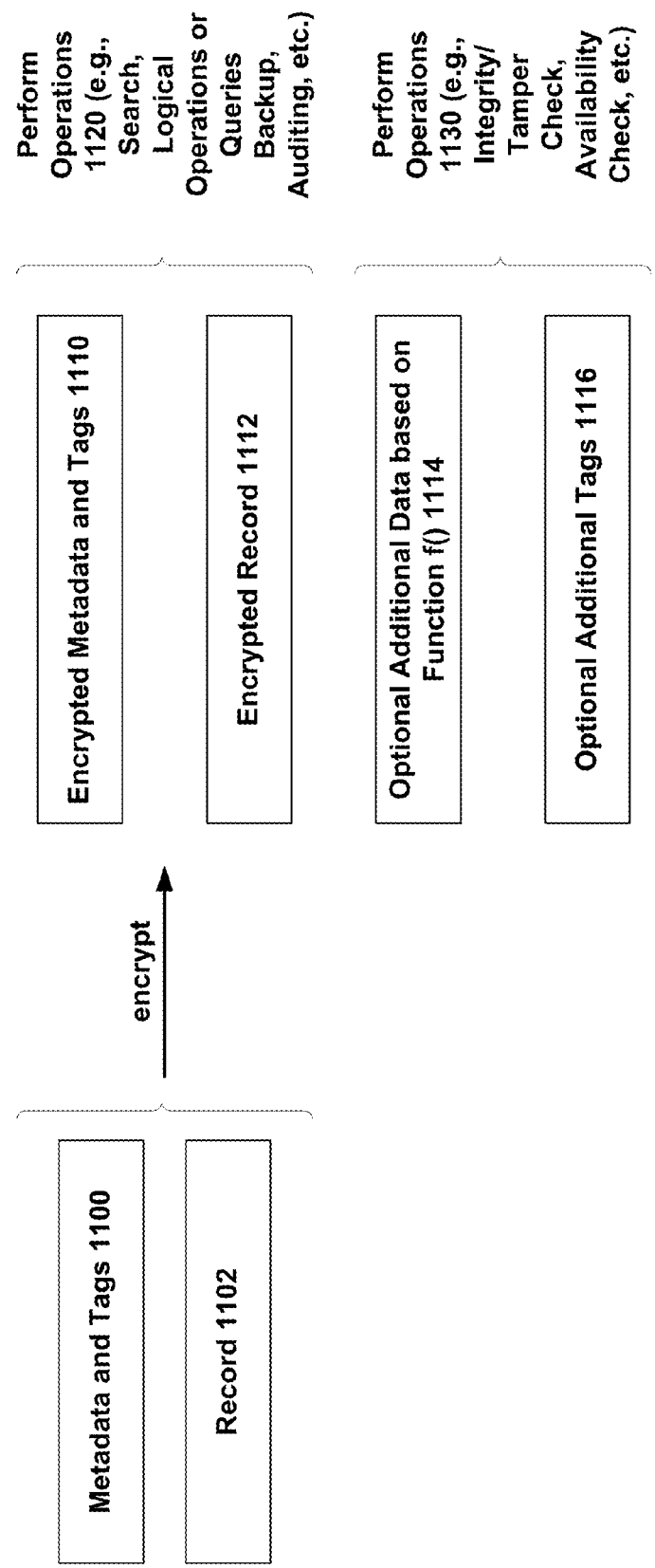
FIG. 11 is a block diagram illustrating general use of a cryptographic wrapper or envelope on data and/or metadata describing the data or a characteristic of the data.

FIG. 11 is a block diagram illustrating general use of a cryptographic wrapper or envelope on data and/or metadata describing the data or a characteristic of the data. As an example, a record 1102 (e.g., data payload) and associated metadata and/or tags 1100 can be encrypted together or separately in a mathematically selectively accessible way to produce encrypted metadata and tags 1110 and encrypted record 1112. With such encrypted data/metadata, various operations 1120 can be performed based on the mathematical selective accessibility, e.g., search of the data or metadata, logical operations over the data or metadata, queries, backup operations, auditing of the data, etc. In addition to encrypting the metadata 1100 and record 1102, optional additional data can be added to the encryption package as a function of any desirable goal 1114 or optional additional tags 1116 can be added to content as part of the encryption process, e.g., public or secret tags that either allow or disallow access to a certain class of users as an example. With such additional data 1114 or tags 1116, additional operations 1130 can be performed such as integrity check, tamper check, availability check, etc.

Figure 12:
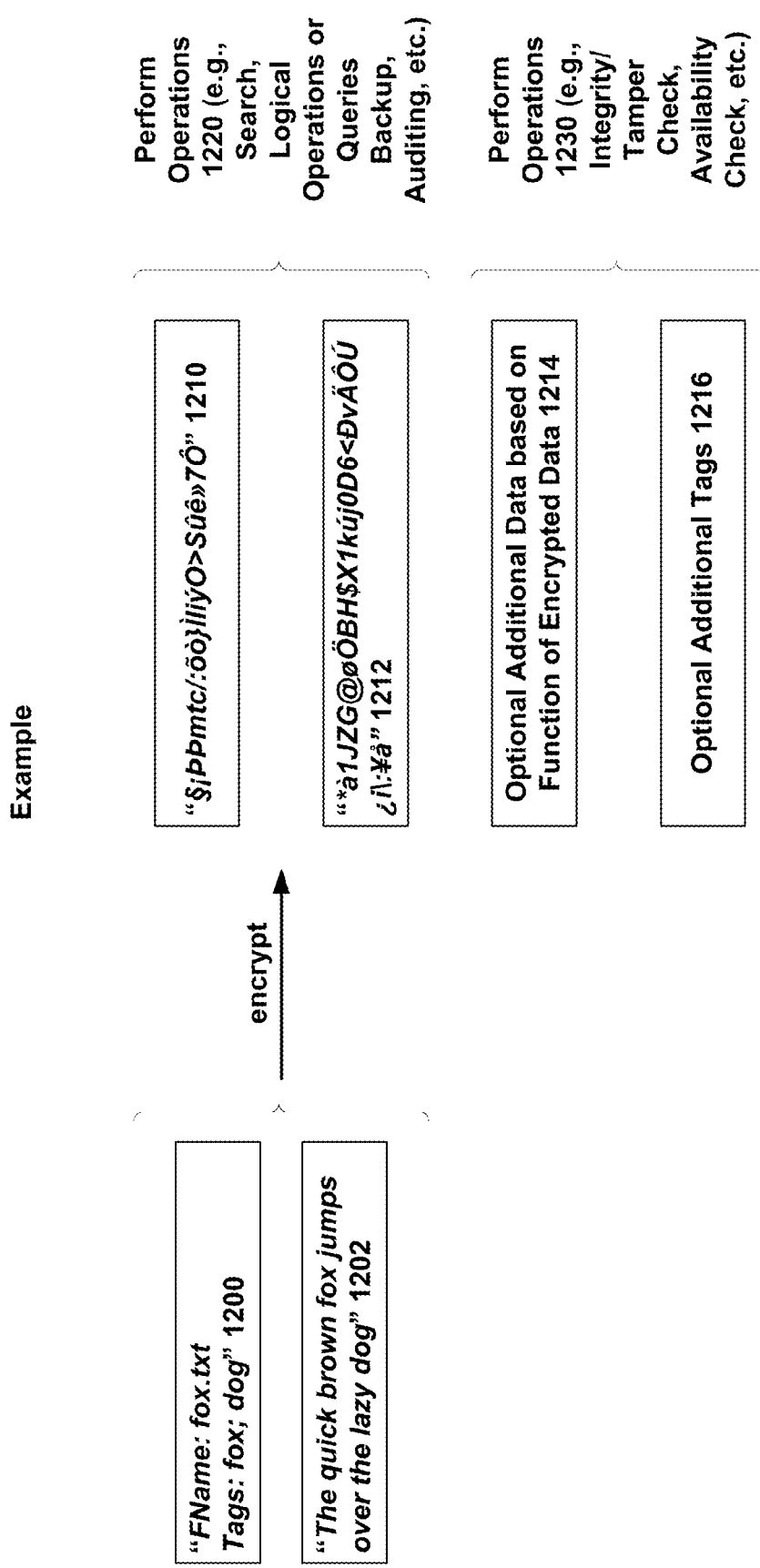
FIG. 12 is a particular example further highlighting the concepts presented generally in FIG. 11.

FIG. 12 is a particular example showing payload 1202 and tags 1200, which are encrypted to form encrypted tags 1210 and encrypted data 1212 for operations 1220. In addition, as mentioned, the data can be augmented with data 1214 and the tags can be augmented with tags 1216 which facilitate an additional set of operations 1230.

Figure 13:
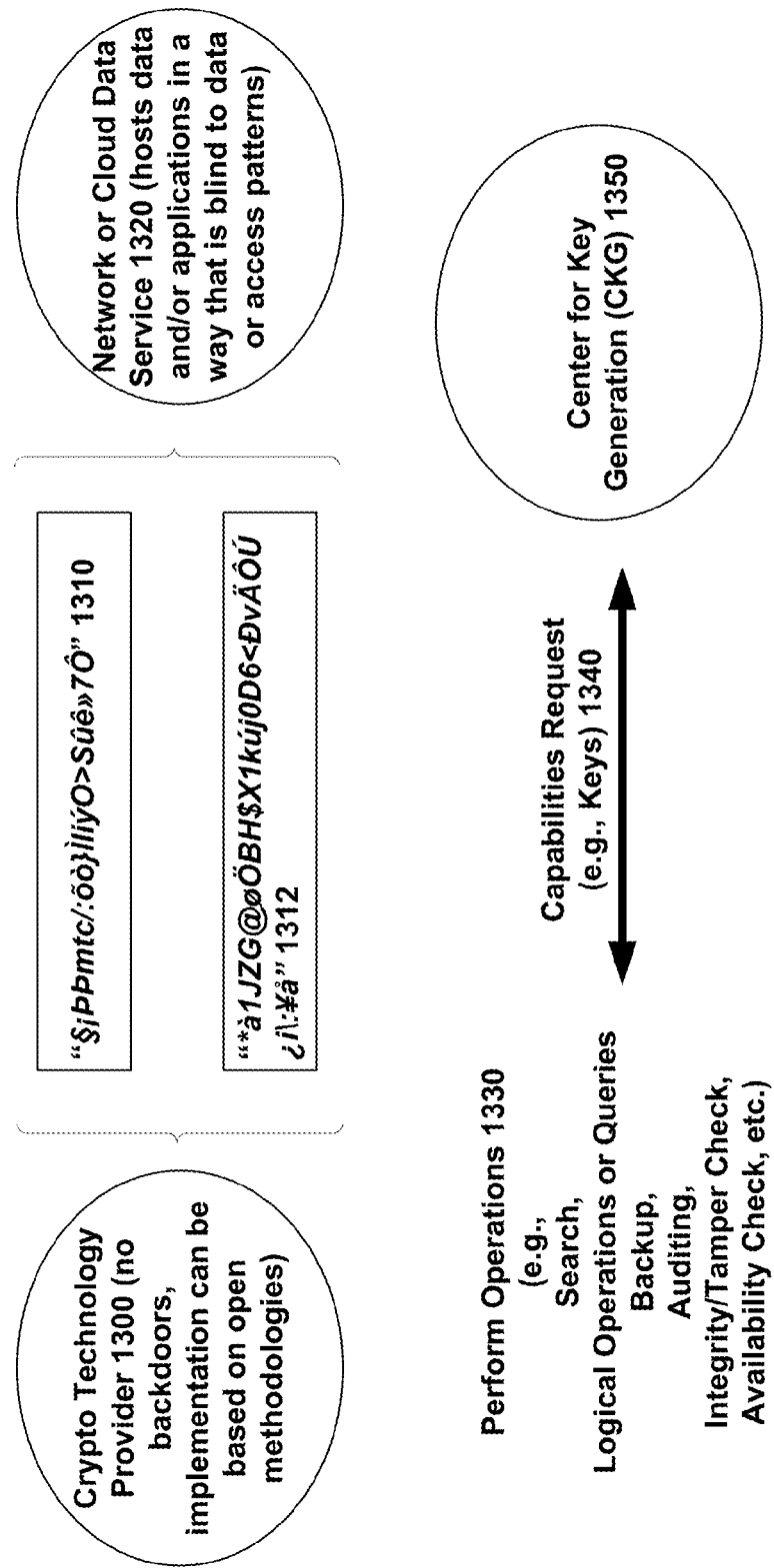
FIG. 13 is another example illustrating the federated trust overlay surrounding the protected data.

Building on the example of FIG. 12, FIG. 13 is an example illustrating the surrounding federated trust overlay. In this regard, a CTP 1300 with no backdoors can be implemented based on open methodologies subject to public inspection of robustness. Based on CTP 1300, a CKG 1350 can be spawned for handling requests for capabilities, e.g., keys 1340, for performing operations 1330 (e.g., search, logical operations or queries, backup, auditing, tamper check, integrity check, availability check, etc.). Cloud data service provider 1320 thus provides service, e.g., storage of the encrypted metadata 1310 and encrypted data 1312. In one optional embodiment, the cloud hosts the data in a way that is blind to data or access patterns.

Figure 14:
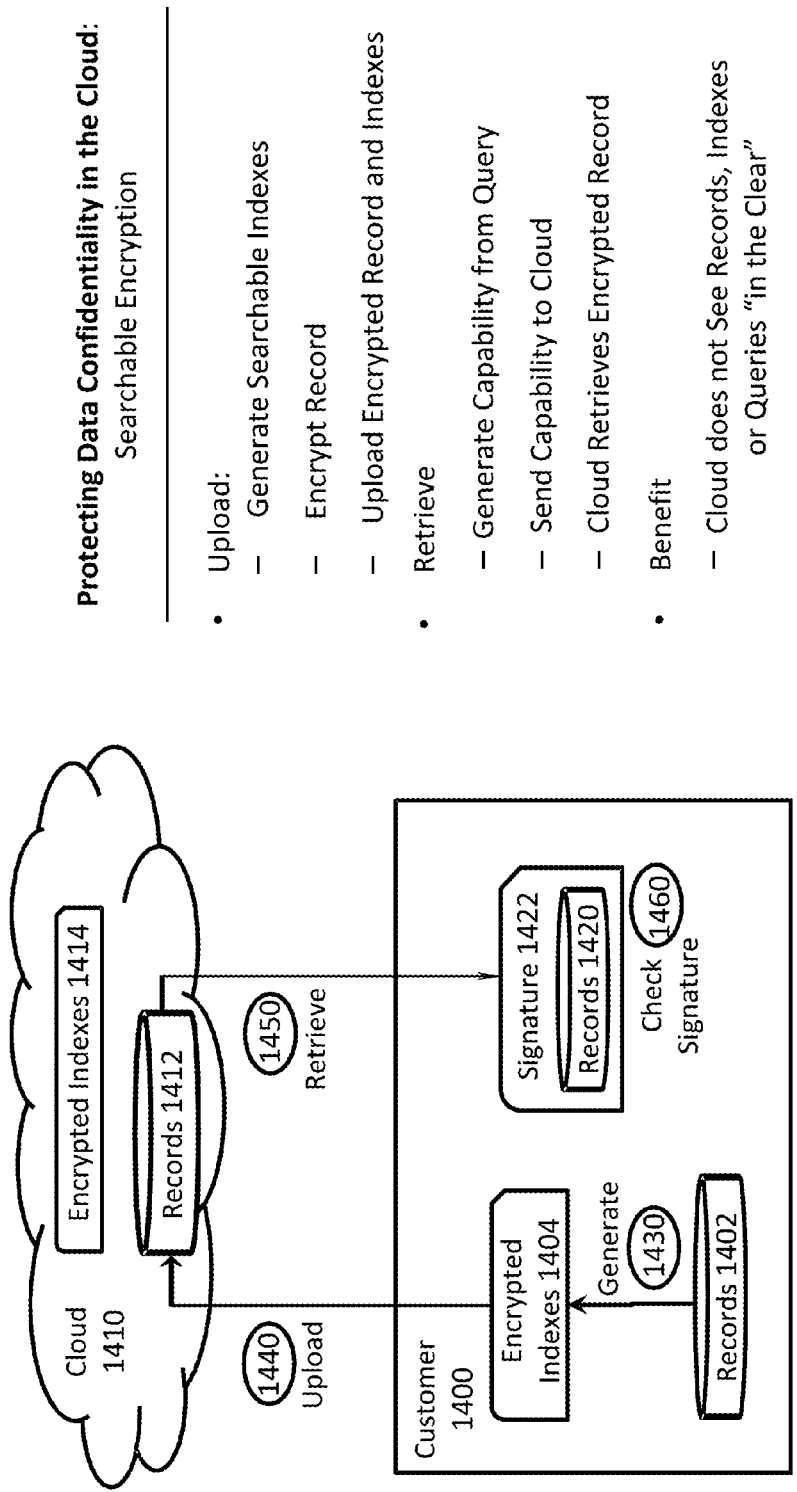
FIG. 14 is a block diagram illustrating an embodiment in which records as well as indexes are encrypted and uploaded to the cloud using a trust overlay.

FIG. 14 is a block diagram illustrating an embodiment in which records as well as indexes are encrypted and uploaded to the cloud using a trust overlay. In this regard, the records and indexes are searchably encrypted such that the indexes can be selectively accessed as a first layer of visibility into the associated data. Then, based on a search of the indexes, various content or records can be identified matching a given index or indexes and then the user can either access the matching content or records based on privileges or not, operating as a second layer of protection over the data—first over access to the indexes for search or other operations, and second over access to the data. In this regard, any number of layered cryptographic wrappers can be applied over different portions of the data and associated metadata.

As shown, a customer 1400 may have various records 1402 from which at 1430, encrypted indexes 1404 are generated. The records 1402 and encrypted indexes 1404 are uploaded at 1440 to cloud 1410 and stored in the cloud 1410 as records 1412 and encrypted indexes 1414. To retrieve the records 1412, e.g., based on the encrypted indexes 1414, at 1450, the customer 1400 receives records 1420 signed with at least one signature 1422 from the cloud 1410, and at 1460, the at least one signature 1422 can be checked.

Figure 15:
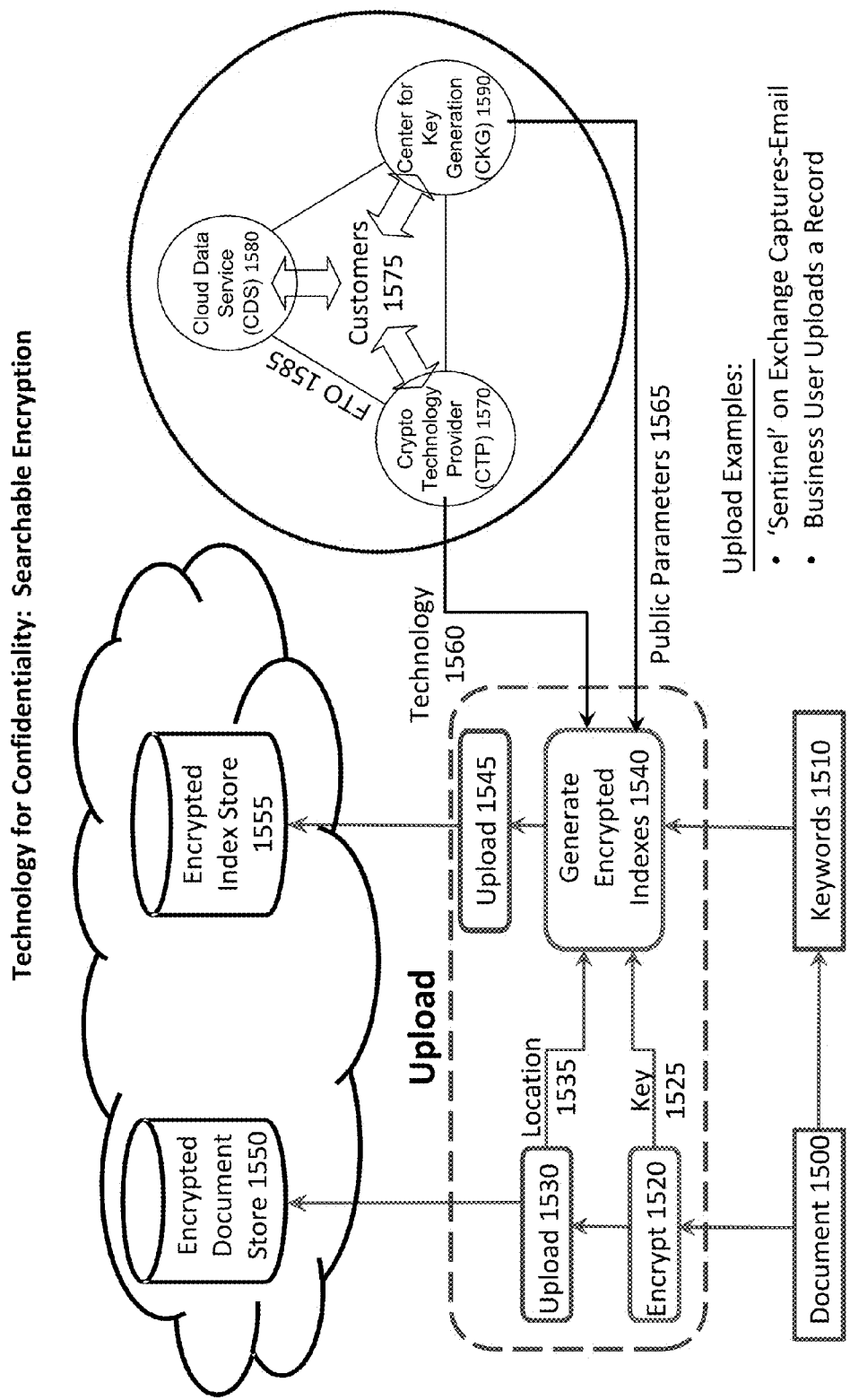
FIGS. 15-16 illustrate how a client can make use of a federated trust overlay architecture to generate and uploaded encrypted indexes on top of encrypted data for richer cloud storage experiences.

FIG. 15 illustrates how the client can make use of a federated trust overlay architecture to generate and uploaded encrypted indexes on top of encrypted data for richer cloud storage experiences. The federated trust overlay architecture involves separation of powers to generate a trustworthy cryptographic ecosystem and is described in more detail below.

Figure 16:
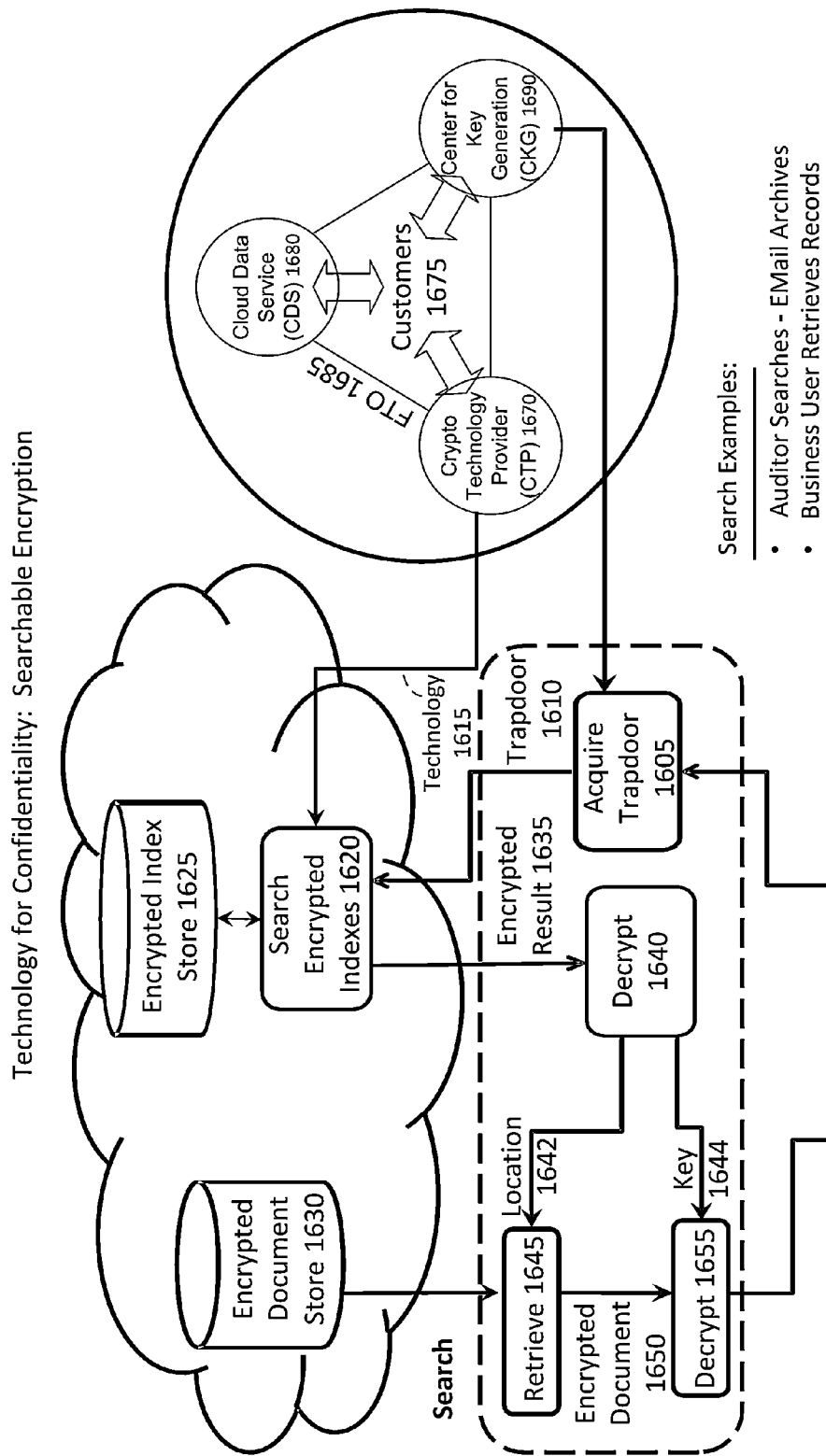

An FTO 1585 is an ecosystem that benefits customers 1575 by separating pieces of the mathematical transformations that take place with respect to containerless data in cloud or other storage, and as described elsewhere herein, includes a cloud data service (CDS) 1580, a crypto technology provider (CTP) 1570 and a center for key generation 1590. As an example, customers 1575 may have a document 1500 with which various keywords 1510 are associated. The public parameters 1565 for encryption are retrieved from the CKG 1590 whereas the technology for performing the mathematical transformation is retrieved from CTP 1570. To perform an upload, document 1500 is encrypted 1520 and uploaded 1530 to the cloud into an encrypted document store 1550. The location 1535 and the key 1525 for the upload, along with the keywords 1510 are input to generated encrypted indexes 1540 associated with the encrypted upload of document 1500, and the encrypted indexes generated at 1540 are uploaded at 1545 to encrypted index store 1555.

Where FIG. 15 illustrates the upload of encrypted index data, FIG. 16 illustrates the decryption of indexes to search for particular content, which is granted based on capabilities provided by the federated trust overlay, and then with visibility into the search results, the user can be granted capabilities or privileges to decrypt the actual documents pertinent to the search. In this regard, access to the index and access to documents can be separately controlled based on policy and enforcement by the FTO.

As mentioned, an FTO 1685 is an ecosystem that benefits customers 1675 by separating pieces of the mathematical transformations that take place with respect to containerless data in cloud or other storage, and as described elsewhere herein, includes a cloud data service (CDS) 1680, a crypto technology provider (CTP) 1670 and a center for key generation 1690.

In this example, a customer 1675 forms a query 1600, and then acquires a trapdoor 1610 at 1605 from CKG 1690, which is presented with the query 1600 to the cloud. In the cloud, the encrypted indexes in encrypted index store 1625 are searched at 1620 based on technology 1615 retrieved from CTP 1670. The results 1635 are then returned still encrypted and decrypted at 1640, from which the location 1642 and key 1644 are extracted. This gives the systems the information to retrieve at 1645 encrypted documents 1650 from encrypted document store 1630, which can be decrypted based on key 16400 at 1655 to return document or documents 1660, e.g., document 1500 from FIG. 15.

Figure 17:
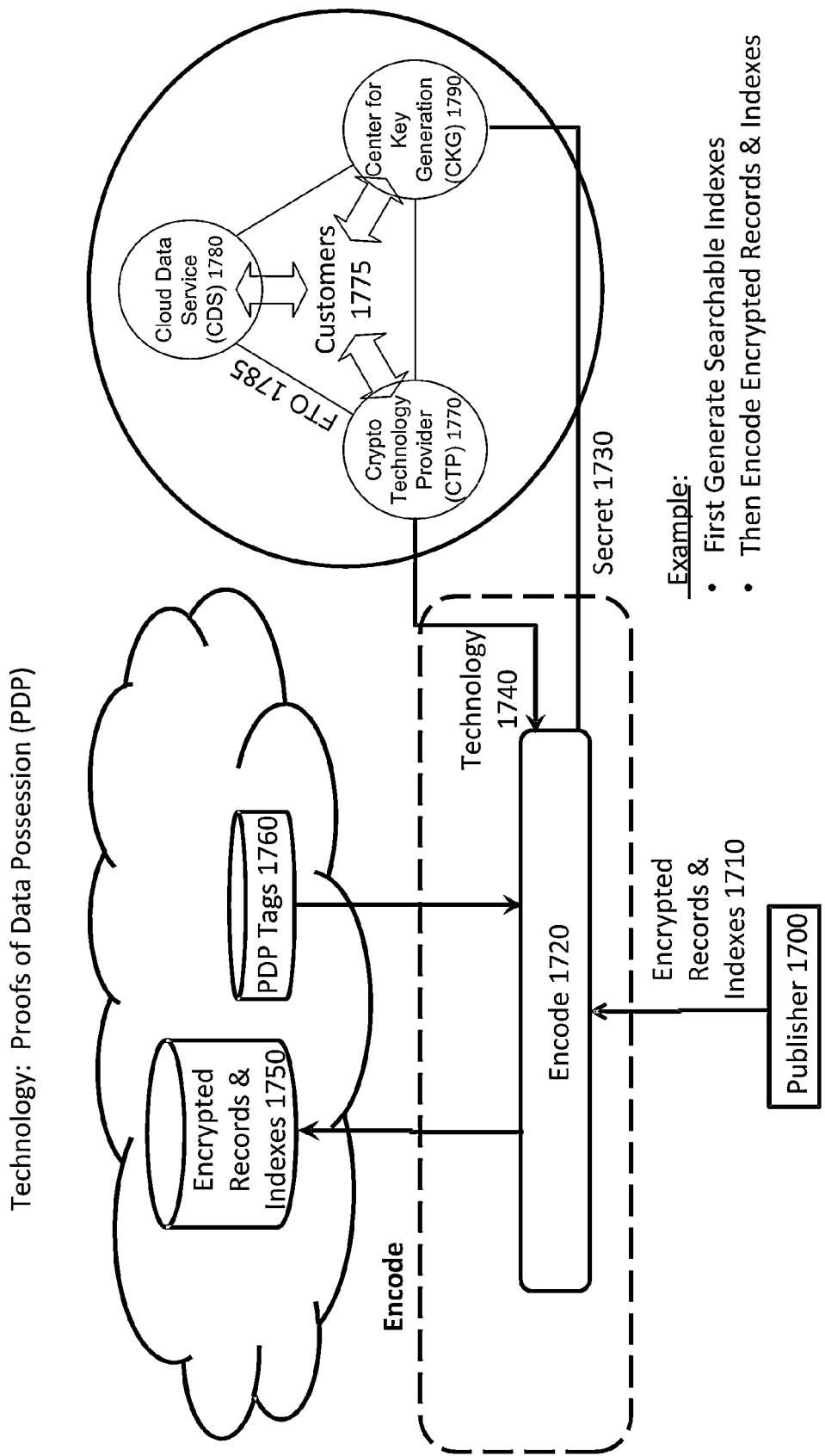
FIGS. 17-18 are block diagrams illustrating some additional non-limiting trust assurances by the system.
Figure 18:
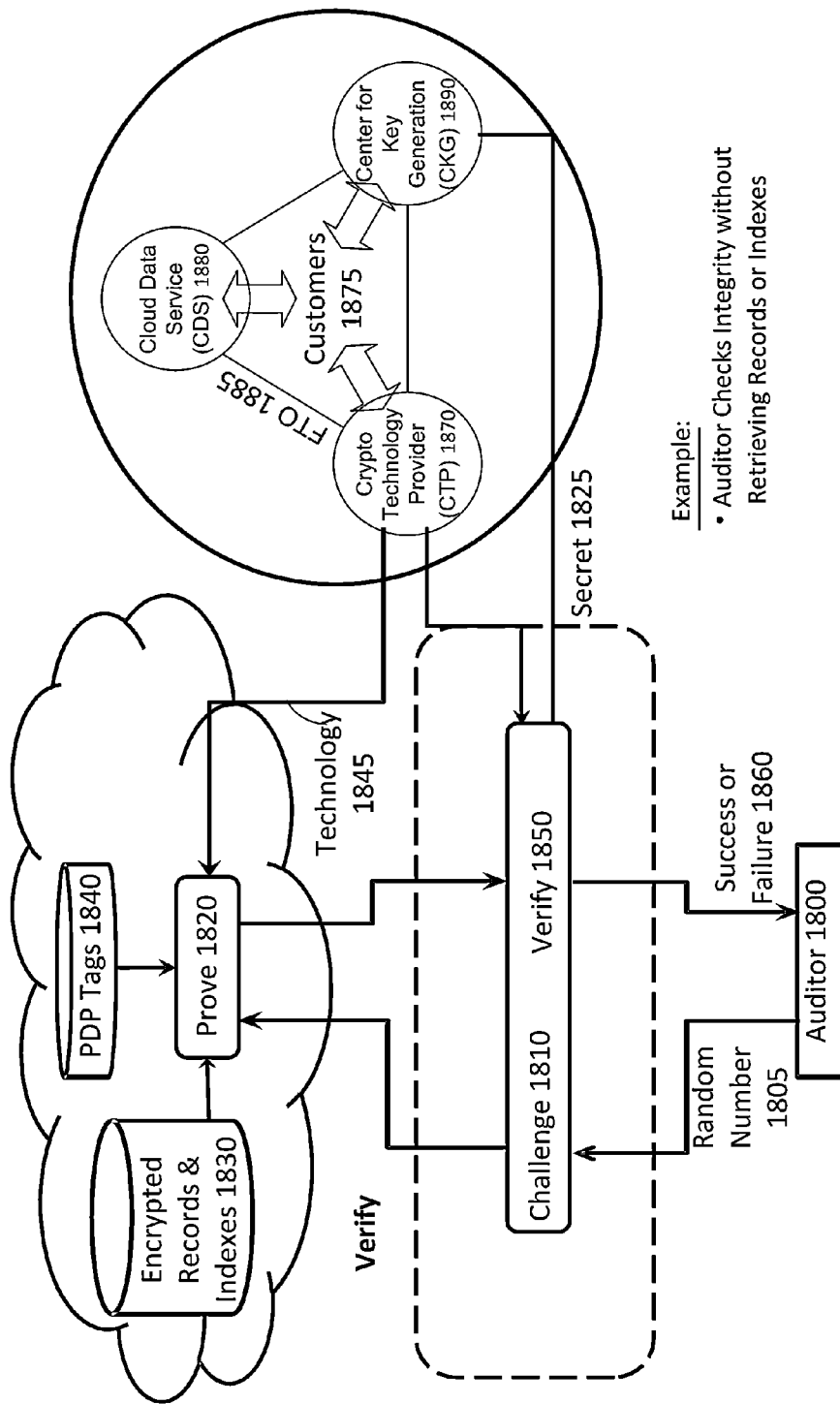

FIGS. 17-18 are block diagrams illustrating some additional non-limiting trust assurances by the system. In this regard, any algorithm that proves that what a user receives is correct can be used as an additional layer to mathematically prove to the user that gibberish is not being provided by the cloud. For example, one technique is known as proof(s) of data possession (PDP) in which tags are applied with respect to encrypted data which can be used in connection with validating the correctness of the data. Similar information can be applied (and encrypted) to prove that the data was not improperly altered or deleted while stored in the cloud. With cryptographic techniques, such proofs typically take the form of a cryptographic challenge and response. In FIG. 17, the PDP tags are encoded and encrypted in the cloud along with the encrypted records, indexes, metadata, etc. while in FIG. 18, a verification operation is being performed based on cryptographic consultation with the FTO that integrity of the data is intact.

With respect to FIG. 17, as mentioned, an FTO 1785 is an ecosystem that benefits customers 1775 by separating pieces of the mathematical transformations that take place with respect to containerless data in cloud or other storage, and as described elsewhere herein, includes a cloud data service (CDS) 1780, a crypto technology provider (CTP) 1770 and a center for key generation 1790. In this example, a publisher 1700 encrypts records and indexes 1710 by encoding the records and indexes at 1720 based on a secret 1730 retrieved from CKG 1790 and technology 1740 retrieved from CTP 1770. The encrypted or encoded records and indexes 1750 are stored in the cloud. Proof(s) of data possession (PDP) tags 1760 can be used in connection with encoding at 1720 which later help to ensure certain aspects of the data while stored in the cloud as described elsewhere herein in more detail.

As mentioned, in FIG. 18, a verification operation is being performed based on cryptographic consultation with the FTO that integrity of the data is intact. In this regard, the FTO 1885 is an ecosystem that benefits customers 1875 by separating pieces of the mathematical transformations that take place with respect to containerless data in cloud or other storage, and as described elsewhere herein, includes a cloud data service (CDS) 1880, a crypto technology provider (CTP) 1870 and a center for key generation 1890. PDP Tags 1840 can be useful to an auditor 1800 of a system to check the integrity of data stored in the cloud. Based on a random number 1805, the auditor 1800 issues a challenge 1810 to a prover 1820 in the cloud and based on a secret 1825 retrieved from CKG 1890 and technology retrieved from CTP 1870. Prover 1820 also uses technology 1845 in connection with implementing the proving algorithms. In this regard, prover 1820 receives encrypted records and indexes 1830 and PDP tags as input and returns information to auditor 1800 which is verified at 1850. Based on whether the verify operation is successful or fails at 1860, the auditor 1800 is informed whether the integrity of the encrypted records and indexes 1830 has been maintained.

As described in more detail below, various cryptographic techniques can be incorporated into the provision of services that can provide strong guarantees of privacy and non-repudiation for service users. By integrating these cryptographic techniques with data protection techniques, remote services and layered applications can be implemented on top of the data in a manner that lets the owner of that data and the enterprise customer (the "customer"), to have precise control over the type of operations that can be performed by the entity hosting the data, or the Cloud Service Provider or Operator (the "CSP"). In addition, many of these operations can be performed by the CSP on behalf of the customer, without learning or otherwise seeing the actual contents of the data on which operations are performed. In addition, the customer can detect if the CSP is inappropriately deleting or modifying data, or moving the data to lower-performance secondary or tertiary storage. In this regard, a variety of cryptography techniques can be integrated with data services to provide confidence to the customer to relinquish control over data, e.g., to increase security and privacy.

For instance, searchable encryption is an encryption method where essential metadata is copied out of the data before it is encrypted. For a non-limiting example, in the case of Exchange e-mail, the data is a message with its attachments and the essential metadata could include selected messaging application programming interface (MAPI) properties and a full-text index. For instance, the data is encrypted, e.g., using advanced encryption standard (AES), whereas the metadata is encrypted in a manner that generates encrypted indices. As a result, the encrypted data and indices can now be handed over to another entity that is not fully trusted, such as a CSP. Subsequent selective access to the aggregated encrypted data and indices can be accomplished by the owner of that data, the customer, sending up an encrypted query to the CSP (or other authorized subscribers). Hence, the CSP can apply encrypted queries on the encrypted indices and return the encrypted data that matches, however, the CSP does not learn anything about the contents of the data, the metadata, the queries, or the results (unless authorized by the customer).

Proof(s) of Possession and Proof(s) of Retrievability are cryptographic techniques where a "Prover" (in this case, the CSP providing storage) and a "Verifier" (the customer) can engage in a protocol where the verifier can efficiently determine if the data they own is intact and available for easy retrieval from the possessor of the data, the CSP. These techniques are efficient in network bandwidth, and in the operations that the CSP performs, so the cost of goods sold (COGS) of the CSP remain relatively unchanged and the time for completing the protocol is reasonably short.

Another cryptographic technique that can be integrated into the provision of data services is Proof(s) of Application. Proof(s) of Application, similar to Proof(s) of Possession, enables the Verifier to ascertain that the data is being correctly maintained by the Prover, the CSP.

Blind Fingerprints represent another kind of cryptographic technique that extends network de-duping techniques, such as Rabin Fingerprints, which are typically used for minimizing the exchange of redundant data over a network. In various embodiments herein, fingerprinting is applied such that a participant in the protocol, e.g., the CSP in the case of storage of data, is unaware of the actual contents of the data that they are hosting.

A variety of scenarios based on the provision of services by a CSP thus emerge based on the above-described framework and corresponding cryptographic techniques ranging from storage and compute services to communication and collaboration services. Larger enterprise customers have significant compute and storage assets in their current enterprise data centers, and the inertia to adoption of Cloud services may be high. In addition, customers are experienced in, and familiar with data center operations, wanting to leverage the operating expenses (OPEX) and capital expenses (CAPEX) advantages, and thus are concerned about their sensitive business data moving from premise to the Cloud.

For this class of customers, in various embodiments, a set of applications are provided that involve the customer owning and operating their existing servers, such as Exchange server. The second copy of the data would then be delegated to the cloud service provider for reasons of data protection, archival, compliance, governance, legal or other reasons. The CSP thus has the skills, technologies and economies of scale to preserve this data against data loss or disclosure, and can facilitate running applications on top of this second copy. A small sampling of example products and services that can be offered based on maintaining a data to the customer include litigation support, monitoring and supervision, service dial-tone, data navigation, etc.

With respect to litigation support, when a company is being sued, there are a variety of entities that are required by the litigation process to perform searches on historical e-mail records. These entities include internal legal staff, HR, managers, external legal counsel, their external litigation support partner, and the opposing legal counsel. There are specific scope rules regarding who can perform what search. In current litigation support scenarios, it is difficult to bound scopes. Hence, it is possible for any individual involved in the litigation support to look at e-mail that is outside scope. In the case of email, results of searches are typically exchanged in the form of personal storage table (PST) files, which constitute additional risk, since these files can be inadvertently or maliciously handed over to unauthorized individuals.

In contrast, when the second copy is hosted remotely, e.g., in the cloud by a CSP, and maintained through a data, it is possible for a single trusted entity in the enterprise, e.g., the Chief Legal Officer, to provide each individual in the operation with specific trapdoors that will limit their query capabilities to their need. The data being hosted in the Cloud and protected through searchable encryption and a tamper-resistant audit log provides a higher level of protection so that inappropriate e-mail access is prevented. The need to exchange PST files is eliminated, since all individuals in the operation are directly accessing the cloud for queries, and the litigation support partner is the only entity exporting the targeted content for conversion to tagged image file format (TIFF) for case management.

With respect to monitoring and supervising the remote data copy, any reasonably sized corporation should proactively monitor their organization's e-mail for various purposes. These could range from legal/compliance, to governance reasons such as monitoring IP leakage, plagiarism, inappropriate language, etc. Typically, the monitoring and supervision software monitors either the primary servers, or a second copy that is backed up or archived. The problem with monitoring the primary servers is that this could place excessive load on busy production servers. In addition, since it is possible for administrators to accidentally or maliciously modify or delete data on the primary servers, a solution is to capture data in a compliant manner and transfer it to a second copy, where monitoring and supervision software continually scans incoming e-mail, looking or searching for patterns. However in many enterprise setups, there is local administrative access to these second copies, and as a result, a resourceful administrator can modify or delete information in spite of tamper detection and prevention mechanisms.

In contrast, maintaining a data by the CSP advantageously places the second copy in a different region of control.

Suitable cryptographic techniques, such as searchable public key encryption (PEKS) and Proof(s) of Possession (POP) can ensure that even collusion between an enterprise administrator and an employee of the CSP still prevents them from positively identifying exactly what item they want to modify. The monitoring and supervision software runs at the remote site or in the Cloud and looks for items that have specific pre-determined keywords through trapdoors that have been previously provided.

As described herein according to various embodiments, independent data protection and cryptographic techniques are combined in a manner that enhances and modifies each to support the other, to provide solutions that are not currently available to consumers, enterprises, ecosystems and social networks, and to enable containerless, secure, private and selectively accessible data in a cloud environment.

Trusted XML

XML has evolved as a ubiquitous network exchange format for a variety of reasons including but not limited to its efficient descriptive capacity enabled via tags and its hierarchical arrangement. In this regard, XML data can be protected according to the above FTO infrastructure enabling different permissions to be applied to different parts an XML document (including payload and tags, and any metadata added on top of existing tags or metadata). Trusted XML can thus be stored in a containerless fashion, as described above as well.

Figure 19:
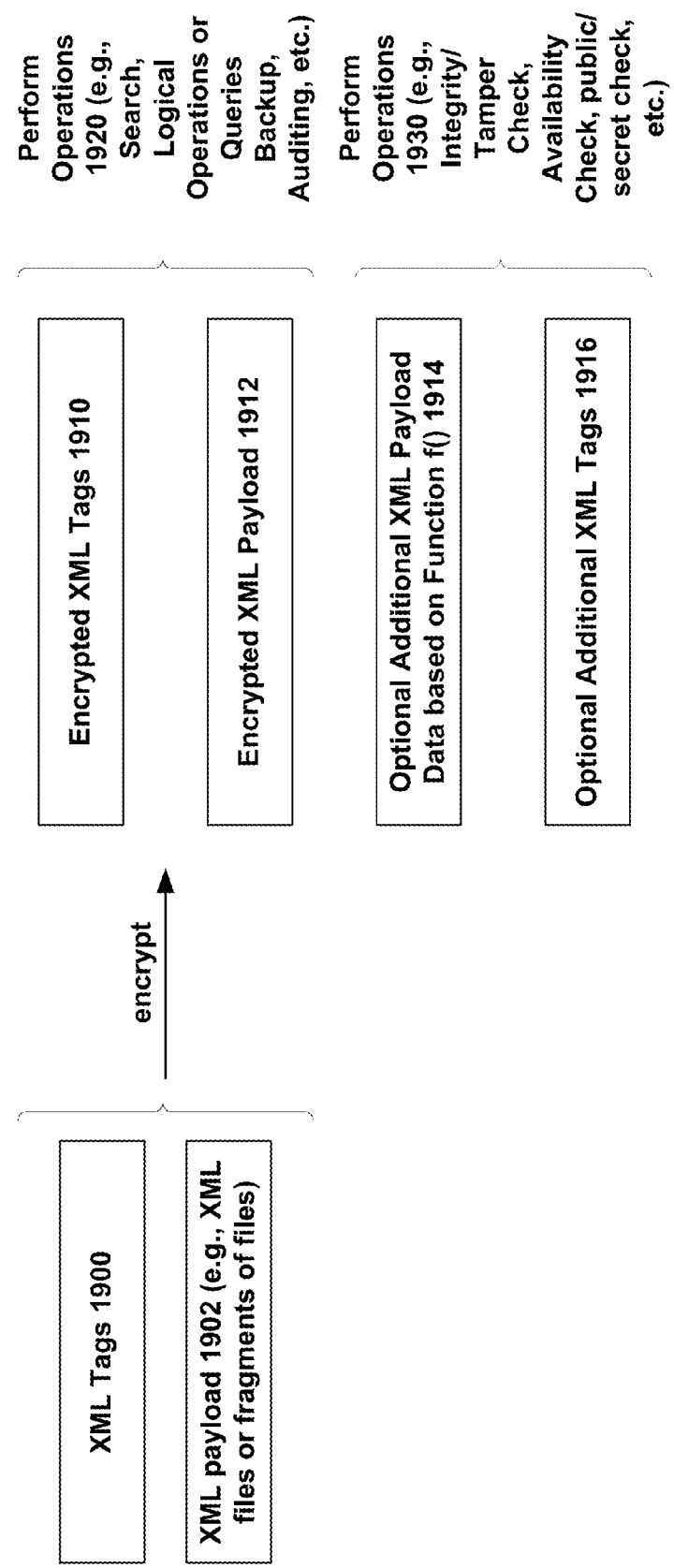
FIG. 19 is a diagram illustrating an embodiment of trusted overlay in the context of XML.

As illustrated in FIG. 19, XML payload 1902 and its tags 1900 can be encrypted to form encrypted tags 1910 and payload 1912. In this regard, by breaking an XML document into XML fragments with potentially different protection levels, a much more granular permission system is enabled that does not depend on the initial organization as a document on the publisher side. In addition additional data can be added to the payload data based on any function 1914 and additional XML tags can be applied to aid in additional functions to be applied over the trusted XML fragments. Operations on the payload 1912/tags 1910 include operations 1920, such as search, queries, backup, auditing, etc. Other operations 1930 can be implemented over the data based on the optional addition of data 1914 or tags 1916. For instance, any time data fits the pattern of a social security number, a tag 1916 can be automatically added that marks the XML fragment as private to preserve such information inviolate.

In this regard, if the data/information is in XML format, any of the above described techniques on data/metadata can be applied to structured XML data to selectively query and obtain access to XML fragments. XML has a standard format that is <tag "value"> or <tag "value"|XML end-tag>. In this respect, with structure XML, there is a way to represent the structure hierarchically so that there is an outer wrapper that will point to the CKG/CTP 'frame' that is unique to the digital escrow pattern. So, when there is need to access an embedded fragment, existing (or materialize, new) trust is leveraged with the <CKG> and <CTP> wrapper. This allows for users to search, extract and decrypt the segments, where permitted. In addition, PDP can be used to verify that the specific XML segment requested has not been tampered with since it was originally authored.

Accordingly, in various embodiments, a "trusted envelope" for XML fragments or full records ("Payload") is created through variety of "decorations" that allow for the trust to run a gamut of trust guarantees like confidentiality, privacy, anonymity and integrity.

This is in line with the above-described container-less data embodiments. The opportunity to decouple data from its containers (e.g., file systems, databases) facilitates the sharing in a manner that preserves and extends the original guarantees without the need for containers to enforce. Any other wrapper can also be added beyond crypto search, crypto-based tamper detection, etc. as based on business needs and as different technologies emerge. With XML data, tags can be added to the data to help modulate the consistency of the data, which can be dependent on domain and applications.

Advantageously, the XML can include searchable metadata that encodes authentication, authorization, schemas, history, traces, consistency, etc. It could also encode manifest information for locating other related fragments if it is a dispersed sliver of a larger document. The technology independence of being able to use any agreed upon CKG/CTP combined with being able to add other wrappers in addition to searchable encryption and PDP as new technologies became applicable enables a flexible architecture to handle any kind of cloud scenario. XML tags can also be augmented or added in order to modulate consistency, trails, etc.

When this is combined with data dispersion techniques, strong guarantees regarding confidentiality, privacy, anonymity and integrity are achieved. This "trusted envelope" can be used to decorate any Payload with additional metadata that could include schema information, consistency hints, versions and trails, confidence levels (e.g., when using "crowd computing"), locators for reconstituting this payload from other peers of a sliver, etc.

In one non-limiting application, trusted XML provides the "loose format binding" to grow the ecosystem in order to catalyze network effects. The combination of FTO (parameterizes the technologies and the key managers) and the universal exchange formats of XML facilitates greater flexibility in accommodating diverse technical, application, domain, locale, sovereign, format, and other requirements.

In another application, current settlement and reconciliation for Syndication involves point-to-point exchanges that are prone to errors, omissions and fraud. Interposing secure and private data Services would thus directly benefit accounting, auditing, etc in a manner that facilitates selective disclosure so that a trustworthy entity stays reliable, and suitable regulators (compliance, legal) or mediator (conflict resolution, etc.) can be allowed to selectively peek at XML tags in order to build confidence in the transactions. The advantage of trusted XML is that the payloads can encode proprietary formats between participants that the storing party does not need to know about or even try to understand. The layers of trusted wrappers thus add significant technical and business value along with legal and compliance value and sovereign entity value.

In another application, health care system integration is onerous due to (a) disparate incompatible legacy systems, and (b) more important—loss of stickiness of patients to existing solution providers. By introducing cloud data services as the Clearing House, and trusted XML as the interchange format, these existing solution providers can consider this as an avenue to retain that stickiness while also leveraging the universal format facilitated by XML.

We described how our approach of using "routers" ("gateways/guardians") that are FTO-enabled and leveraging Trusted XML is that (a) routers can do their thing without needing to learn more than necessary for routing, (b) routers have fewer degrees of freedom for errors or bad behavior, (c) due to the late binding, complex key management is eliminated.

In addition, tags can be added or augmented or additional metadata can be applied to XML documents to indicate that the contents are of various levels of sensitivity. For example, a document may exist that has Public, Secret and Top Secret paragraphs. A person performing a search and requesting access with a Secret clearance would only get access to Public and Secret paragraphs, for instance. A paragraph's classification could also be used to determine the encryption mechanism, key and access policy. For example, Top Secret content cannot be accessed from a wireless or remote device.

Similarly, the classification could be used to create a policy on how data could be stored, where it could be store, how long it could be stored. For example, medical data must be backed up once a day using AES 256 encryption to a secure server in a trustworthy datacenter.

Figure 20:
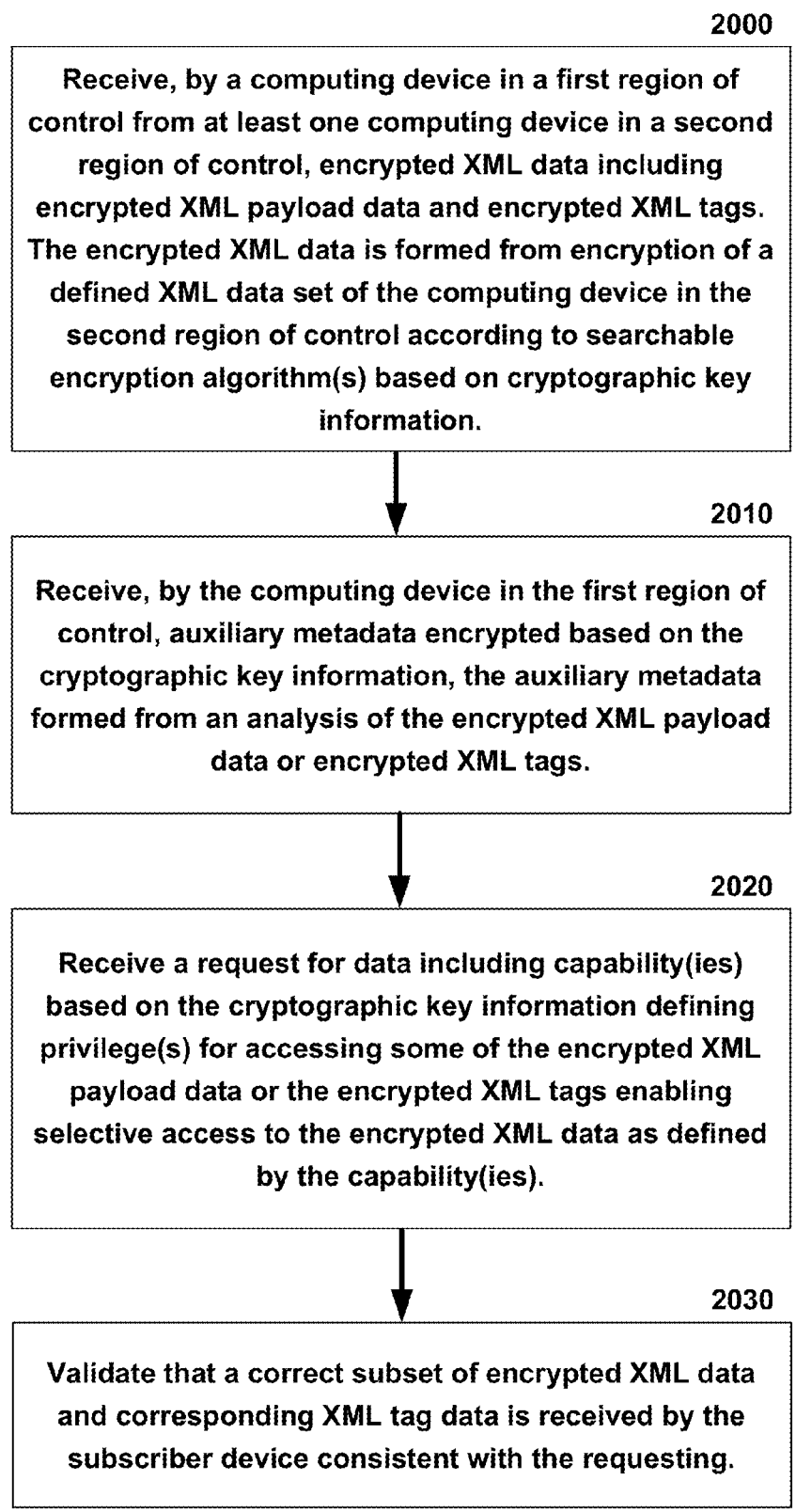
FIGS. 20-23 are flow diagrams illustrating exemplary processes for trusted XML in various embodiments.

FIG. 20 is a flow diagram illustrating an exemplary process for hosting trusted XML in an embodiment. At 2000, a computing device in a first region of control receives from a computing device in a second region of control encrypted XML data including encrypted XML payload data and encrypted XML tags. The encrypted XML data is formed from encryption of a defined XML data set of the computing device in the second region of control according to searchable encryption algorithm(s) based on cryptographic key information. At 2010, auxiliary metadata encrypted based on the cryptographic key information is received where the auxiliary metadata formed from an analysis of the encrypted XML payload data or encrypted XML tags. At 2020, a request for data including capability(ies) is received based on the cryptographic key information defining privilege(s) for accessing some of the encrypted XML payload data or the encrypted XML tags enabling selective access to the encrypted XML data as defined by the capability(ies). At 2030, optionally, it is validated that a correct subset of encrypted XML data and corresponding XML tag data is received by the subscriber device consistent with the requesting.

Figure 21:
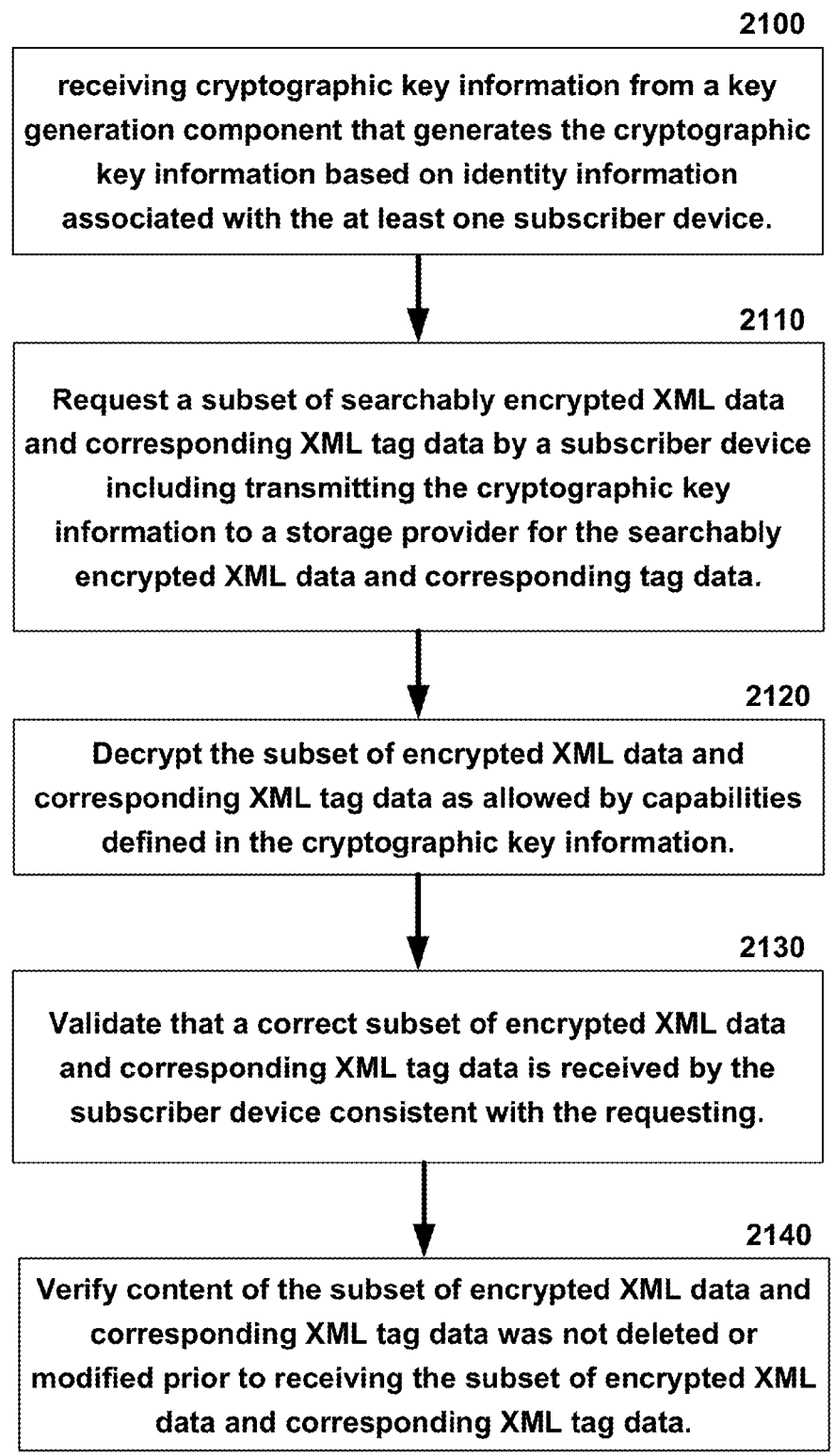

FIG. 21 is a flow diagram illustrating an exemplary process for hosting trusted XML in an embodiment. At 2100, cryptographic key information is received from a key generation component that generates the cryptographic key information based on identity information associated with the subscriber device. At 2110, a subset of searchably encrypted XML data and corresponding XML tag data is requested by a subscriber device. The cryptographic key information is transmitted to a storage provider for the searchably encrypted XML data and corresponding tag data. At 2120, the subset of encrypted XML data and corresponding XML tag data is decrypted as allowed by capabilities defined in the cryptographic key information. At 2130, it is validated that the that a correct subset of encrypted XML data and corresponding XML tag data is received by the subscriber device consistent with the requesting. At 2140, it is verified that the content of the subset of encrypted XML data and corresponding XML tag data was not deleted or modified prior to receiving the subset of encrypted XML data and corresponding XML tag data.

Figure 22:
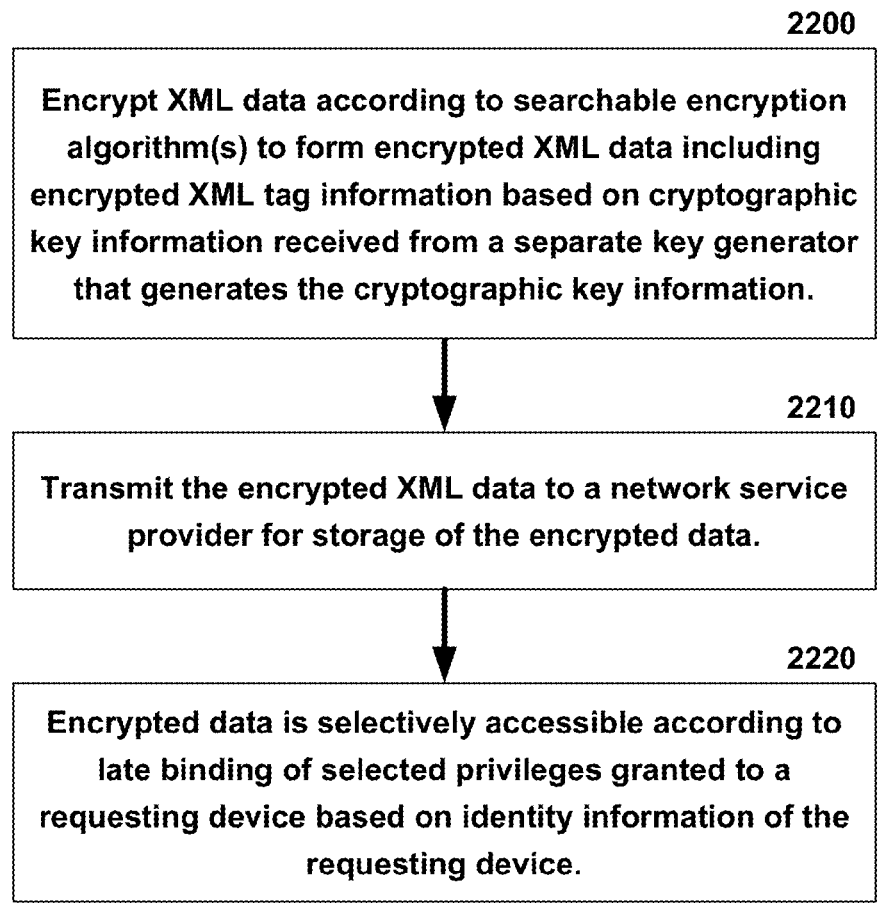

FIG. 22 is a flow diagram illustrating an exemplary process for hosting trusted XML in an embodiment. At 2200, XML data is encrypted according to searchable encryption algorithm(s) to form encrypted XML data including encrypted XML tag information based on cryptographic key information received from a separate key generator that generates the cryptographic key information. At 2210, the encrypted XML data is transmitted to a network service provider for storage of the encrypted data. At 2220, the encrypted data is selectively accessible according to late binding of selected privileges granted to a requesting device based on identity information of the requesting device.

Figure 23:
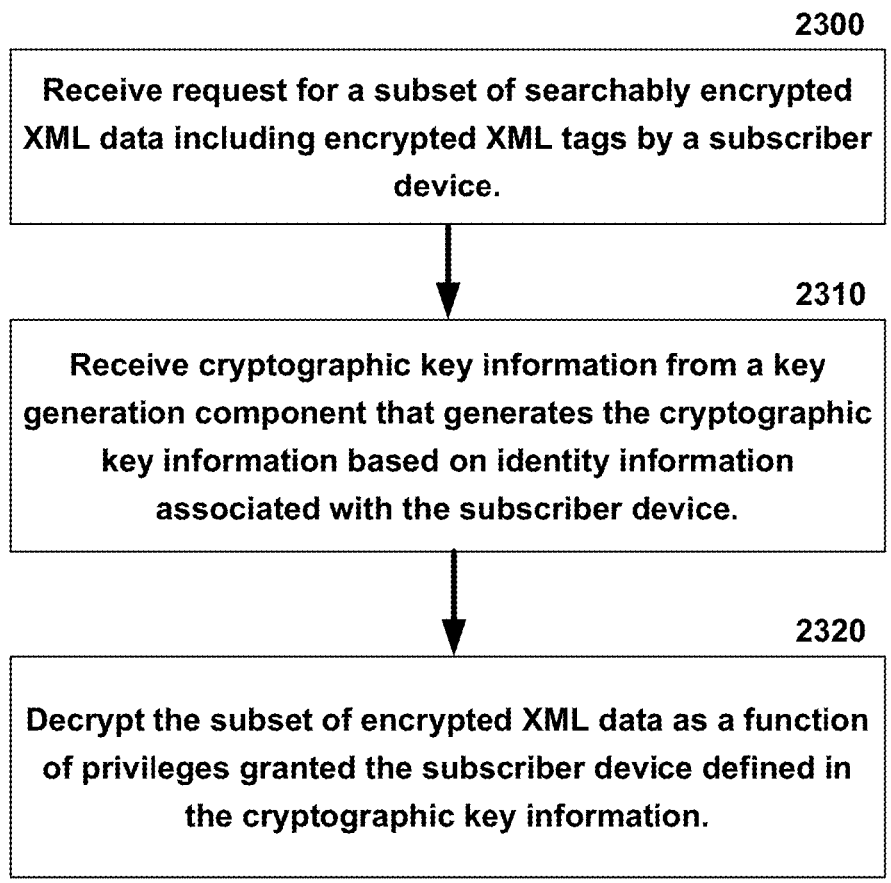

FIG. 23 is a flow diagram illustrating an exemplary process for hosting trusted XML in an embodiment. At 2300, a request for a subset of searchably encrypted XML data including encrypted XML tags is made by a subscriber device. At 2310, cryptographic key information is received from a key generation component that generates the cryptographic key information based on identity information associated with the subscriber device. At 2320, the subset of encrypted XML data is decrypted as a function of privileges granted the subscriber device defined in the cryptographic key information.

Various additional embodiments and detail regarding a federated trust overlay architecture as described for containerless data is provided below for supplemental context.

Supplemental Context for Trustworthy Cloud Services Ecosystem

As described above, independent data protection and cryptographic techniques are variously combined to enhance privacy, trust and security concerning data, e.g., stored as a data, at a remote site, such as maintained by a CSP. While a general ecosystem is described below in the context of a general data or network service, such general data or network service can be used to for any one or more of the above-described scenarios for storing data at a remote site.

A digital escrow pattern is provided for network data services including searchable encryption techniques for data stored in a cloud, distributing trust across multiple entities to avoid compromise by a single entity. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests.

With respect to the searchable encryption/decryption algorithm(s), a searchable public key encryption (PEKS) scheme implemented by one or more cryptographic technology providers generates, for any given message W, a trapdoor TW, such that TW allows a check of whether a given ciphertext is an encryption of W or not, where TW does not reveal any additional information about the plaintext. In accordance with various embodiments described below, PEKS schemes can be used to prioritize or filter encrypted data, such as encrypted messages, based on keywords contained in the data, e.g., the message text, though the use of PEKS is pedagogic in that encryption technologies are diverse and continually evolving. Accordingly, other encryption technologies are also applicable depending on the scenario under consideration and the encryption tradeoffs involved (complexity, speed, compression, etc.). A data recipient can thus be given selected access to parts of the encrypted data relating to keyword(s) by releasing the capabilities (sometimes called "trapdoors" by cryptographers) for the corresponding keyword(s). This way, the encrypted data can be checked for these keywords, but there is assurance that nothing more will be learned from a subscriber than the subscriber's capabilities allow.

For the avoidance of doubt, while PEKS is disclosed as an algorithm for implementing searchable encryption in one or more embodiments herein, it can be appreciated that a variety of alternative algorithms exist for achieving searchable encryption. Some exemplary non-limiting alternatives to PEKS, for instance, include Oblivious RAMs. Thus, the terminology "Searchable Encryption" as used herein should not be limited to any one technique and thus refers to a wide range of encryption mechanisms or combination of encryption mechanisms that allow selective access of a subset of encrypted data based on search or query functionality over the encrypted data.

Optionally, validation and/or verification of results can be provided as an additional benefit to subscribers and publishers of data in the ecosystem. Validation provides a way of validating that the items of data received as a result of a subscription request for a subset of data is the correct set of items, i.e., that the correct subset of data that should have been received was in fact received. A technique in the cryptographic arts is proof(s) of data possession (PDP); however, for the avoidance of doubt, PDP is just an example algorithm that can be implemented and that others that achieve the same or similar objectives can be used. Provable or Proof(s) of Data Possession is a topic about how to frequently, efficiently and securely verify that a storage server is faithfully storing its client's potentially large outsourced data. The storage server is assumed to be untrusted in terms of both security and reliability.

Verification of results provides an additional mechanism for checking that the contents of the items themselves, i.e., to ensure that the items received in connection with the subscription request were not tampered with by any unauthorized entity. An example of verification in the cryptographic arts is proof(s) of data possession (PDP); however, for the avoidance of doubt, PDP is just an example algorithm that can be implemented and that others that achieve the same or similar objectives can be used. Another technique known in the cryptographic arts is proof(s) of retrievability (POR); however, for the avoidance of doubt, POR is just an example algorithm that can be implemented and that others that achieve the same or similar objectives can be used. A POR is a compact proof by a service provider or data hoster (prover) to a client (verifier) that a target file F is intact, in the sense that the client can fully recover file F, and that no tampering has occurred.

As an additional option, the ecosystem can implement notions of anonymous credentials, whereby publishers can upload information about themselves in an anonymous way without exposing critical details, and subscribers can be limited by their capabilities so that they cannot be exposed or provided access to critical details uploaded by a publisher. In this way, a publisher or subscriber can interact with the system while exposing only as much information as they wish to third parties.

Conventional web services have been limited to static client server arrangements and statically defined user policy for accessing data of the web service. However, when many publishers and subscribers are contemplated according to constantly changing and evolving complex business and other relationships, such conventional web services model fail to be flexible or secure enough. Accordingly, in various embodiments, late binding is enabled such that publishers and/or owners of data and content can change access privileges to encrypted content based on who the subscriber(s) are, based on their capability(ies) and based on what they are looking for, e.g., based on the keyword(s) employed in a request for data. Thus, what a subscriber can selectively access changes dynamically consistent with changes to the access privileges by the publishers and/or owners, since subscriber capabilities are encoded in the key information provided by the key generator on the fly. Thus, subscriber privileges are defined for a given request at the time of key generation for the request, and thus always reflect current policy with respect to request from the subscriber.

Similarly, an administrator of a server of a trustworthy cloud service can be permitted to observe the log of activity and data transactions handled by the server, but can also be restricted from seeing any customer names or credit card information. The identity of the subscriber can thus be the basis for limiting the kind of data the subscriber can access.

Various non-limiting embodiments of a trustworthy ecosystem are presented herein in the context of building trust for a cloud service; however, the trust building of the ecosystem provided herein is much more general, and not limited to application to cloud services. Rather, the embodiments described herein are similarly applicable to different servers or participants within enterprise data centers. Thus, while the data may never leave a given entity, the techniques for building trust as described herein are equally applicable where different processes within an enterprise operate within separate regions of control. Without visibility across all enterprise processes, similar mistrust issues can develop as if the participants were external to the enterprise. For instance, a Server could be breached within the enterprise, even though it is in the control of the administrator, or the administrator could be careless or malicious.

In addition to applying to encrypted data in the cloud, the various techniques of the subject disclosure can also apply to data stored on a laptop or other portable device, since the laptop may be lost or stolen. In such a case, the device could end up in the possession of an overly curious or malicious entity; however, the same techniques described herein that apply to protecting data in the cloud can also be applied to protect data on servers or laptops. If the local data is encrypted, without proper subscriber credentials, a thief will not be able to understand the local encrypted data being able to show no proper role or capabilities to access the data.

Figure 24:
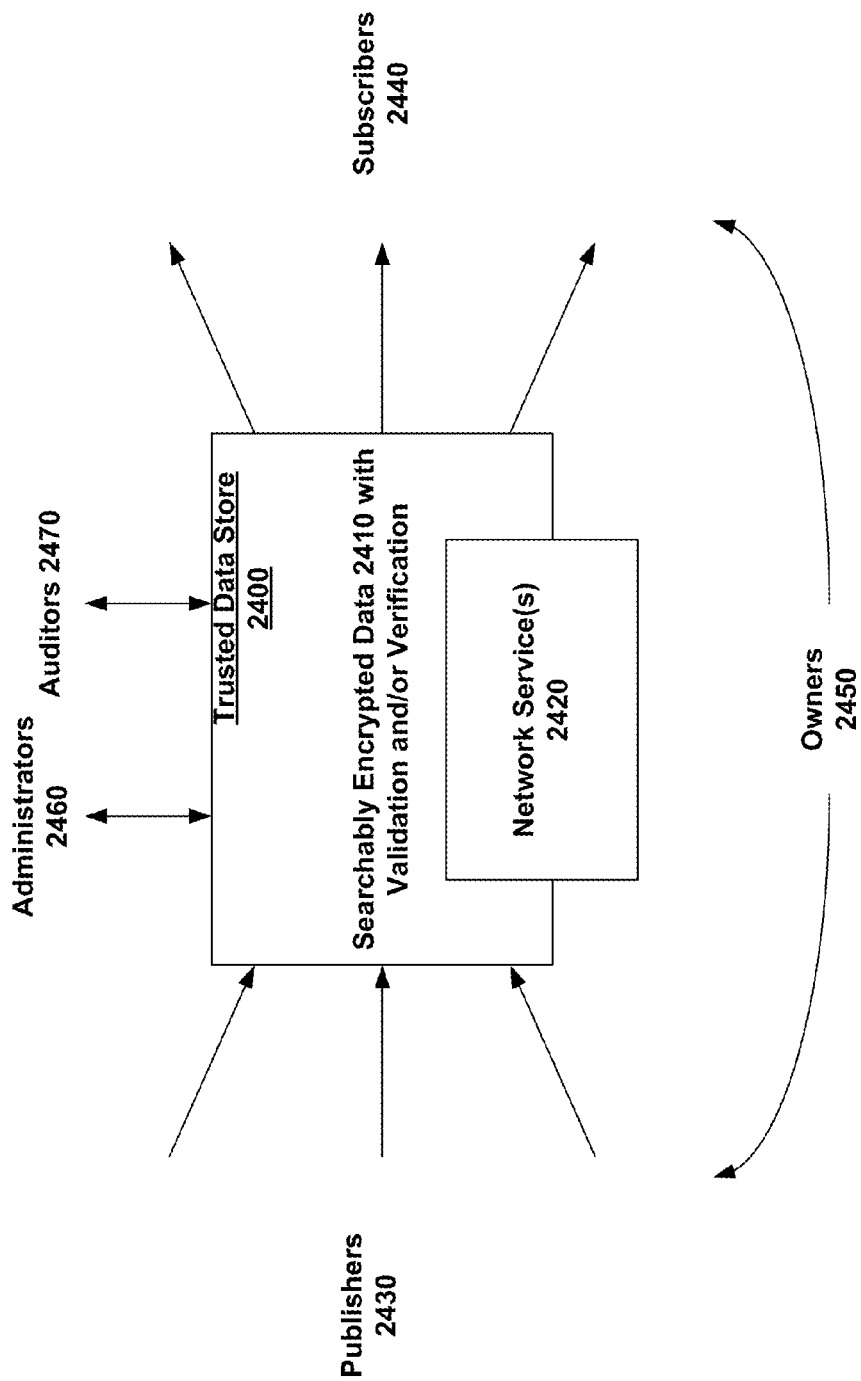
FIG. 24 is a block diagram of a trustworthy cloud services framework or ecosystem in accordance with an embodiment.

FIG. 24 is a block diagram of a trustworthy cloud services framework or ecosystem in accordance with an embodiment. The system includes a trustworthy data store 2400 for storing searchably encrypted data 2410 with the results of subscriber requests being subject to validation and/or verification. In this regard, network services 2420 can be built on top of the secure data 2410 such that the publishers of the data retain control over the capabilities granted to subscribers 2440 who request the data, e.g., via network service(s) 2420. Publishers 2430 can also be subscribers 2440, and vice versa, and owners 2450 of the data can be either publishers 2430 and/or subscribers 2440 as well. As an example of some common roles and corresponding sets of capabilities that can be defined, a specialized kind of publishers 2430 and subscribers 2440 are administrators 2460 and auditors 2470.

For instance, administrators 2460 can be a specialized set of permissions over data 2410 to help maintain the operation of trustworthy data store 2400, and auditor entities 2470 can help maintain the integrity of certain data within scope of the audit. For instance, an auditor 2470 could subscribe to messages of data 2410 containing offensive keywords in which case the auditor 2470, if permitted according to capabilities granted, would be alerted when messages of data 2410 contained such offensive keywords, but unable to read other messages. In this regard, a myriad of scenarios can be built based on the ability to place publisher data into digital escrow such that keys can be handed out enabling selective access to that data.

For instance, a publisher authenticates to the ecosystem and indicates a set of documents to upload to the ecosystem. The documents are encrypted according to a searchable encryption algorithm based on cryptographic key information received from a separate key generator that generates the cryptographic key information. Then, the encrypted data is transmitted to a network service provider for storage of the encrypted data such that the encrypted data is selectively accessible according to late binding of selected privileges granted to a requesting device based on identity information of the requesting device. Separating the cryptographic technology provider from the storage of the encrypted data additionally insulates the encrypted data from further compromise.

Figure 25:
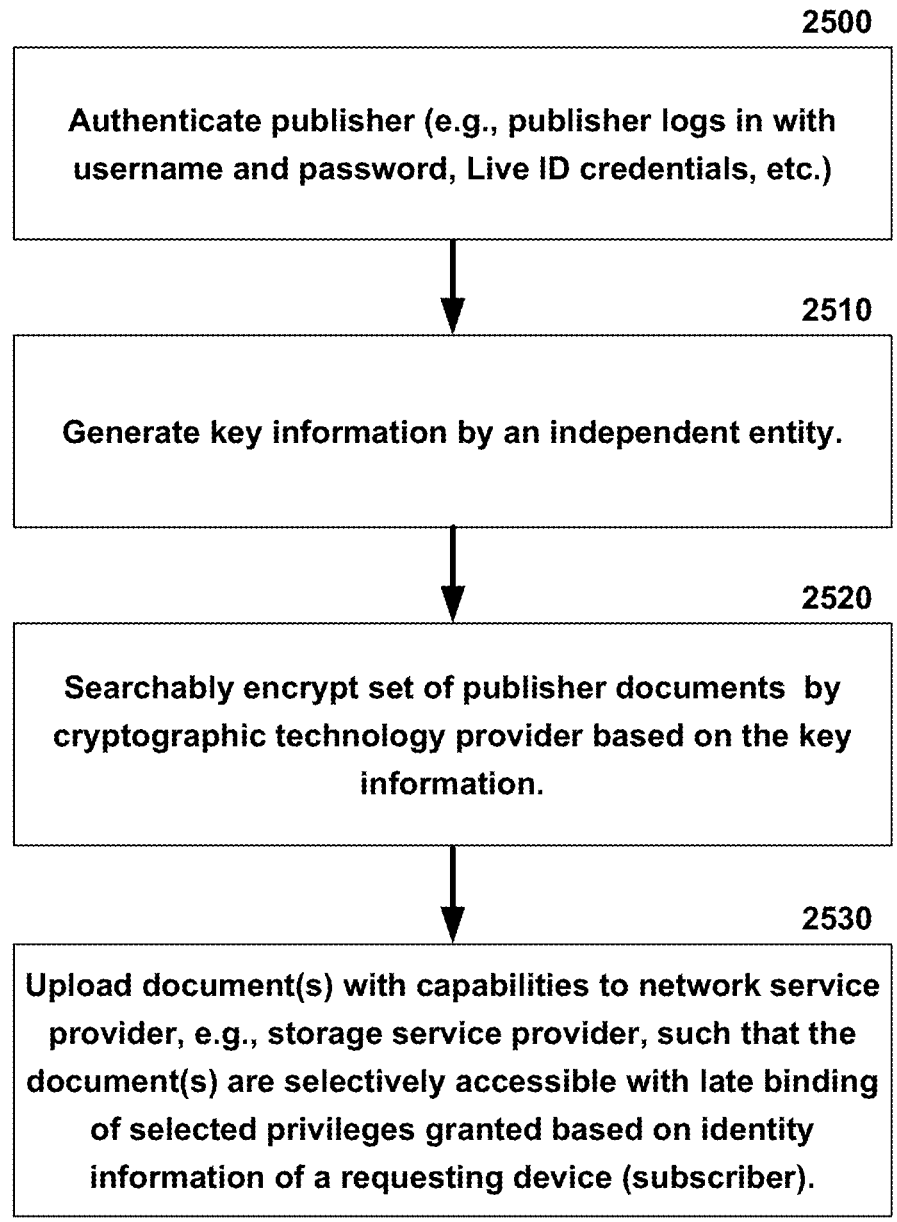
FIG. 25 is a flow diagram illustrating an exemplary non-limiting method for publishing data according to the trustworthy cloud services ecosystem.

In this regard, FIG. 25 is a flow diagram illustrating an exemplary non-limiting method for publishing data according to the trustworthy cloud services ecosystem. At 2500, a publisher authenticates to the system (e.g., publisher logs in with username and password, Live ID credentials, etc.). At 2510, key information is generated by key generator, such as a center for key generation as described in one or more embodiments below. At 2520, a separate cryptographic technology provider encrypts a set of publisher documents based on the key information. At 2530, the encrypted documents are uploaded with capabilities to network service provider, e.g., storage service provider, such that the encrypted document(s) are selectively accessible with late binding of selected privileges granted based on identity information of a requesting device (subscriber).

On the subscriber side, for example, a subscriber authenticates to the ecosystem and indicates a request for a subset of data, e.g., a query for a subset of documents containing a given keyword or set of keywords. In response to a request for a subset of searchably encrypted data from at least one subscriber device, a key generation component generates cryptographic key information based on identity information associated with the subscriber device. Then, the subset of encrypted data is decrypted as a function of privileges granted the subscriber device as defined in the cryptographic key information.

Figure 26:
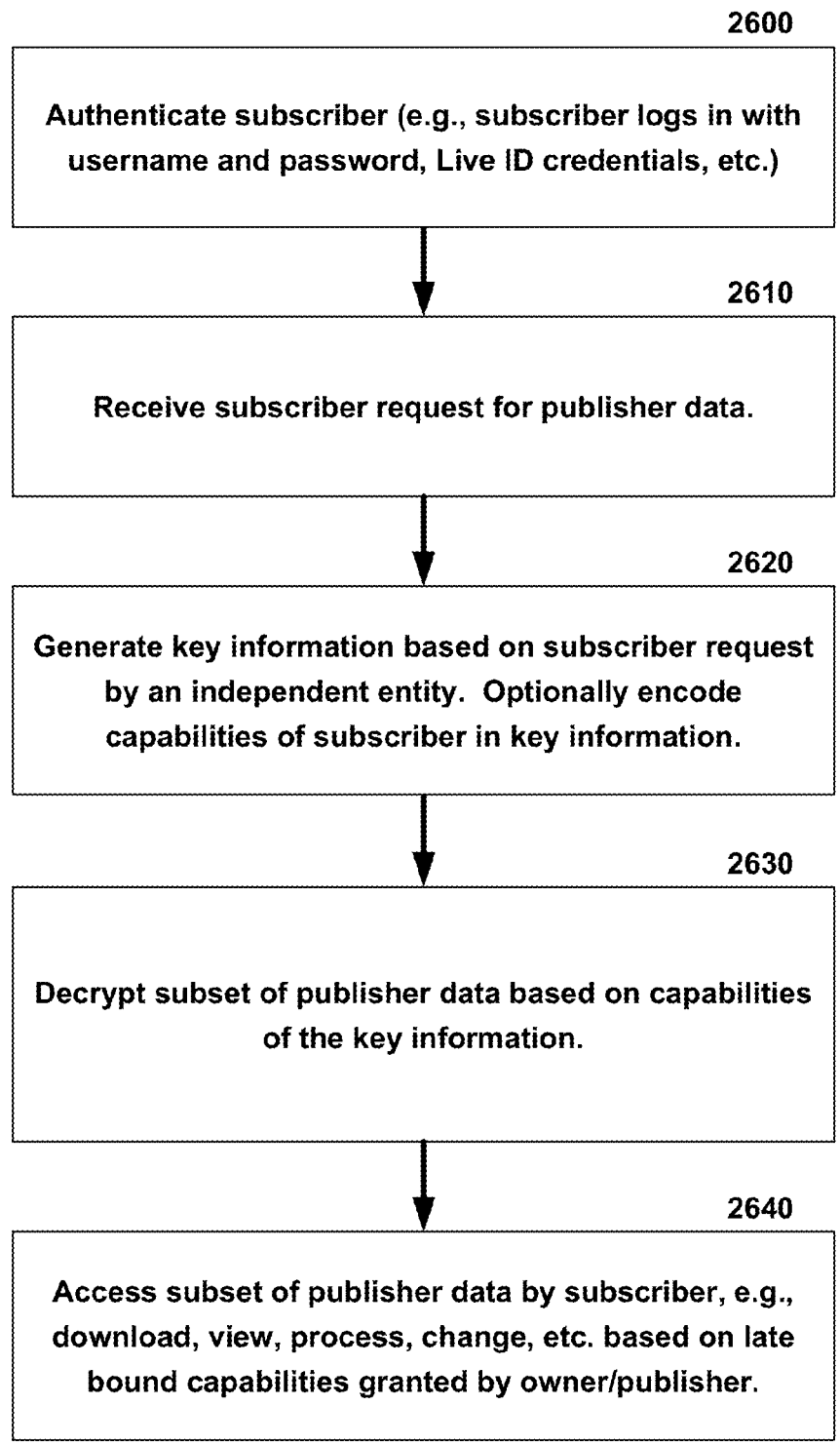
FIG. 26 is a flow diagram illustrating an exemplary non-limiting method for subscribing to data according to the trustworthy cloud services ecosystem.

FIG. 26 is a flow diagram illustrating an exemplary non-limiting method for subscribing to data according to the trustworthy cloud services ecosystem. At 2600, a method for subscribing to data includes authenticating a subscriber (e.g., subscriber logs in with username and password, Live ID credentials, etc.). At 2610, a subscriber makes a request for data. At 2620, key information is generated by an independent key generation entity based on the subscriber request, where the capabilities of the subscriber can be defined in the key information. At 2630, a subset of publisher data is decrypted based on the capabilities defined in the key information. For instance, the CSP can decrypt the data. At 2640, the subset of publisher data is made accessible to the subscriber, e.g., the subscriber can download, view, process, change, etc. the data based on the dynamically definable capabilities granted by owner/publisher. Optionally, the technology used for encryption, decryption and key generation can be supplied by a separate cryptographic technology provider, but hosted by any participant.

In one embodiment, the identity information of the subscriber device includes a role of the subscriber. For instance, an auditor role, or administrator role, or other pre-specified role can be used by publishers/owners as a basis for restricting or granting access to various portions of the searchably encrypted data store.

Figure 27:
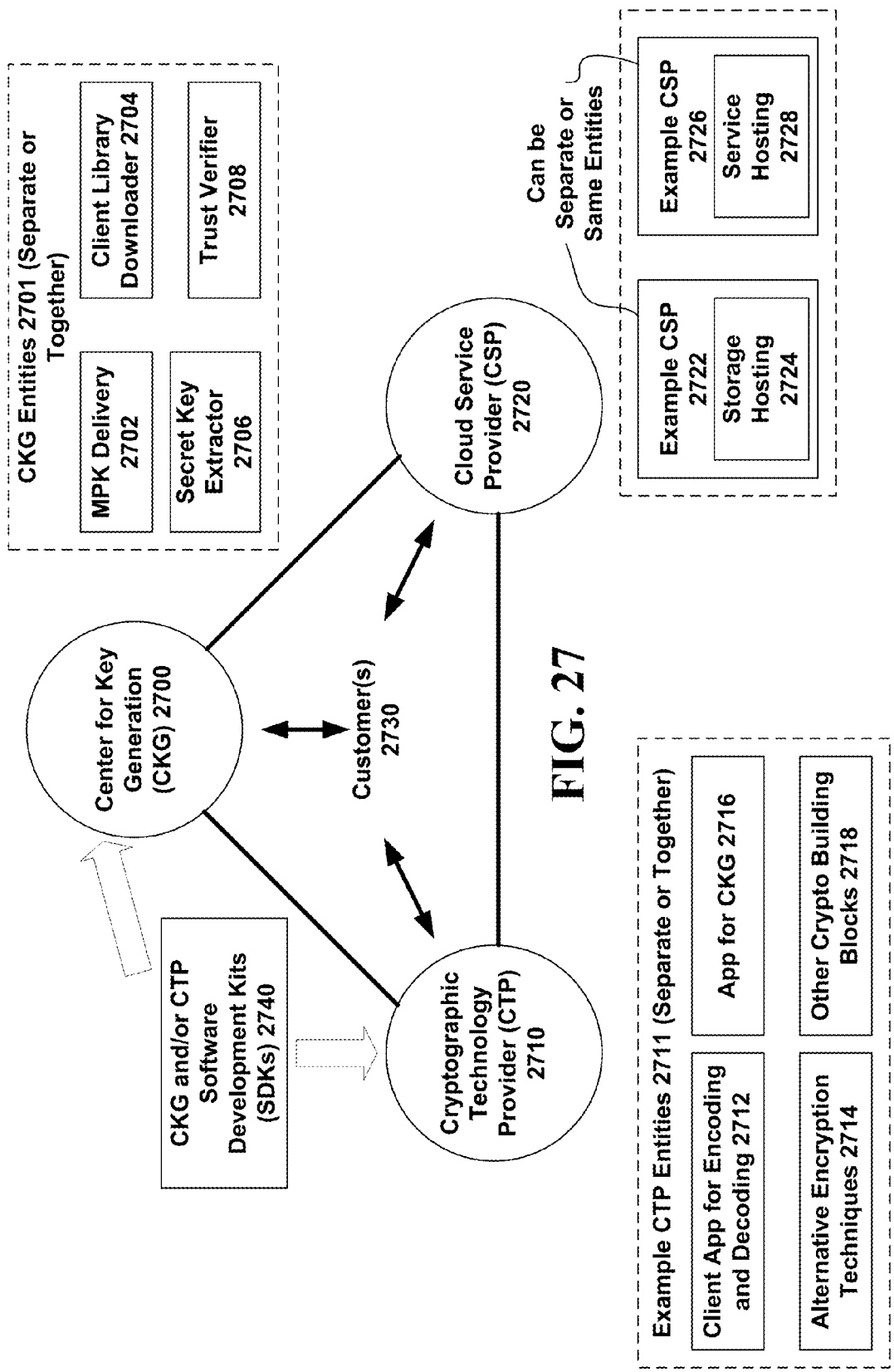
FIG. 27 illustrates an exemplary ecosystem showing the separation of center for key generation (CKG), cryptographic technology provider (CTP) and cloud service provider (CSP) in a trustworthy ecosystem.

FIG. 27 illustrates an exemplary ecosystem showing the separation of center for key generation (CKG) 2700, cryptographic technology provider (CTP) 2710 and cloud service provider (CSP) 2720 thereby eliminating the possibility of compromise by a single entity in the trustworthy ecosystem. In this regard, customer(s) 2730 include publishers and/or subscribers of data. Optionally, CKG 2700 can be built based on reference software, open source software, and/or a software development kit (SDK), e.g., provided by CTP 2710, enabling the building blocks for parties to create such components by themselves, or be satisfied by third party implementations of such ecosystem components. In one embodiment, the SDK is provided by the CTP 2710, and can be used by one or more participants to host or implement CKG 2700, a compute and storage abstraction (CSA) described in more detail below and/or cryptographic client libraries. Optionally, the SDK can be distributed to the entity hosting the CKG 2700 from CTP 2710.

In general, each of CKG 2700, CTP 2710 or CSP 2720 can be subdivided into subcomponents depending on a given implementation, however, the overall separation is preserved to maintain trust. For instance, CKG entities 2701, such as master public key (MPK) delivery 2702, client library downloader 2704, secret key extractor 2706, trust verifier 2708, or other subcomponents, can be provided separately, in subsets, or together as an integrated component. CTP entities 2711, such as client app for encoding and decoding 2712, alternative encryption techniques 2714, an application for interfacing with the CKG 2716, other crypto building blocks 2718, etc., can also be provided separately, in subsets or together. Moreover, CSP 2720 can be thought of as many separate service providers, such as CSPs 2722, 2726 hosting storage service 2724 and service hosting 2728, respectively, or such services can be provided together.

It can be appreciated that the CKG, or CKG instance(s) hosted by one or more participants in the trustworthy ecosystem, is not required to be a single monolithic entity. Rather, the CKG can be separated into a number of (redundant) entities that cooperate to generate keys, so that operation can continue even if a small subset of the participants are offline. In one embodiment, optionally, a set of participants can be trusted in aggregate even if a small subset of these participants have been compromised by an adversary, or otherwise become unavailable or untrusted.

Figure 28:
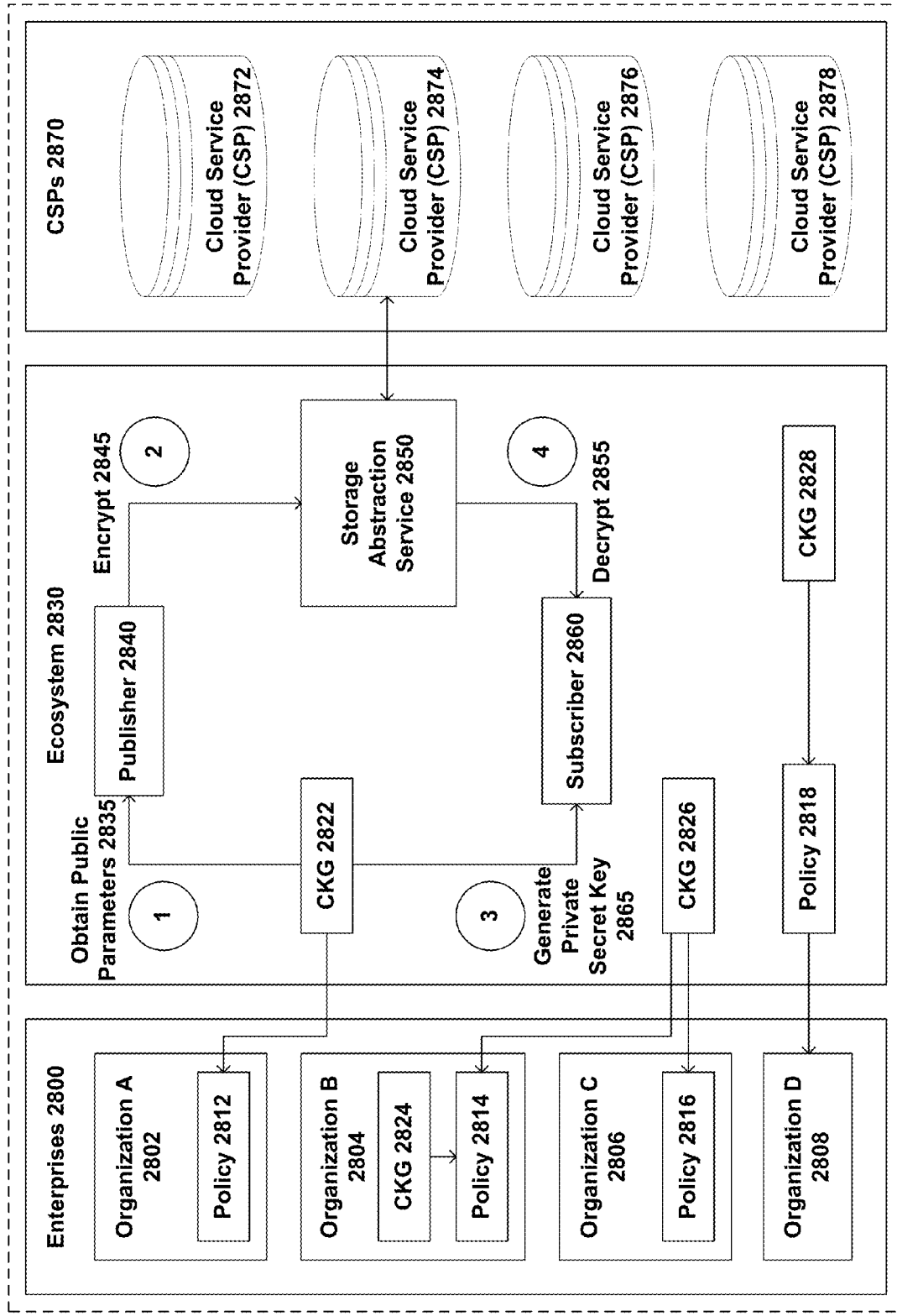
FIG. 28 is another architectural diagram illustrating further benefits of a trustworthy ecosystem for performing cloud services for enterprises.

FIG. 28 is another architectural diagram illustrating further benefits of a trustworthy ecosystem for performing cloud services for enterprises 2800. For instance, enterprises 2800 can include different organizations 2802, 2804, 2806, 2808. The different organizations 2802, 2804, 2806, 2808 in this diagram illustrate that organizations can take on as much or as little ownership with respect to implementing policy for using the system, or key generation. For instance, organization 2802 implements its own policy 2812, but uses a centralized key generator 2822 whereas organization 2804 chooses to implement its own key generator 2824 and implement its own policy 2814. Organization 2806 also implements its own policy but relies on a third part CKG 2826 whereas organization 2808 chooses to rely on a third party policy provider 2818 and an independent CKG 2828.

In this regard, to publish data, a publisher 2840 obtains public parameters for encrypting data 2835 based on the output from CKG 2822. Based on the public parameters, the data is encrypted by the publisher device 2840 at 2845 using an independent cryptographic technology provider. The encrypted data is uploaded to a storage abstraction service 2850, which hides the storage semantics in connection with storing the encrypted data by one or more CSPs 2870, such as CSPs 2872, 2874, 2876, or 2878. On the subscriber device 2860, a request for data results in the generation of a private secret key 2865 from CKG 2822. The private secret key 2865 includes information that enables the subscriber device 2860 to selectively access the searchably encrypted data by decrypting the data at 2855. Again, the semantics of retrieving the data from CSPs 2870 is hidden by the storage abstraction service 2850. Also, the privileges granted to the subscriber device 2860 are the current set of privileges due to late binding of capabilities granted by publishers/owners.

It can be appreciated from FIG. 28 that multiple data owners, either enterprises or consumers, can participate in a trustworthy ecosystem as described herein to establish trusted relationships. In such case, each owner can host, or control their own CKG (e.g., CKG 2824 of organization 2804) so that requests or queries for data are forwarded to the corresponding CKGs to gather the necessary keys from all co-owners of the requested data.

Figure 29:
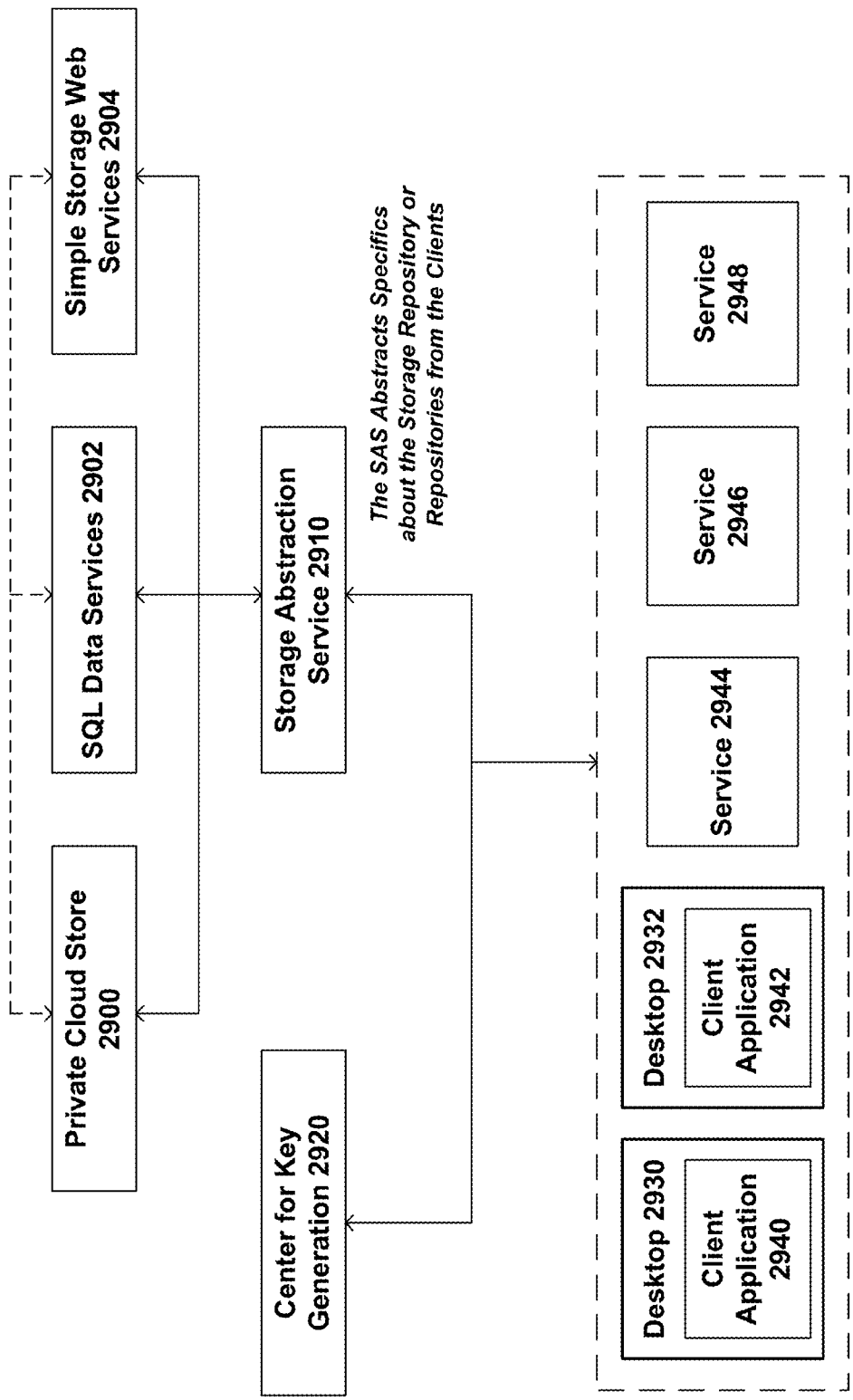
FIG. 29 is another block diagram illustrating the accommodation of different storage providers via a storage abstraction layer.

FIG. 29 is another block diagram illustrating the accommodation of different storage providers via a storage abstraction layer 2910. With the trustworthy ecosystem, desktops 2930, 2932 having client applications 2940, 2942, respectively, may publish or subscribe to data as described above, initiating a request to the center for key generation 2920 for key information for use in encrypting or decrypting data. Similarly, services 2944, 2946, 2948 might also be a publisher and/or a subscriber in the ecosystem. In this regard, to make the storage or extraction of data by any of a private cloud store 2900, SQL data services store 2902, or simple storage web service 2904, etc., the storage abstraction service 2910, as the name implies, abstracts the specifics about the particular storage repository or repositories away from the clients.

In this regard, for the avoidance of doubt, FIG. 29 is directed to multiple situations. In one situation, FIG. 29 covers the disintermediation of storage providers (abstracting them out as individuals) through the Storage Abstraction Service, also referred to sometimes as the Compute and Storage Abstraction (CSA). In addition, FIG. 29 covers scenarios where data is segmented and/or fanned out (e.g., for redundancy) to multiple back-end storage providers, which can be of the same or different type, such that the original data can be reconstituted even is one (or a small number) of the back-end Storage Providers accidentally or intentionally delete or alter their copies of the data.

Figure 30:
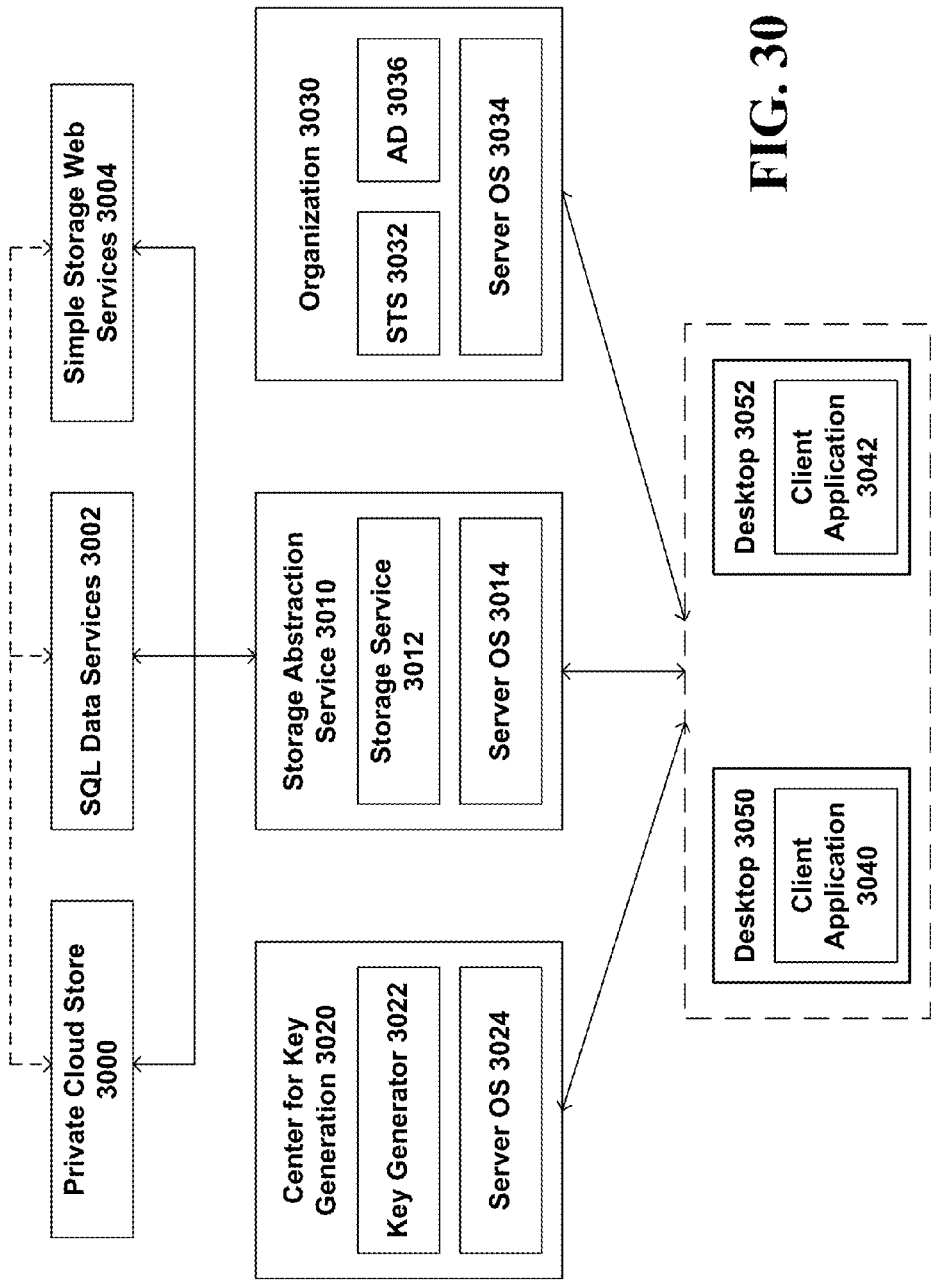
FIG. 30 illustrates further aspects of storage in connection with a storage abstraction service.

FIG. 30 illustrates further aspects of storage in connection with a storage abstraction service 3010 including server operating system (OS) 3014 and a storage service 3012 that abstracts the details of storage of private cloud store 3000, SQL data store 3002, simple storage web service store 3004, etc. The clients can be desktops 3050 or 3052 having client applications 3040 and 3042, respectively. The center for key generation 3020 can include a key generator application 3022 executing on server OS 3024. In this regard, an organization 3030 having active directory 3036, server OS 3034 and security token service (STS) 3032 can be a publisher or subscriber in the ecosystem. In this regard, storage transfer format (STF) is a standard interchange format that can be used for exchanging encrypted data and metadata across repositories. For instance, organization 3030 may wish to transfer e-mail data among storage service providers 3000, 3002 or 3004 in which case STF can be used.

Figure 31:
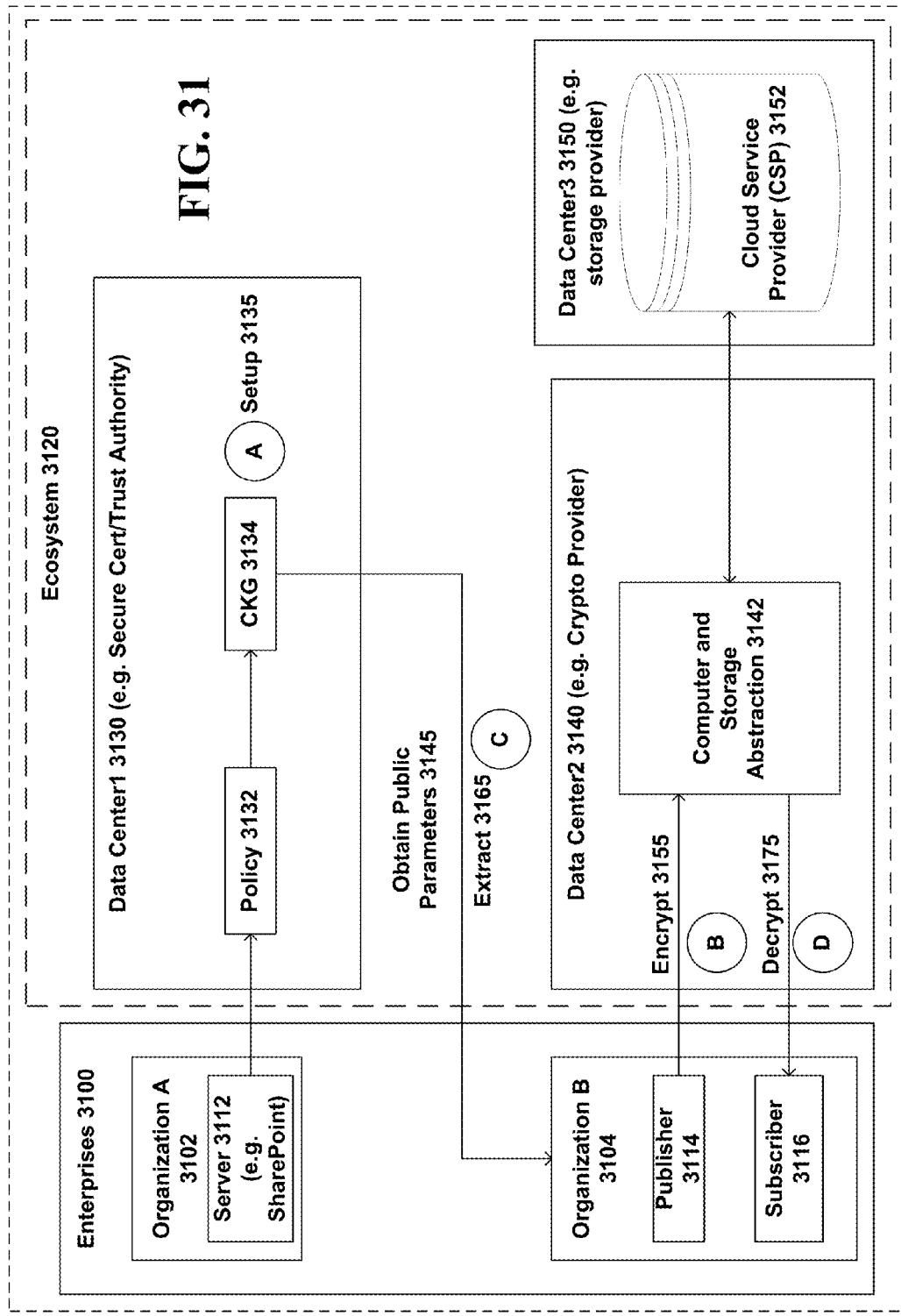
FIG. 31 is another block diagram illustrating various different participants in a trustworthy ecosystem.

FIG. 31 is another block diagram illustrating various different participants in a trustworthy ecosystem 3120. As mentioned, advantageously, enterprises 3100 can offload the storage and maintenance of volumes of data from on-site to cloud storage service providers better suited to handling such volumes while at the same time maintaining comfort that the data will not be decrypted to the wrong subscribers since the enterprise maintains control over capabilities defined over the encrypted data. For instance, an organization 3102 may operate a collaborative application 3112 such as Sharepoint. In this regard, organization 3102 may set up a digital escrow, or trusted domain, for the sharepoint data. The policy 3132 and CKG 3134 can be implemented by a first data center 3130, which operates to setup the secure space by defining cryptographic key information 3145 for the trusted domain.

Then, another organization 3104, e.g., behaving as a publisher 3114, can encrypt data based on the key information obtained from CKG 3134, at which point computer and storage abstraction component 3142 of a second data center 3140 handles the details of storing the searchably encrypted data at a third data center 3150, e.g., in CSP 3152. On the flip side, when a subscriber 3116 of organization 3104 requests data, private or secret key information is delivered to subscriber 3116 as part of extraction 3165. Next, based on the private key information which includes capabilities defined for the subscriber, data requested by the subscriber is decrypted at 3175 assuming the subscriber has privileges, and again abstraction layer 3142 handles the details of the underlying storage 3152.

Figure 32:
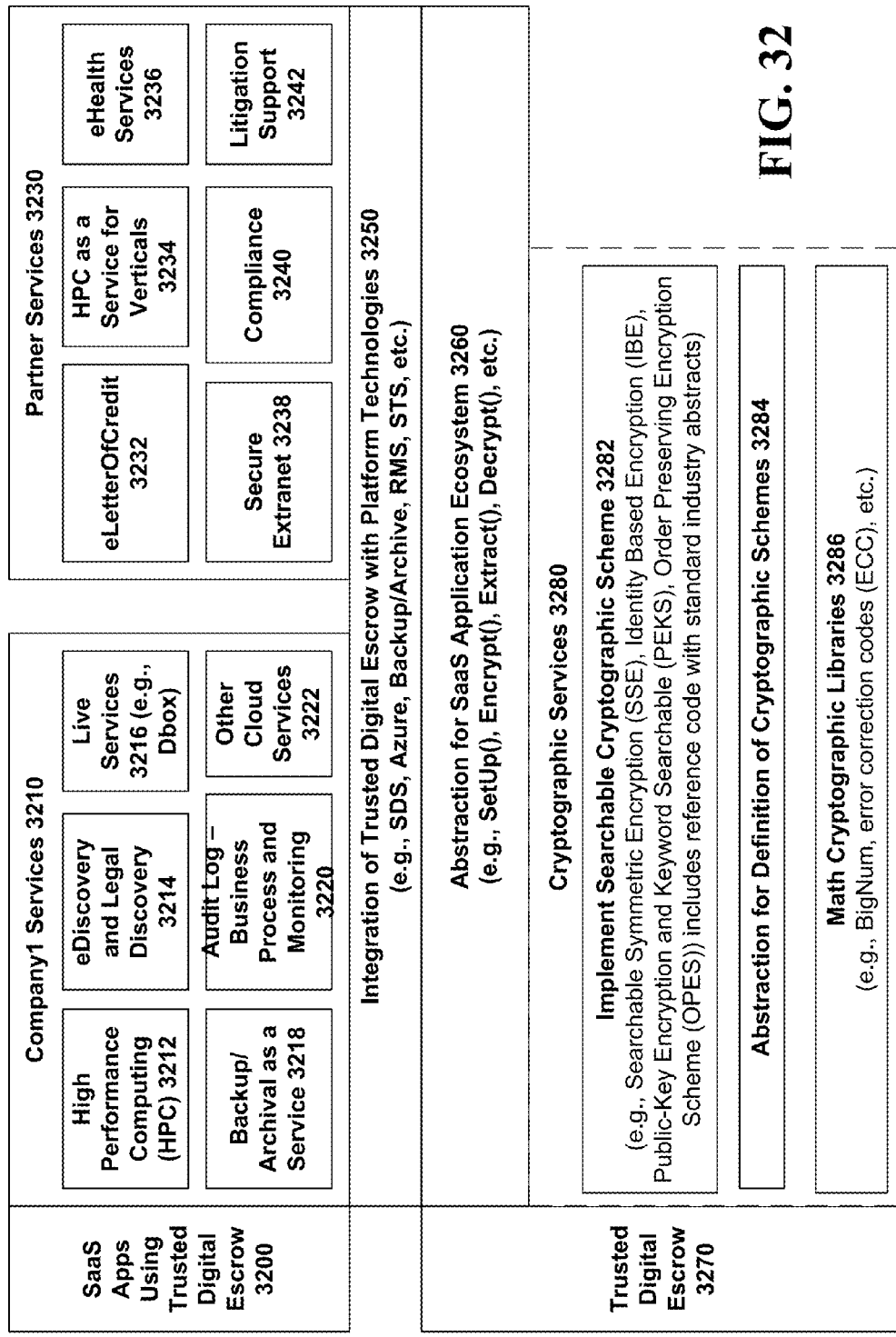
FIG. 32 is a representative view of some layers of an exemplary, non-limiting implementation of a trustworthy cloud computing system in which the different pieces can be provided by different or the same entities.

FIG. 32 is a representative view of some layers of an exemplary, non-limiting implementation of a trustworthy cloud computing system in which the different pieces can be provided by different or the same entities. At the bottom of the layer stack are math and cryptographic libraries 3286 used for implementing the encryption/decryption algorithms. Abstraction of the definitions of various cryptographic schemes can be provided as a middle layer 3284 between the detailed libraries 3286 and the actual implementation of the searchable cryptographic schemes 3282. Together, layers, 3282, 3284 and 3286 form a larger cryptographic services layer 3280, which when combined with an abstraction layer 3260 for the software as a service (SaaS) application ecosystem, form the basis for an implementation of the trusted digital escrow 3270 and storage therefor. The abstraction layer 3260 contains the basic language used to implement the digital escrow pattern, namely commands such as SetUp( ), Encrypt( ), Extract( ), Decrypt( ), etc.).

On top of abstraction layer 3260 is the layer 3250 that ties into various more specific platform technologies (e.g., SDS, Azure, Backup/Archive, RMS, STS, etc.). On top of the layer 3250 that ties into various specific platform technologies are the various SaaS applications that use the trusted digital escrow 3200. The exemplary, non-limiting illustration shows that the digital escrow apps 3200 can be implemented by a single company 3210 or by partners 3230 or by both. For instance, company 3210 may implement services such as high performance computing (HPC), eDiscovery and Legal Discovery 3214, Live Services 3216 (e.g., DBox), backup/archive as a service 3218, audit log—business process and monitoring 3220 or other cloud services 3222. In turn, partners 3230 could implement services such as eLetterOfCredit 3232, HPC as a service for verticals 3234, eHealth services, secure extranet 3238, compliance 3240, litigation support 3242, etc.

Scenarios Based on Trustworthy Cloud Services Ecosystem

Any type of application can be realized in the cloud due to the increased trust inherent in the division of key generator, crypto provider and cloud service provider, and other technique(s) described herein. In this regard, having enabled such a trustworthy cloud services ecosystem, a set of rich services and scenarios can be realized that take advantage of one or more of the benefits of the trustworthy ecosystem described herein.

Figure 33:
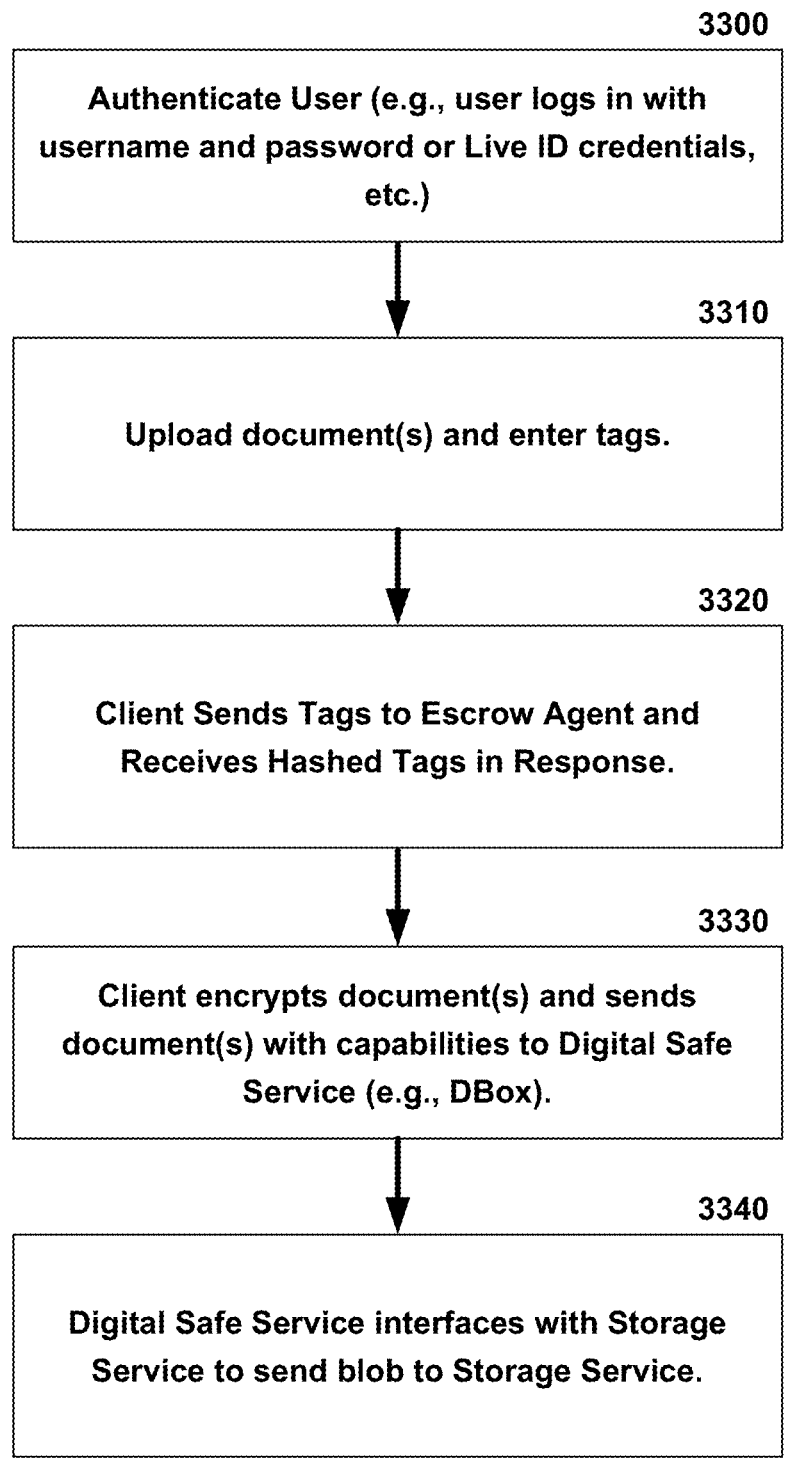
FIG. 33 is a flow diagram of an exemplary non-limiting process for publishing documents to a digital safe application in a way that provides publisher controlled selective access to the data with late binding.

For instance, FIG. 33 is a flow diagram of an exemplary non-limiting process for publishing documents to a digital safe application in a way that provides publisher controlled selective access to the data with late binding as described above. At 3300, a device is authenticates (e.g., the device logs in with a username and password, password credentials, biometric credentials, Live ID credentials, etc.). At 3310, the document(s) are uploaded and tags are entered. The tags are sent to an escrow agent at 3320 and hashed tags are received from the escrow agent in response. In this regard, the tags can be supplied as mentioned, or alternatively can be automatically extracted from the payload (record, document), e.g., through full-text indexing. At 3330, the client encrypts the documents with the publisher's key information and the document(s) are sent to a secure digital cloud storage provider along with capabilities for subscribers with respect to the document(s). At 3340, the secure digital cloud storage provider sends the encrypted blob to a storage service, e.g., vis-à-vis a storage abstraction layer.

Figure 34:
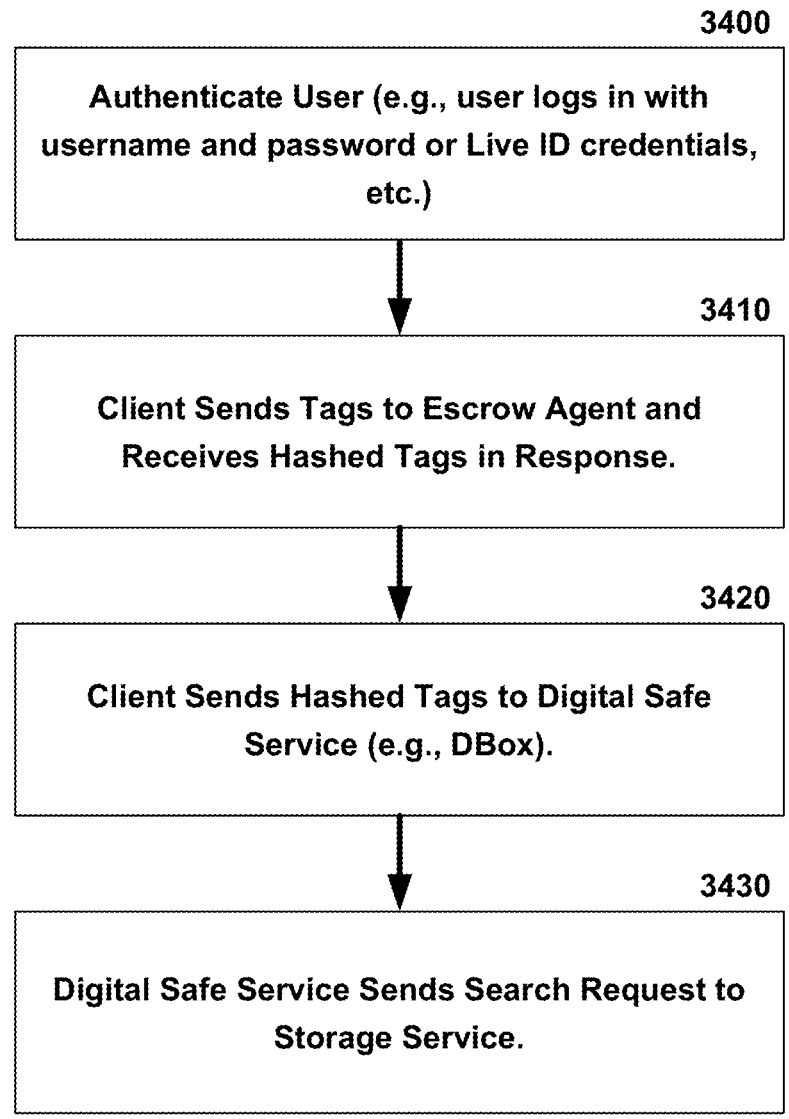
FIG. 34 is a flow diagram of an exemplary, non-limiting process for subscribing to materials placed in the digital safe.

FIG. 34 is a flow diagram of an exemplary, non-limiting process for subscribing to materials placed in the digital safe. At 3400, the subscriber is authenticated and the client device sends tags to an escrow agent who sends back hashed tags in response at 3410. The client then sends the hashed tags to the digital safe service at 3420 and the hashed tags are interpreted to understand whether, at 3430, the client is entitled to have its search request carried out by the storage service, in whole or in part.

Figure 35:
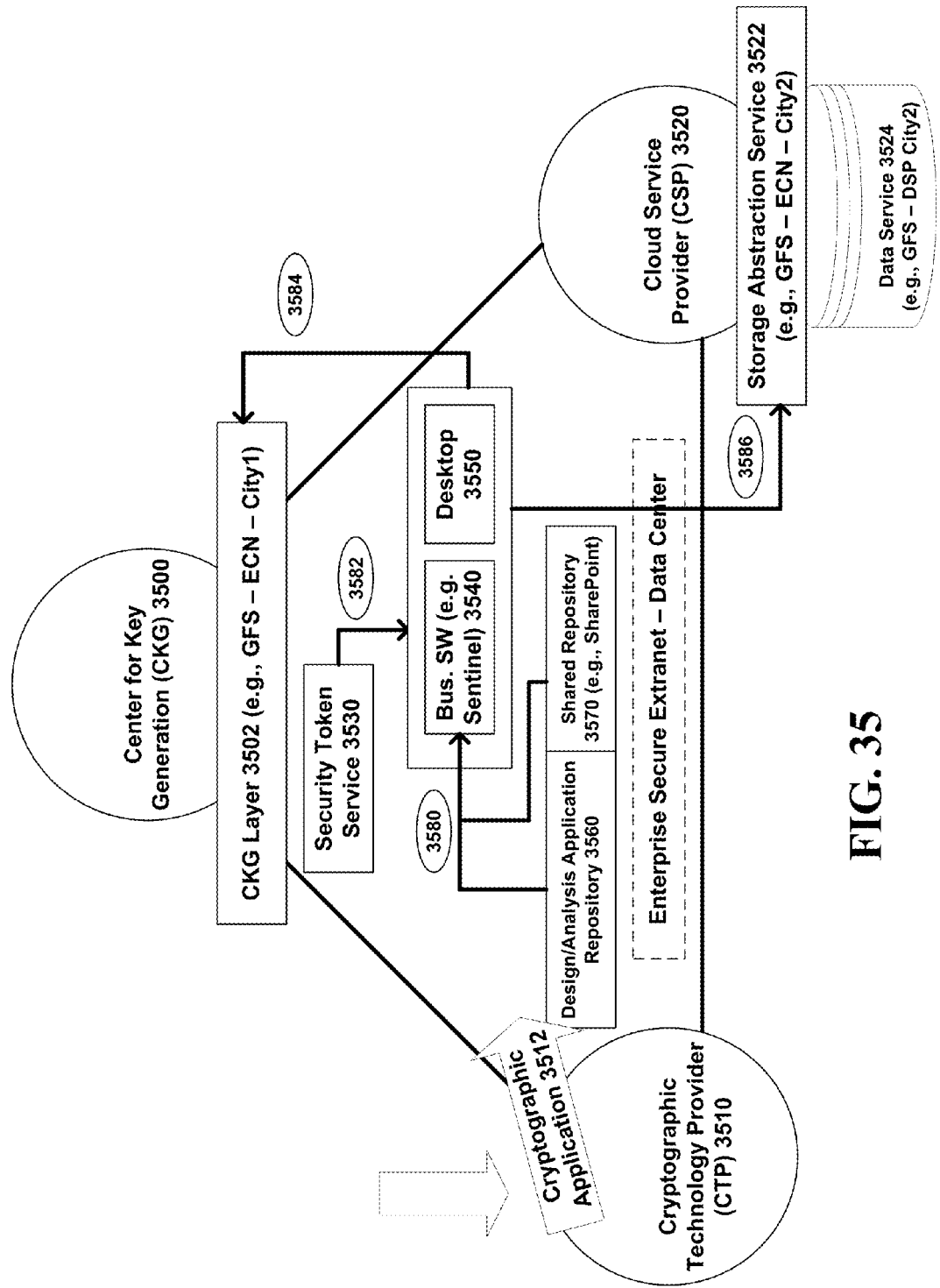
FIG. 35 illustrates an exemplary non-limiting implementation of a trustworthy cloud services using the digital escrow pattern to implement a secure extranet for an enterprise via one or more data centers.

FIG. 35 illustrates an exemplary non-limiting implementation of a trustworthy cloud services using the digital escrow pattern to implement a secure extranet for an enterprise via one or more data centers. As mentioned, the trustworthy computing ecosystem can include a center for key generation 3500 implemented separately from a cryptographic technology provider (CTP) 3510, which provides reference implementations for use in implementing cryptographic techniques consistent with the ecosystem that are implemented separately from one or more cloud service providers (CSPs) 3520. In an exemplary non-limiting implementation of secure extranet, 3580 shows that the enterprise maintains a shared repository 3570 (e.g., SharePoint) and a repository 3560 of design or analysis applications for use in connection with the documents in shared repository 3570. Business software 3540 (e.g., Sentinel) can monitor application or server performance and the like for a computer having desktop 3550.

In this regard, in a trustworthy cloud services ecosystem, when a subscriber using the desktop 3550 seeks information selectively accessible and encrypted from storage, a security token service 3530 can deliver some information to identify the subscriber 3582 and the CKG 3500 can be consulted via interfaces of the CKG layer 3502 of a first data center as shown by 3584. The CKG 3500 returns key information which can then be used to selectively access data as shown by 3586 held by data service 3524 via storage abstraction service 3522. Any type of data can be therefore be shared across an enterprise and selectively according to the roles of the subscribers in the enterprise.

Figure 36:
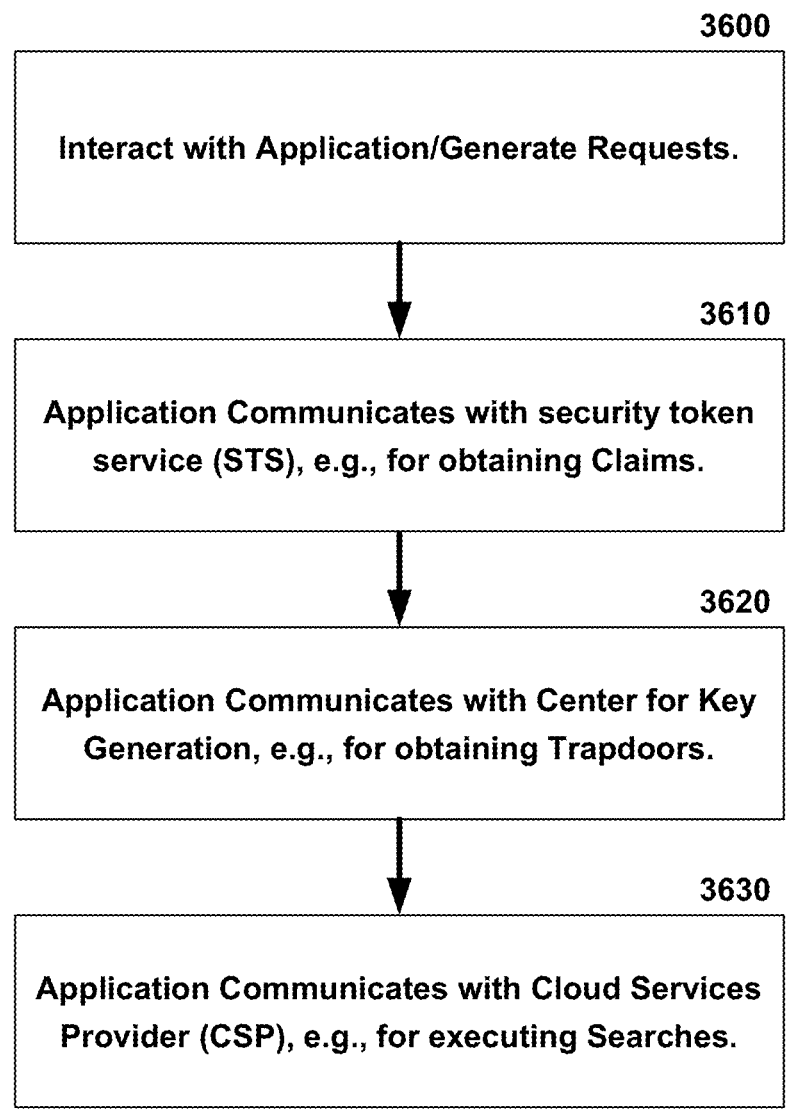
FIG. 36 is a flow diagram illustrating another exemplary non-limiting scenario based on a trustworthy cloud services ecosystem in which a subscriber is given selective access to encrypted data stored by a CSP.

FIG. 36 is a flow diagram illustrating another exemplary non-limiting scenario based on a trustworthy cloud services ecosystem in which a subscriber is given selective access to encrypted data stored by a CSP, e.g., within an enterprise. Initially, the subscriber device has acquired no privileges to access the encrypted data. By making a request for some or all of the encrypted data however, e.g., by interacting with an application, at 3600, the application automatically communicates with a corresponding STS for obtaining Claims (in the parlance of cryptography) at 3610. At 3620, the application communicates with the CKG to obtain key information that encodes information about capabilities for the subscriber (capabilities are sometimes referred to as Trapdoors in the parlance of cryptography, though the term capabilities is not restricted to the context in which the term Trapdoor typically appears). Lastly, the application provides the key information to the CSP at 3630, which permits searches or queries over the encrypted data to the extent allowed by the subscriber's capabilities.

Figure 37:
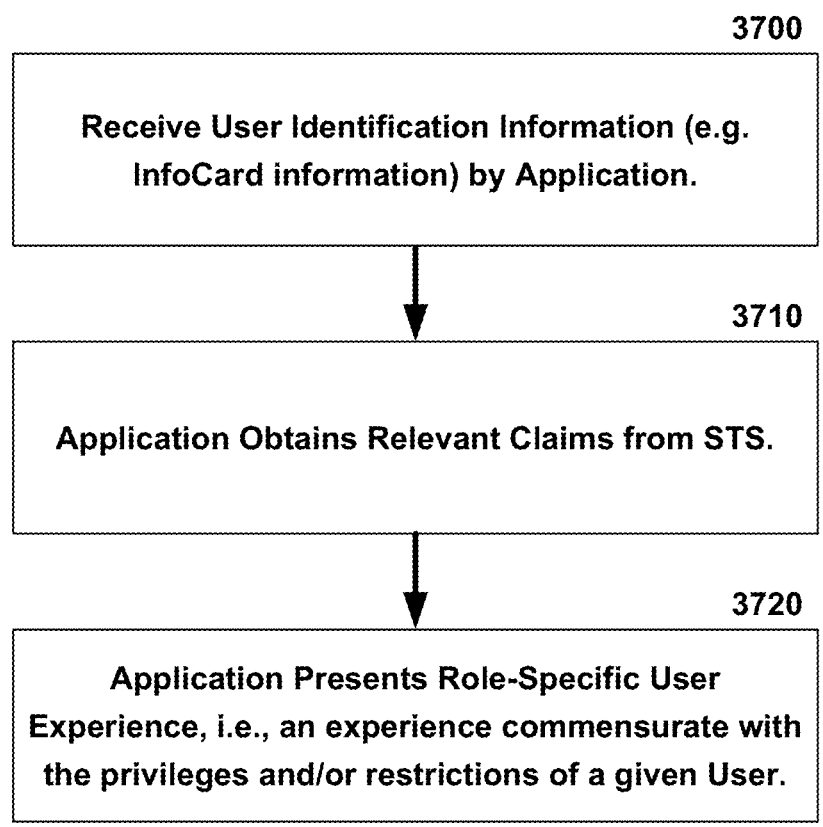
FIG. 37 is another flow diagram illustrating that the application response can be tailored to a subscriber based on sign-in information.

FIG. 37 is another flow diagram illustrating that the application response can be tailored to a subscriber based on sign-in information. For instance, at 3700, user ID information is received by an application. At 3710, the application obtains relevant Claims from the STS. At 3720, based on one or more roles served by the user associated with the user ID information, the experience can be tailored commensurate with privileges/restrictions for those roles. For instance, the user experience with which a company's chief financial officer is presented as a view over the company's encrypted data can and should be a different user experience than the view over the company's encrypted data given to a mail room employee. FIG. 37 can apply to single or multi-party login scenarios.

Figure 38:
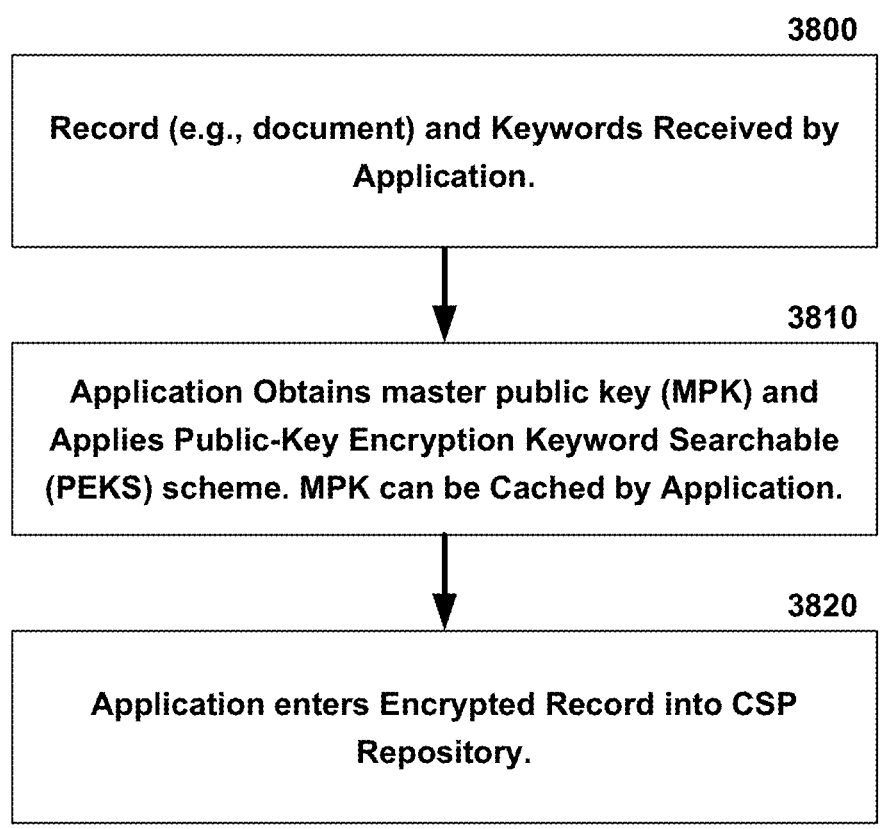
FIG. 38 is another flow diagram illustrating a secure record upload scenario, which can be implemented for a single party or multiple parties.

FIG. 38 is another flow diagram illustrating a secure record upload scenario, which can be implemented for a single party or multiple parties. At 3800, a record and keywords are received by an application, e.g., provided or designated by a user of a device with the application. At 3810, the application obtains a master public key (MPK) and applies public key encryption keyword searchable (PEKS) algorithm(s). The MPK can optionally be cached by the application. At 3820, the application enters the encrypted record into a CSP repository, e.g., via a storage abstraction layer.

Figure 39:
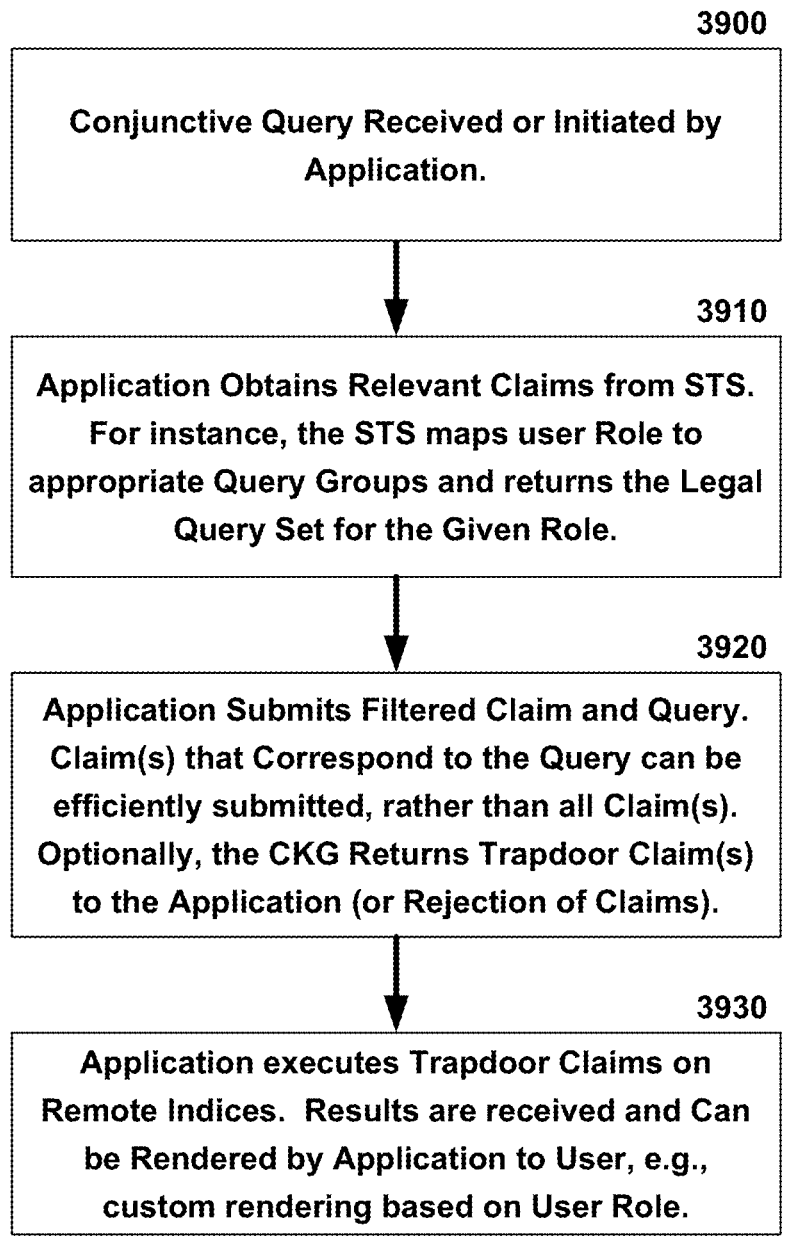
FIG. 39 is yet another flow diagram illustrating an exemplary non-limiting implementation of role-based querying over the searchably encrypted data store enabled by a trustworthy cloud services ecosystem.

FIG. 39 is yet another flow diagram illustrating an exemplary non-limiting implementation of role-based querying over the searchably encrypted data store enabled by a trustworthy cloud services ecosystem, e.g., for automated search by a single party. At 3900, a conjunctive query is received or initiated by an application. At 3910, the application obtains relevant claims from the STS. For instance, the STS maps the user's Role(s) to appropriate Query Group(s) and returns the Legal Query Set for the Given Role(s). At 3920, the application submits a Filtered Claim and Query such that Claim(s) that Correspond to the Query can be efficiently submitted, rather than all Claim(s). Optionally, the CKG returns Trapdoor Claim(s) to the application (or Rejects the Claims). At 3930, the application executes the Trapdoor Claims on Remote Indices. Based on the processing over the Remote Indices, results are received and can be rendered by the application to the user, e.g., using custom rendering based on User Role(s).

Figure 40:
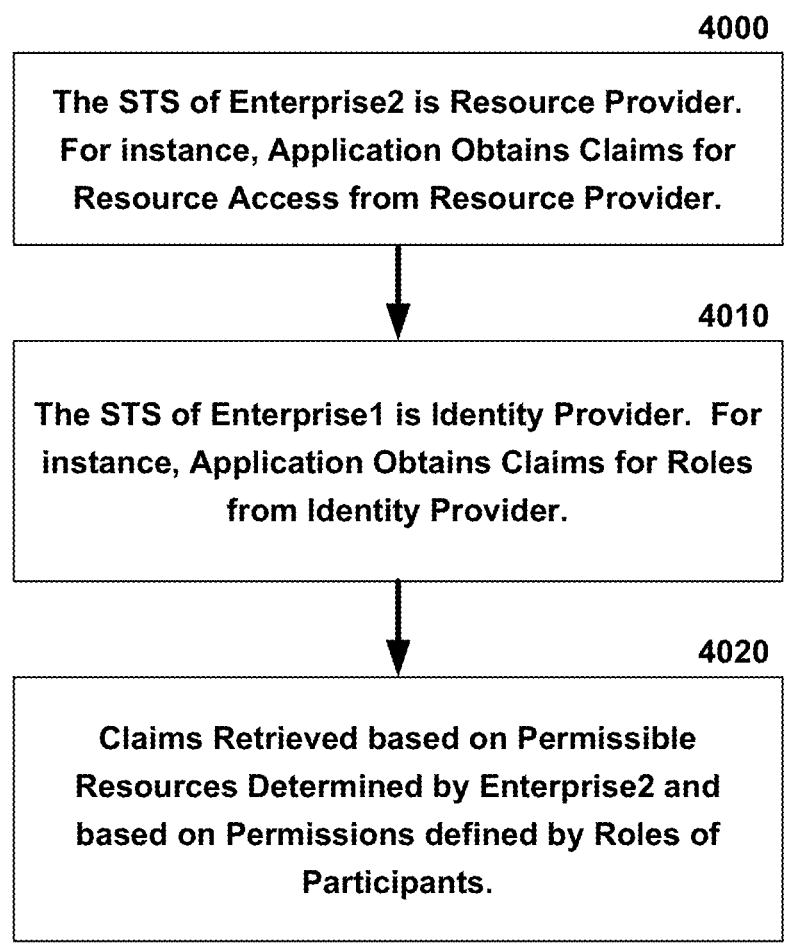
FIG. 40 is a flow diagram illustrating a multi-party cooperative scenario where an enterprise provides access to some of its encrypted data to an external enterprise.

FIG. 40 is a flow diagram illustrating a multi-party cooperative scenario where an enterprise provides access to some of its encrypted data to an external enterprise. For example, a manufacturer may grant a supplier access to some of its data stored in the trustworthy cloud, or vice versa. In this regard, at 4000, the STS of Enterprise2 is designated the resource provider and an application of Enterprise1 proceeds to obtain Claims for access to the resources provided by the resource provider in the cloud. At 4010, the STS of Enterprise1 is designated as the identity provider. In this respect, the application obtains the Claims for a role or set of roles defined by the subscriber at Enterprise1 as facilitated by the identity provider. At 4020, the Claims are retrieved by the application based on Permissible Resources controlled by Enterprise2 and based on Permissions/Capabilities defined by the role(s) of the subscribing entity. In FIG. 40, while only one STS is depicted, it is noted that that there can be multiple Identity Provider STSs and/or multiple Resource Provider STSs in a Digital Escrow, or Federated Trust Overlay.

Figure 41:
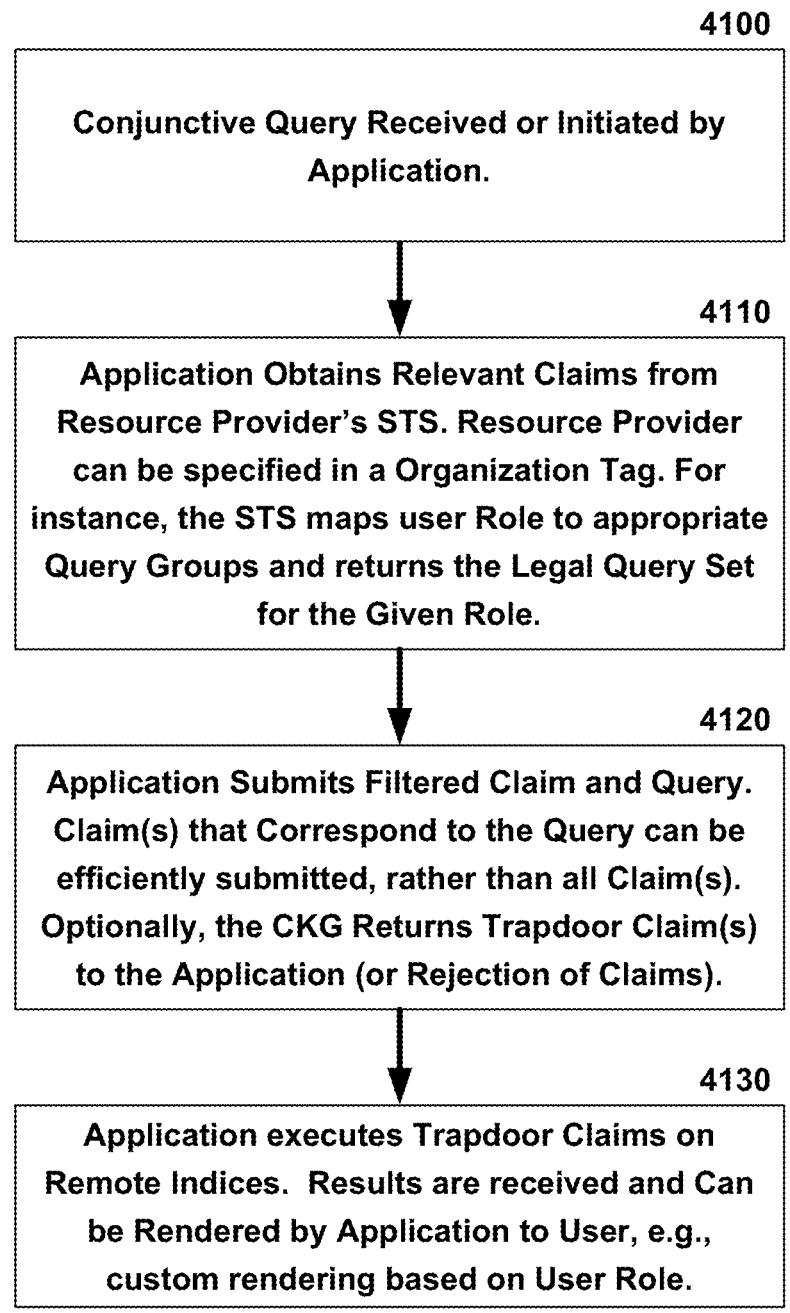
FIG. 41 is a flow diagram illustrating a multi-party automated search scenario among multiple enterprises.

FIG. 41 is a flow diagram illustrating a multi-party automated search scenario, e.g., among multiple enterprises such as Enterprise1 and Enterprise2. At 4100, a conjunctive query is received or initiated by an application of Enterprise1 for execution. At 4110, the application obtains relevant Claims from the STS of the resource provider (Enterprise2). The resource provider can be specified in an organization tag, optionally. The STS can optionally perform a mapping of user Role to Query Groups, so that the Legal Query Set is returned for the user Role. At 4120, the application submits a Filtered Claim and Query based on the user Role, The Claims that correspond to the Query can be efficiently submitted, rather than all Claim(s). Optionally, the CKG returns capabilities to the application (e.g., Trapdoor Claims), or the CKG rejects the Claims. At 4140, the application executes the Trapdoor Claims on Remote Indices. Based on the processing over the Remote Indices, results are received and can be rendered by the application to the user, e.g., using custom rendering based on User Role(s).

The method can include a step of receiving a conjunctive query, or otherwise initiating a conjunction query. In this regard, optionally, conjunctive queries can also be cryptographically protected so that no recipient of a trapdoor (or capability), either the client or the service provider, can decompose the conjunctive query and determine its constituent parts.

Figure 42:
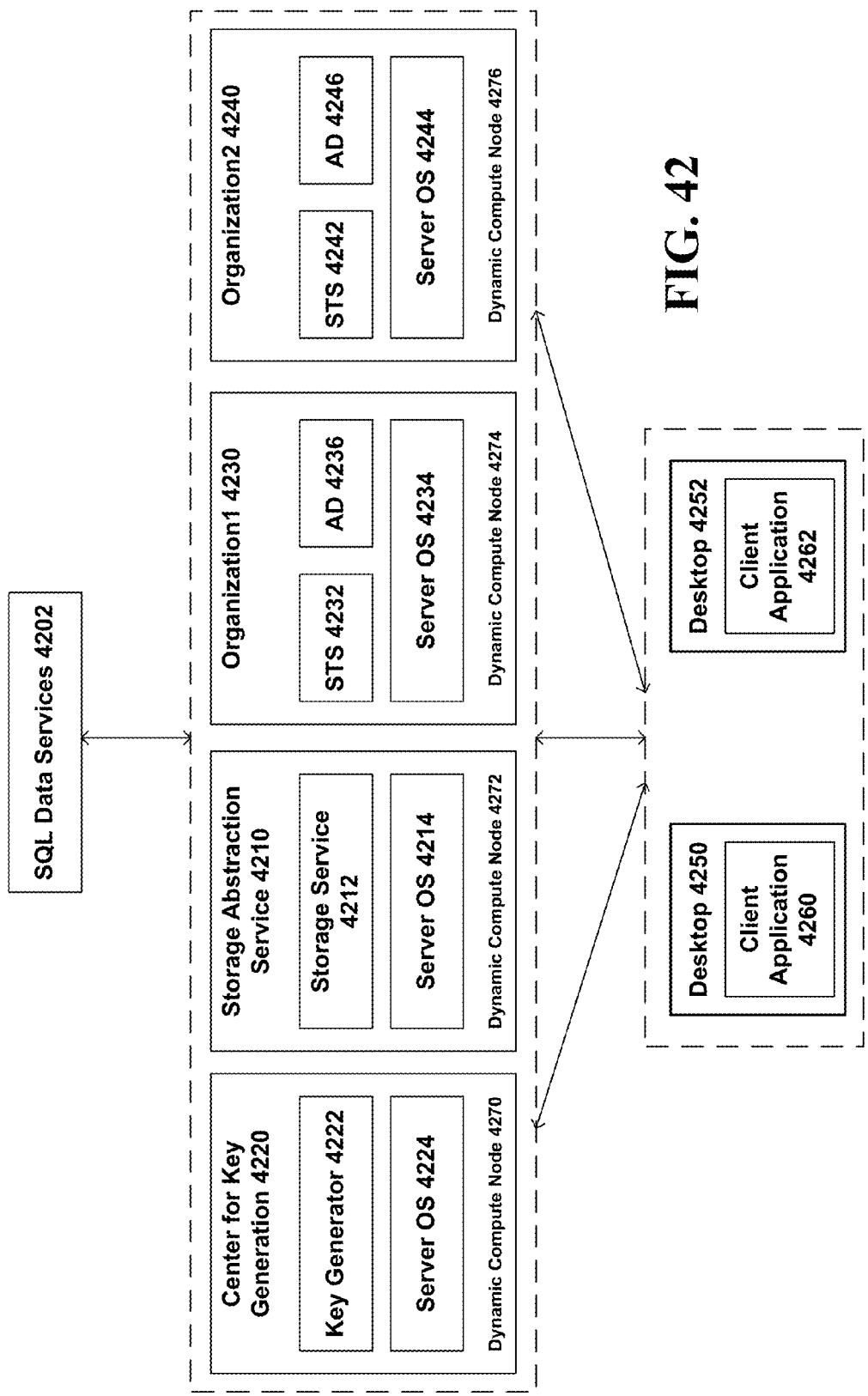
FIG. 42 illustrates an exemplary non-limiting edge compute network (ECN) technology that can be implemented for a trustworthy cloud service.

FIG. 42 illustrates an exemplary non-limiting edge compute network (ECN) technology that can be implemented for a trustworthy cloud service. In this regard, a plurality of dynamic compute nodes 4270, 4272, 4274, 4276 are dynamically allocated for computational bandwidth in connection with a set of trustworthy cloud components operating independently of one another. For instance, a center for key generation 4220, a storage abstraction service 4210, organization 4230 and organization 4240 can be implemented as shown to cover multi-organizational business or other scenarios, such as those described above. Center for key generation 4220 includes a key generator 4222 and a server OS 4224. Storage abstraction service 4210 includes a storage service component 4212 and a server OS 4214. Organization 4230 includes an STS 4232, an AD 4236 and a server OS 4234. Organization 4240 includes an STS 4242, an AD 4246 and a server OS 4244. The server OSs 4214, 4224, 4234, 4244 cooperate to implement the ECN across servers. Any storage provider or abstraction 4202 can be used for storage of data, e.g., SQL data services can be employed. In this way, one or more desktops 4250, 4252 can publish or subscribe to data via client applications 4260, 4262, respectively.

Figure 43:
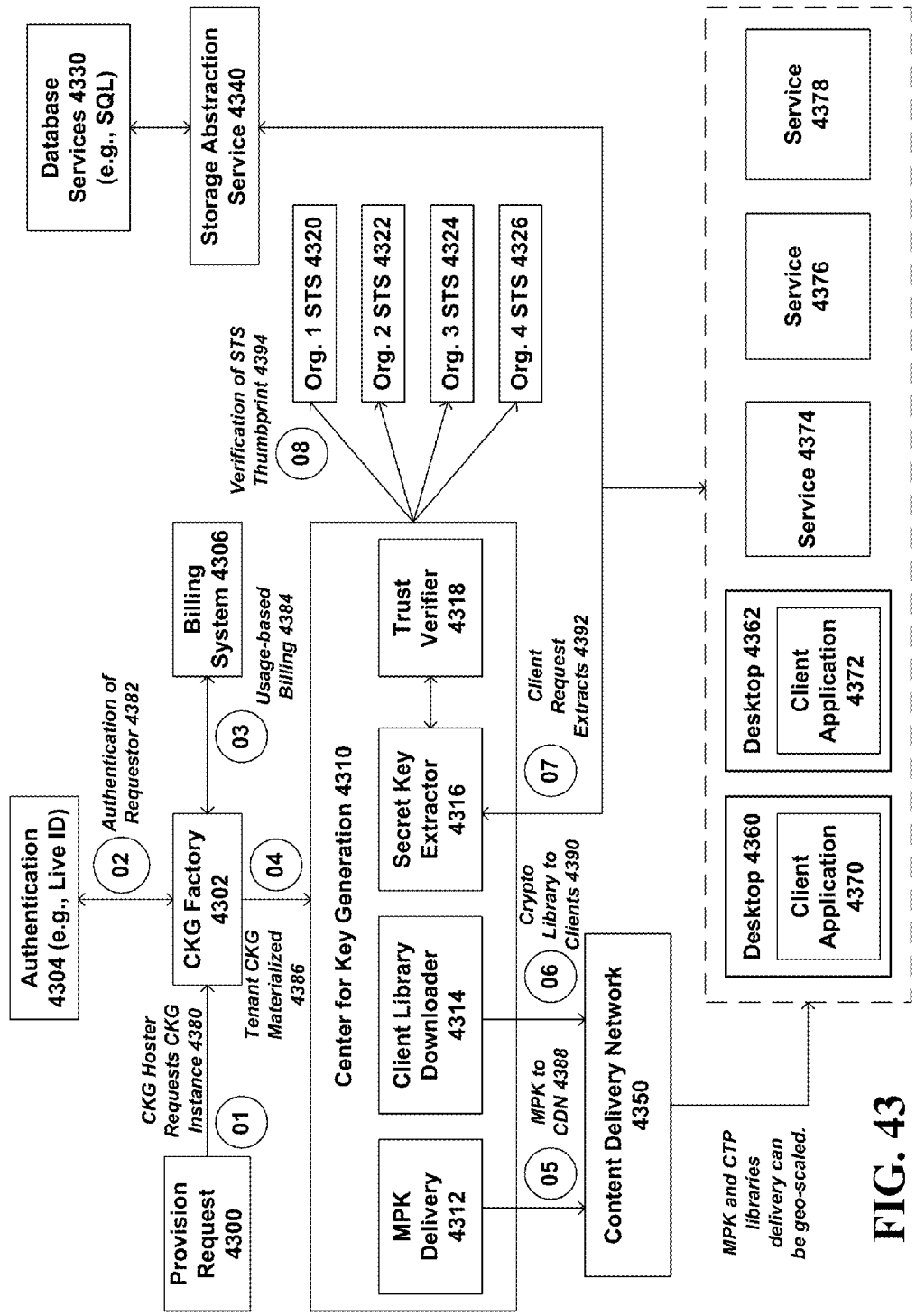
FIG. 43 is a block diagram illustrating one or more optional aspects of a center for key generation in accordance with a trustworthy cloud service ecosystem.

FIG. 43 is a block diagram illustrating one or more optional aspects of a center for key generation 4310 in accordance with a trustworthy cloud service ecosystem. Initially, a set of computing devices, such as desktops 4360, 4362 and respective client applications 4370, 4372, or services or servers 4374, 4376, 4378, etc. are potential publishers and/or subscribers to a cloud content delivery networks 4350. However, prior to fulfilling requests from any of the set of computing devices, initially a center for key generation acts as a custodian for trust for publishers encrypting data based on a public key, and handing out private keys to data subscribers based on their capabilities.

In an exemplary non-limiting interaction, initially a request from a computing device is provisioned 4300 and the hoster of the CKG 4310 requests an instance of the CKG 4310 from the CKG factory 4302 at 4380. Next, user authentication 4304 takes place at 4382. Next, any usage-based billing 4384 can be applied by billing system 4306 for use of the CKG factory 4302. Next, the tenant CKG is materialized at 4386 by CKG factory 4302, which may include MPK delivery component 4312, client library downloader 4314, secret key extractor 4316 and trust validator/verifier 4318.

MPK delivery component 4312 delivers MPK to the CDN 4350 at 4388. Client library downloader 4314 downloads crypto libraries to requesting clients which can be used in connection with encrypting data to be published or decrypting data to which the device is subscribed. Next, the client makes request to extract a given set of documents based on key information received from secret key extractor 4316, which cooperates with trust verifier 4318, which can validate that the subscriber has certain capabilities based on verifying the STS thumbprint of the subscriber at 4394, e.g., based on communication with different STSs 4320, 4322, 4324, 4326 of organizations involved in the request. As in other embodiments, a storage abstraction service 4340 can be provided to abstract storage details of database services 4330 (e.g., SQL).

Figure 44:
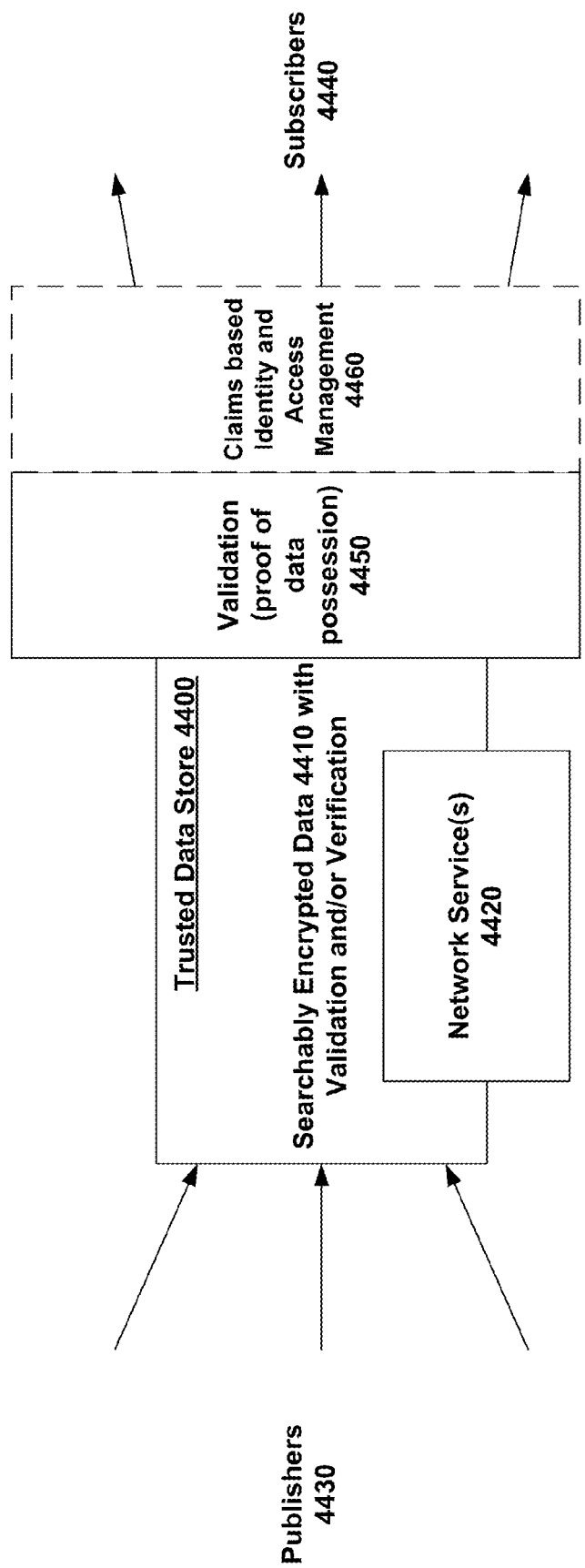
FIG. 44 is a block diagram of an exemplary non-limiting embodiment of a trustworthy store including searchably encrypted data.

FIG. 44 is a block diagram of an exemplary non-limiting embodiment of a trustworthy store 4400 including searchably encrypted data 4410 with validation and/or verification, in connection with the delivery of network services 4420. In this embodiment, a subscriber 4440 or application used by subscriber 4440 can request, as part of a request to access certain parts of the encrypted store 4400, that a validation proof be run over the items returned from the request to validate that the items actually received are also the items that should have been received. In this regard, FIG. 44 illustrates the combination of searchable encryption techniques with techniques for validation. Optionally, the system may also be integrated with Claims-based Identity and Access Management, as described in other embodiments herein. In this regard, the Digital Escrow pattern, also referred to as Federated Trust Overlay, as described in various embodiments herein, can be integrate seamlessly with more traditional Claims-based Authentication systems.

In FIG. 44, the Trustworthy Data Store 4400 or the Service Provider or Hoster of the data store performs the proving step, whereas the owner of the data (e.g., the subscriber device) performs the validation. Data Store 4400 is trusted because the users can have confidence that it provides strong guarantees, though it is understood that physical entities actually host that data, and some participants are not fully trusted.

Figure 45:
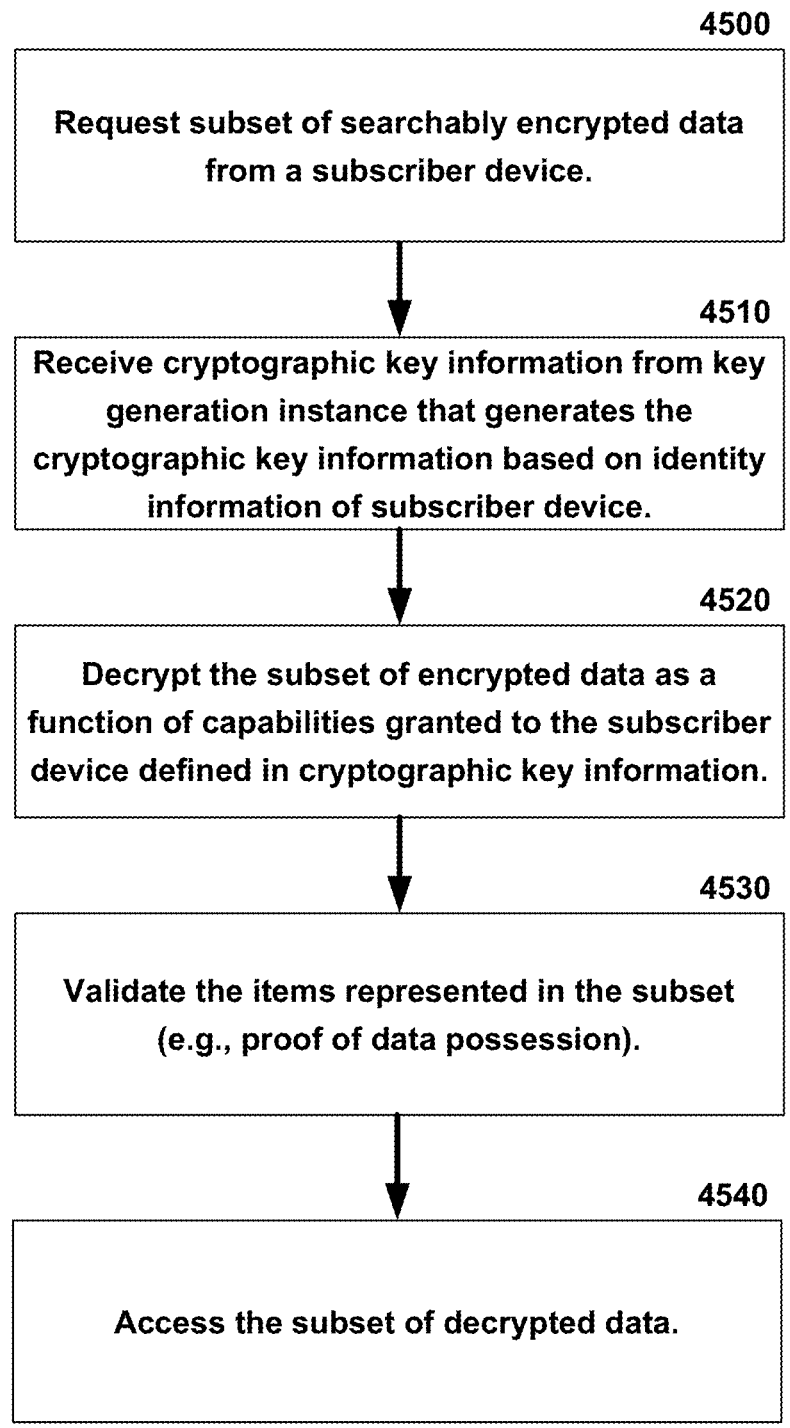
FIG. 45 is a flow diagram illustrating an exemplary non-limiting process for subscribing including a validation step.

FIG. 45 is a flow diagram illustrating an exemplary non-limiting process for subscribing including a validation step. At 4500, a subset of searchably encrypted data is received from a subscriber device. At 4510, cryptographic key information is generated from key generation instance that generates the cryptographic key information based on identity information of the subscriber device. At 4520, the subset of encrypted data is decrypted as a function of capabilities granted to the subscriber device defined in cryptographic key information. At 4530, the items represented in the subset can be validated (e.g., proof(s) of data possession) and the data is accessed at 4540.

In many cases, it is desirable to be able to execute PDP/POR over encrypted data without needing to decrypt it. Optionally, the key information needed for PDP can be encoded within the metadata that was protected with Searchable Encryption. While this is an effective way of managing the keys used for PDP/POR, it is noted there are many high-value scenarios where PDP/POR can be performed on encrypted data without needing access to the cleartext contents.

Figure 46:
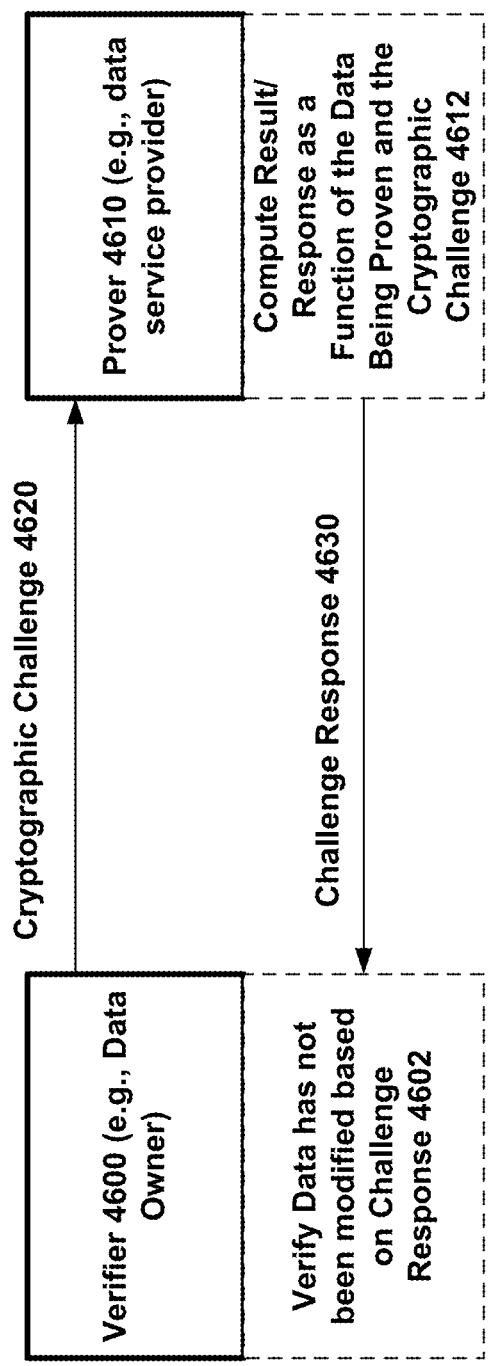
FIG. 46 illustrates an exemplary non-limiting validation challenge/response protocol in which a verifier issues a cryptographic challenge to a prover.

FIG. 46 illustrates an exemplary non-limiting validation challenge/response protocol in which a verifier 4600 (e.g., the data owner) issues a cryptographic challenge 4620 to a prover 4610 (e.g., the data service provider). Upon receiving the challenge 4620, the prover 4610 computes the response as a function of the data and the challenge 4612. The challenge response 4630 is then returned to verifier 4600, which then performs computation to verify or prove that the data has not been modified 4602.

The validation generally illustrated in FIG. 46 is known as private PDP, though it is noted there is also a "Public" version where a third party is provided with a key (a "public" key) so the third party acts as the Verifier according to a similar protocol, without coming to know anything about the actual data. POR, an example of verification, is different from PDP in that it provides proof that the data is retrievable (despite any corruptions/modifications), but as illustrated in FIG. 30 below, the basic protocol is the same, though the structure of the documents and the actual algorithms are different. Various implementations of a trustworthy ecosystem herein combine Searchable Encryption and POR/PDP to benefit the system and bolster trust. In this regard, before submitting the data to the Service Provider, the data is searchably encrypted and post processing of the data can include POR and/or PDP.

In addition, a "data dispersion" technique can optionally be overlaid on any one or more of the above embodiments if there is a need to provide even stronger guarantees. With data dispersion, data is distributed to several Service Providers for resilience against "massively bad behavior" or catastrophic loss in any single Service Provider. Using the trust mechanisms described herein, this dispersion is performed in a way that makes it difficult for independent Service Providers to collude and corrupt the data. This is similar in concept to the above described distributed CKG embodiment.

Figure 47:
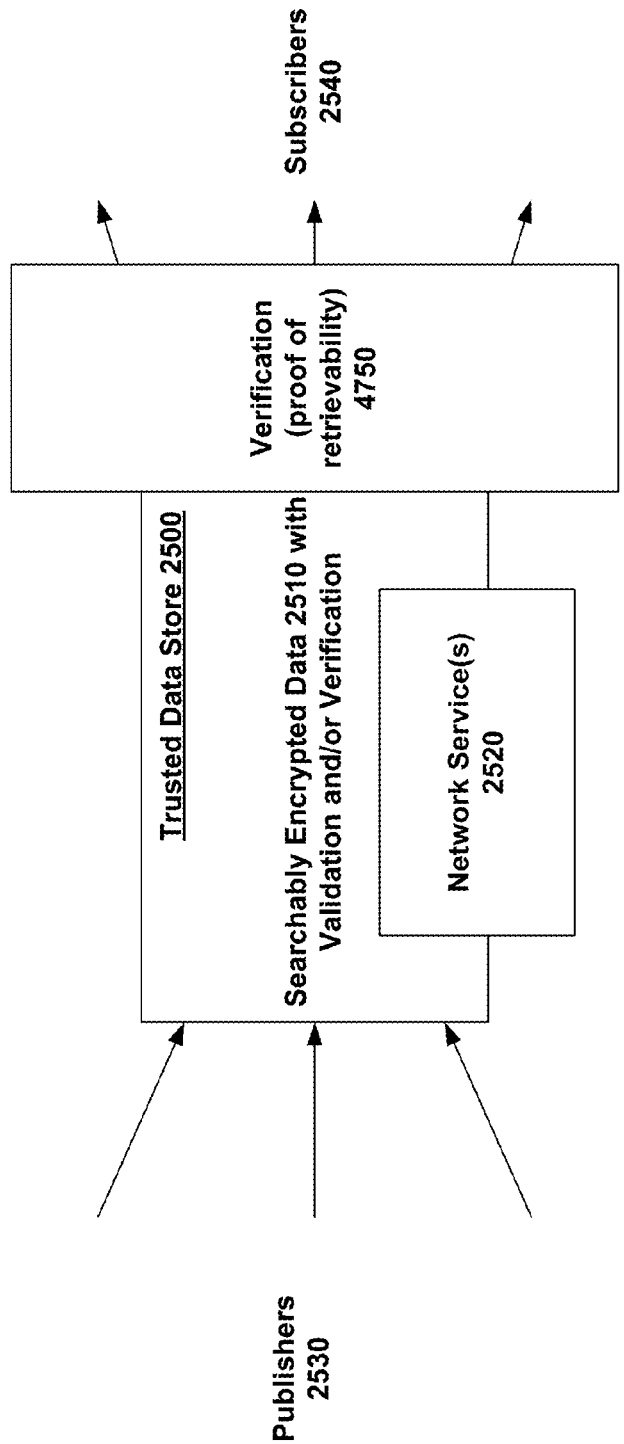
FIG. 47 is a block diagram of another exemplary non-limiting embodiment of a trustworthy store including searchably encrypted data.

FIG. 47 is a block diagram of another exemplary non-limiting embodiment of a trustworthy store 2500 including searchably encrypted data 2510 with validation and/or verification, in connection with the delivery of network services 2520 for data from publishers 2530. Specifically, FIG. 47 illustrates a verification component 4750 for verifying that the items returned to subscribers 2540 were not tampered with, or otherwise inadvertently altered. PDP, mentioned above, is a non-limiting example of verification.

Figure 48:
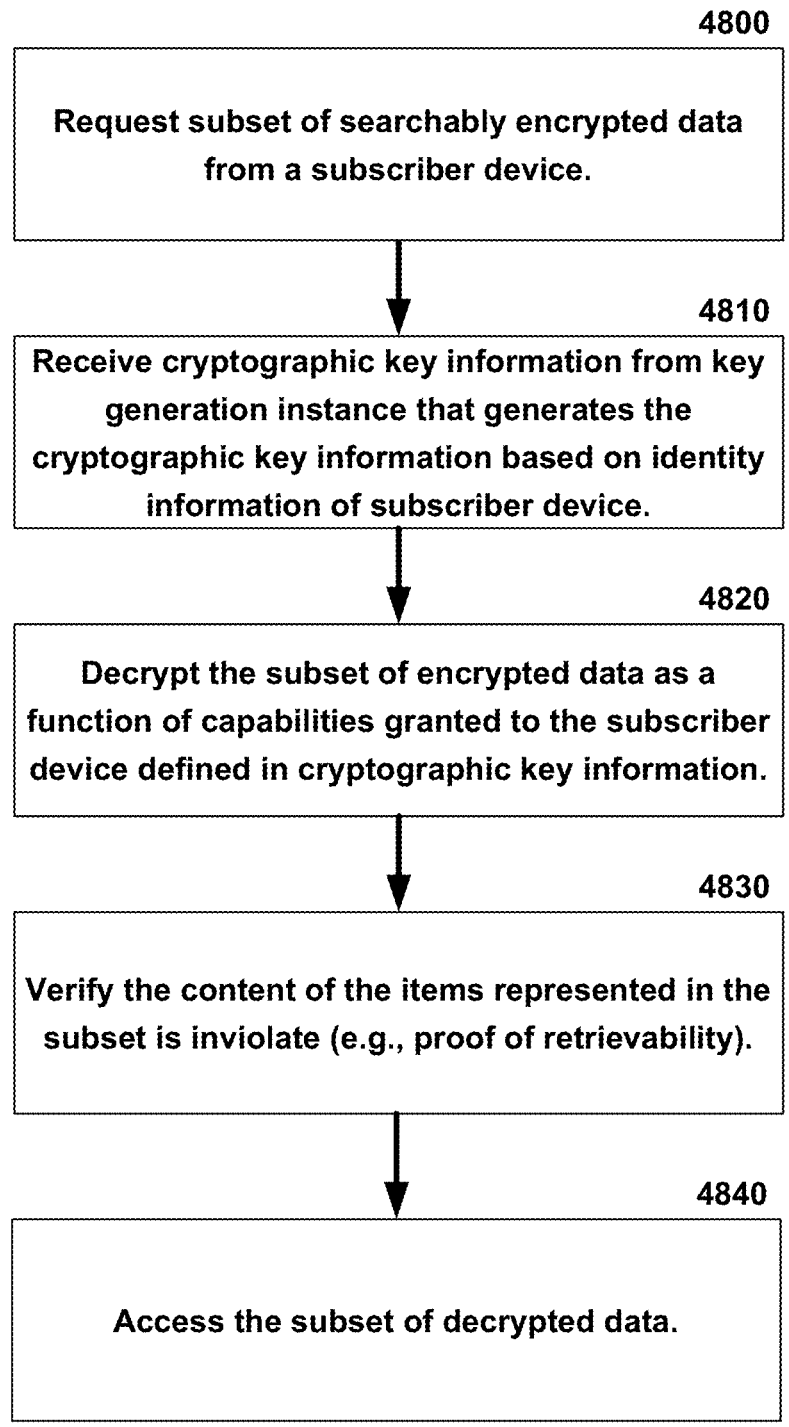
FIG. 48 is a flow diagram illustrating an exemplary non-limiting process for subscribing including a validation step.

FIG. 48 is a flow diagram illustrating an exemplary non-limiting process for subscribing including a validation step. At 4800, a subset of searchably encrypted data is received from a subscriber device. At 4810, cryptographic key information is generated from key generation instance that generates the cryptographic key information based on identity information of the subscriber device. At 4820, the subset of encrypted data is decrypted as a function of capabilities granted to the subscriber device defined in cryptographic key information. At 4830, the content of the items represented in the subset can be verified (e.g., proof(s) of retrievability) and the data is accessed at 4840.

Figure 49:
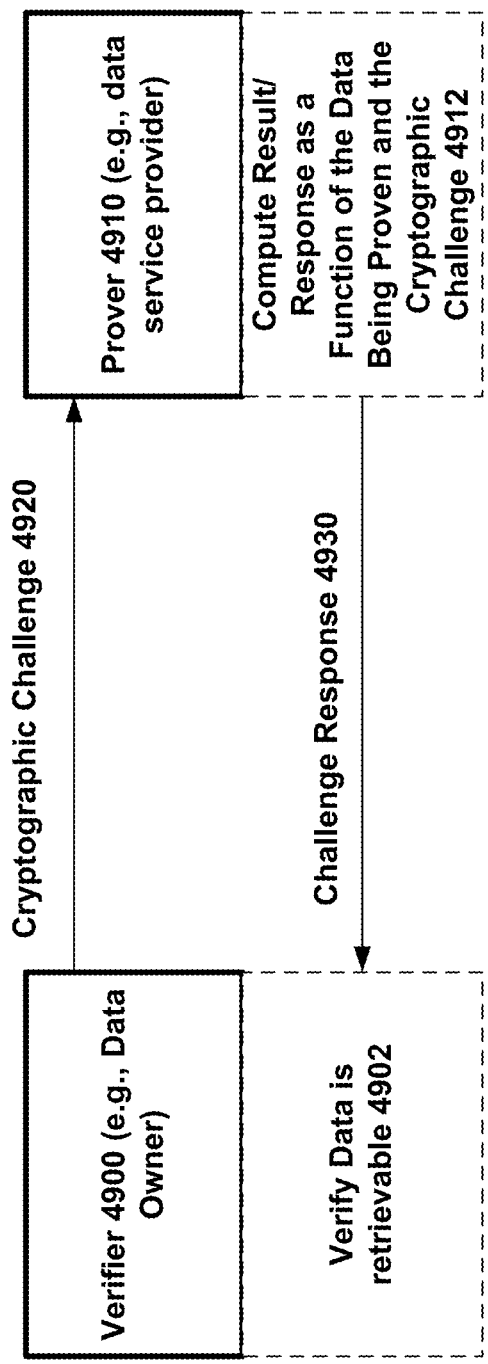
FIG. 49 illustrates another exemplary non-limiting verification challenge/response protocol in which a verifier issues a cryptographic challenge to a prover.

FIG. 49 illustrates an exemplary non-limiting verification challenge/response protocol in which a verifier 4900 (e.g., the data owner) issues a cryptographic challenge 4920 to a prover 4910 (e.g., the data service provider). Upon receiving the challenge 4920, the prover 4910 computes the response as a function of the data and the challenge 4912. The challenge response 4930 is then returned to verifier 4900, which then performs computation to verify or prove that the data is retrievable 4902.

Blind Fingerprints represent another kind of cryptographic technique that extends network de-duping techniques, such as Rabin Fingerprints, which are typically used for minimizing the exchange of redundant data over a network. In various embodiments herein, fingerprinting is applied such that a participant in the protocol, e.g., the CSP in the case of storage of data, is unaware of the actual contents of the data that they are hosting.

For some additional context regarding Blind Fingerprints, any large exchange of data across wide area networks (WANs), including the maintenance of a data, will desire techniques for "de-duping" over the wire, or making sure that unnecessary data is not sent over the wire. This is accomplished by fingerprinting segments of the data and then exchanging fingerprints so that senders know what they have that the receivers do not have. Also, the receivers know for what data they need to ask the senders. Distributed File Service Replication (DFS-R) can be used for optimizing data exchanges in scenarios, such as branch office backups and distributed file systems over a WAN.

In the case of Exchange, there is significant duplication of data, and it is possible that up to 50%, or more, of data on the wire could be duplicates at any given time. The fingerprints can be obtained at the block level or at an object level, e.g., e-mail, calendar items, tasks, contacts, etc. The fingerprints can be cached at both the primary and secondary data centers. Thus, if there is a failure at a primary data center, then the secondary data can be restored to the primary data center along with fingerprints. The encryption of data at the primary data center should nonetheless allow the fingerprints to be visible to the secondary data center operator, despite being obscured. This can be achieved, for example, by storing fingerprints as keywords/metadata with searchable encryption, so that other than authorized entities/agents in the secondary data center, no other entity would be able to detect patterns.

In the context of data services, when sending up a full or an incremental, the primary data center can examine each item/segment/block in the logs, or EDB, and consult the local copy of the fingerprints. If there is a match, then the primary data center replaces the item/segment/block with the fingerprint. The term "blind fingerprints" is referred to as such herein because of the manner in which fingerprinting is applied. In one embodiment, the selection of cryptographic technologies to achieve blind fingerprinting includes a size preservation cryptographic technique.

Figure 50:
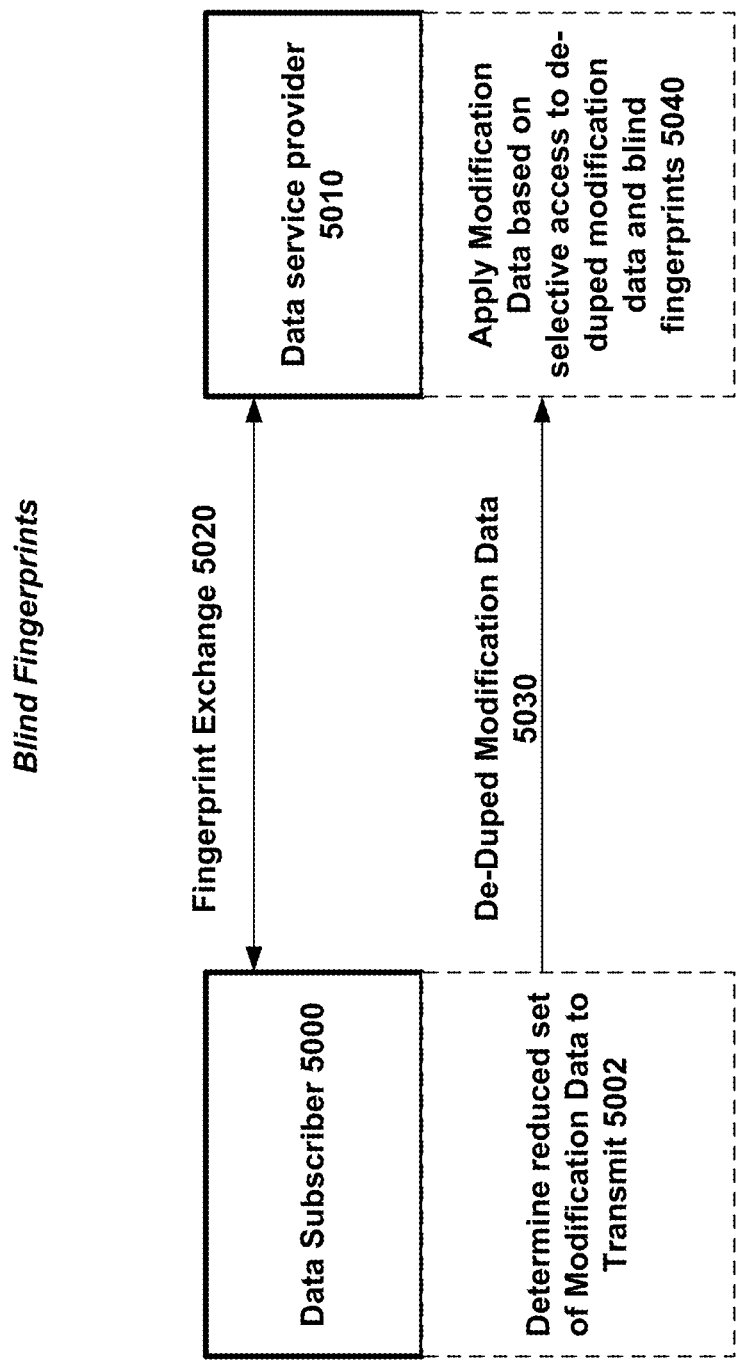
FIG. 50 is a block diagram of a general environment for providing one or more embodiments of services including blind fingerprinting.

FIG. 50 is a block diagram of a general environment for providing one or more embodiments of services including blind fingerprinting. With blind fingerprints, a data subscriber 5000 and a data service provider 5010 undergo a fingerprint exchange to understand as a proxy for what data segments are already possessed on the respective local and backup copies of the data set being backed up. As a result of the fingerprint exchange 5020, a reduced set of modification data is determined to transmit at 5002 as de-duped modification data 5030 to data service provider 5010, which then applies the modification data based on selectively accessing the de-duped modification data and any blind fingerprints 5040.

Figure 51:
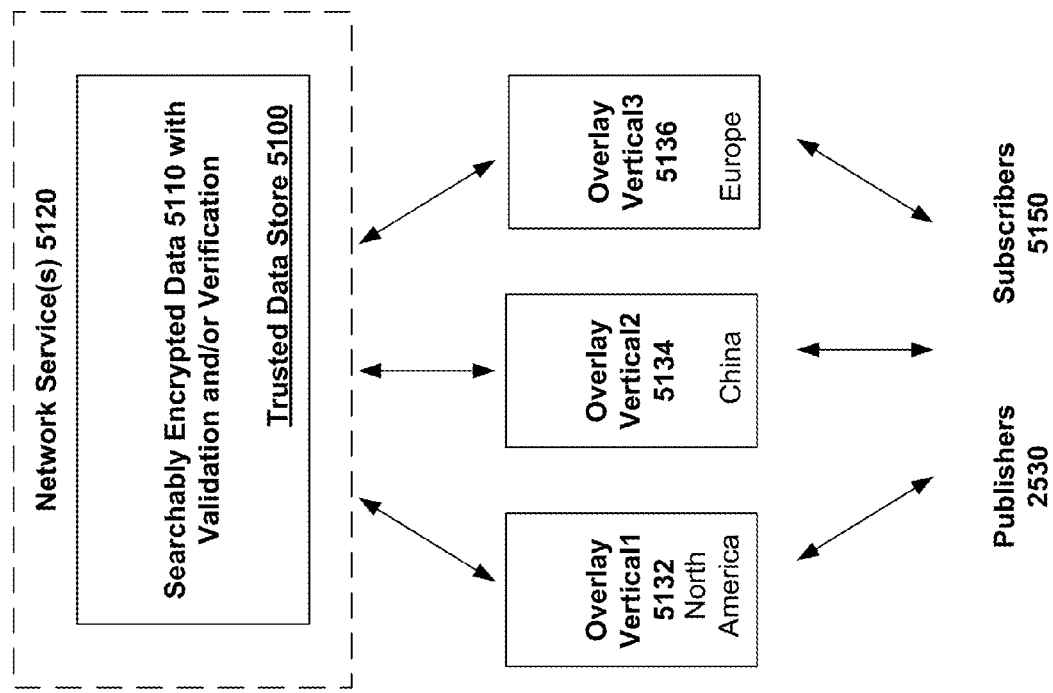
FIG. 51 is a block diagram illustrating a non-limiting scenario where multiple, independent Federated Trust Overlays, or Digital Escrows can exist side by side, or on top of one another for a layered approach.

FIG. 51 is a block diagram illustrating a non-limiting scenario where multiple, independent Federated Trust Overlays, or Digital Escrows can exist side by side, or on top of one another for a layered approach. In this scenario, there is a trustworthy data store 5100 having searchably encrypted data 5110 upon which various network service(s) 5120 can be predicated. For instance network service(s) 5120 can include the delivery of word processing software as a cloud service. As part of geo-distribution, or otherwise, optionally, multiple Overlays/Escrows 5132, 5134, 5136 can be provided that are each tuned to different applications/verticals/compliance needs/sovereign entity requirements, such that the publishers 2530 or subscribers 5150 select, implicitly or explicitly, the correct Overlay/Escrow in which to participate, e.g., based on a set of requirements or area of jurisdiction/domicile. The overlay thus can change, but the back-end services from the cloud can remain the same without complicating the delivery of the core service itself.

Figure 52:
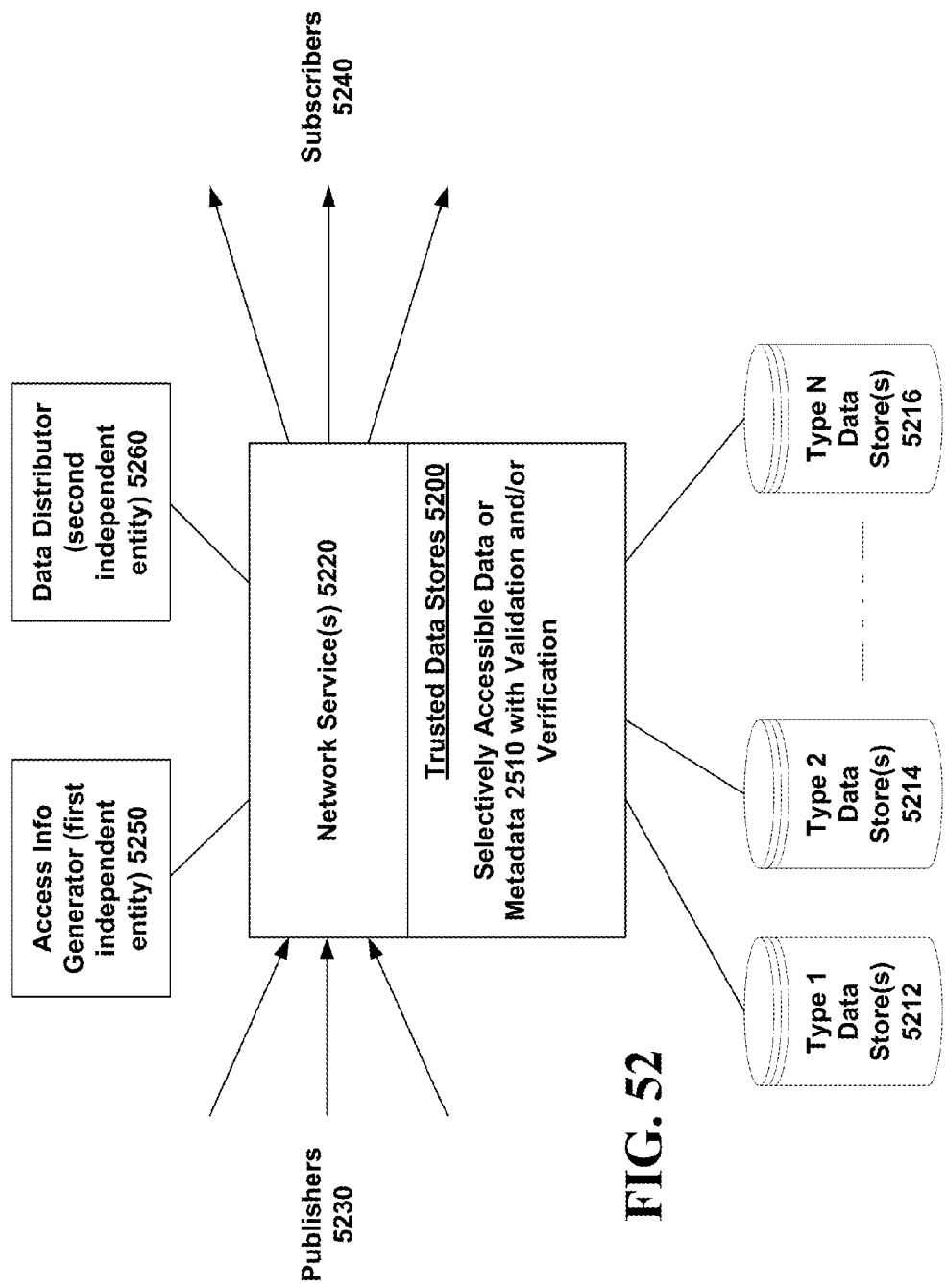
FIG. 52 is a block diagram of another exemplary non-limiting embodiment of a trustworthy store including data distribution techniques for obscuring data against unauthorized access.

FIG. 52 is a block diagram of another exemplary non-limiting embodiment of a trustworthy store including data distribution techniques for obscuring data against unauthorized access. This example demonstrates that all of the above described techniques or systems that provide encryption techniques as a means for hiding or obscuring data can also be implemented by any other mathematical transformation or algorithm that prevents visibility into the data (or metadata). In this regard, for instance, data can be automatically defragmented or distributed across a set of data stores, which can be of the same type, or as shown in FIG. 52, containers of different types 5212, 5214, . . . , 5216.

The system thus includes data stores 5200 that include, as an abstraction, data stores 5212, 5214, . . . , 5216 for storing selectively accessible data or metadata 5210. Publishers can publish the data or the metadata 5210 representing at least one resource to the data stores 5200, and a first independent entity 5250 performs generating of access information applicable to the data or the metadata as published, and a second independent entity 5260 distributes the data or the metadata as published across a set of data stores of the data stores 5200 while maintaining knowledge of the set of data stores that store the data or the metadata as published.

This knowledge is thus a secret that cannot be revealed without the access information. The data or metadata 5210 can be published via network service(s) 5220 that provide selective access to the data or the metadata as published for a given request to the network service based on late bound selected privileges granted by the publisher(s) or owner(s) of the at least one resource and represented by the access information. The data stores 5200 include a plurality of containers of same or disparate container type and the data or the metadata as published is automatically distributed across at least one container of the plurality of containers. The distribution can be based on any algorithm known to the data distributor 5260, e.g., based on a real-time analysis of the storage resources represented by the plurality of containers, based on characteristics of the data or metadata, or any other parameters that are appropriate for the given application.

Accordingly, when subscribers 5240 make a request for the data or metadata 5210, the network service(s) consult with the independent entities 5250 and/or 5260 to determine whether the subscribers 5240 are permitted to have access information that enables reassembly of the data. For instance, a data map can be the secret that permits reassembly of the data. This embodiment can be combined with other mathematical transformations, such as encryption, in order to provide additional protection over the data. Such additional mathematical transformations can be overseen by further independent entities for additional distribution of trust for further comfort that the data remains invisible except to authorized parties.

Herein described are a variety of exemplary, non-limiting embodiments that illustrate the delivery of trustworthy data services. These embodiments are not standalone, but rather can be combined with one another where appropriate. In addition, any of the above-described embodiments can be extended in a number of alternative ways. For instance, in one embodiment, the trustworthy data services provide for the expiry and revocation of trapdoors or capabilities for greater degree of security over the access to the data. In another optional embodiment, a rights management layer is built into the provision of trustworthy data services, e.g., to preserve rights attached to content as part of encryption/decryption or to prevent acts with respect to copyrighted data in digital escrow that are more easily recognizable or detectable in the clear. Accordingly, any combinations or permutations of embodiments described herein are contemplated as within scope of the subject disclosure.

Exemplary Non-Limiting Implementation

An exemplary implementation of the digital escrow pattern is referred to as a Federated Trust Overlay (FTO). Attached in Appendix A are some additional non-limiting details about FTO implementations.

In this regard, the Digital Escrow Pattern is just an example of many possible patterns and variations. Furthermore, this pattern (which involves publishers, subscribers, administrators and auditors—and possibly other specialized roles as described above) is layered over another underlying FTO pattern, which performs the "church & state" separation of CTP, CSP, CKG, etc., to maintain trust. There can also be multiple, independent FTOs and DEPs that could co-exist without interfering with each other, and without even knowing about the existence of each other. Also, it is possible to overlay DEP and FTO patterns over Cloud storage without the Cloud Storage service provider co-operating, or even coming to know about the existence of these patterns/overlays.

In more detail, an FTO is a set of services that is independent of the data services in the cloud. These services are operated by parties other than the operator of the data services, and are able to provide strong guarantees regarding confidentiality, tamper detection and non-repudiation for the data hosted by the cloud services.

Any partner can construct and host these overlay services, e.g., a Mediator Service, the validation service, Storage Abstraction service, etc. These partners might choose to host a reference implementation, or construct their own implementation based on openly available formats and protocols.

Due to the open nature of the formats, protocols and the reference implementations, it would be straightforward to maintain a separation of control among parties, such as the operators of the FTO and the Data Owners.

While encryption is an element of this solution, the orchestration of services that are federated across different parties is also a part of the solution. While conventional encryption techniques are compelling for many scenarios, they preclude enabling many of the scenarios like tamper detection, non-repudiation, building trust by orchestrating multiple (untrusted) services, searching data repositories, etc.

Supplemental Context

For some additional non-limiting context, as described above, a trustworthy set of cloud offerings enables an application ecosystem for the cloud that builds on the trust. Various terminology used herein includes: CKG—Center for Key Generation, an entity that hosts a multi-tenant key generation center, e.g., any of Microsoft, VeriSign, Fidelity, A Sovereign Entity, Enterprise, Compliance Entity, etc. could host the CKG. In this regard, multi-tenancy is optional (e.g., desirable but not mandatory). Other terminology includes: CTP—Crypto Technology Provider, an entity that provides encryption technologies for use with the trustworthy ecosystem, e.g., any of Symantec, Certicom, Voltage, PGP Corp, BitArmor, Enterprise, Guardian, Sovereign Entity, etc. are example companies that could be CTPs.

In addition, the term CSP—Cloud Service Provider is an entity that provides cloud services, including storage. A variety of companies can provide such data services. A CIV—Cloud Index Validator is a second repository to validate returned indices. A CSA—Compute and Storage Abstraction abstracts the storage back-end. STF—Storage Transfer Format is a universal format for transferring data/metadata across repositories.

In this regard, as mentioned, some enterprise scenario(s) includes engineering extranet using data service technologies or applications, design and engineering analysis, defining data relationships among manufacturer and supplier(s), etc. A unique ecosystem is thus enabled for a whole variety of scenarios by distributing trust across multiple entities so that no 'uber' trusted entity or single point of compromise exists.

With respect to some supplemental context regarding searchable encryption, a user typically has or gets 'capabilities' or 'trapdoors' for keyword(s) and then sends a request using the 'capabilities' presenting them to the server. The server 'combines' capabilities and indices to find relevant documents or data. The user is then given access only to documents that result from the search (though the user may have access to more than just those documents).

As mentioned, no single algorithm should be considered as limiting on the provision of a searchably encrypted data store as described herein, however, the below generally outlines some of the theory behind an exemplary non-limiting algorithm and provides a primer for the Searchable Symmetric Encryption (SSE) Pattern:

Message: m
Keywords: $w_1, \ldots, w_n$
PRF: H
Generating escrow key
   Choose random S for H
Encrypting
   Choose random key K
   Choose random fixed-length r
     For $1 \leq i \leq n$
       Compute $a_i = H_S(w_i)$
       Compute $b_i = H_{a_i}(r)$
       Compute $c_i = b_i \oplus \text{flag}$
Output $(E_K(m), r, c_1, \ldots, c_n)$
Generating trapdoor or capability for w
$d = H_{s_j}(w)$
Testing for w
Compute $p = H_d(r)$
Compute $z = p \oplus c_i$
Output "true" if z=flag
Decrypt $E_K(m)$ to obtain m While again not to be considered limiting on any embodiment described herein, the following is a primer regarding public-key encryption w/keyword search (PEKS) pattern.

Public-key encryption
  a. PKE=(Gen, Enc, Dec)
  Identity-based Encryption
  b. IBE=(Gen, Enc, Extract, Dec)
  c. Generating master keys
    i. (msk,mpk)=IBE.Gen( )
  d. Encrypting m for ID
    i. c=IBE.Enc(mpk, ID, m)
  e. Generating secret key for ID
    i. sk=IBE.Extract(msk, ID)
  f. Decrypting
    i. m=IBE.Dec(sk, c)
  g. Message: m
  h. Keywords: $w_1, \ldots, w_n$
  i. Generating escrow keys
    i. (msk, mpk)=IBE.Gen( )
    ii. (pk,sk)=PKE.Gen( )
  j. Encrypting
  k. For $1 \leq i \leq n$
    i. $c_i$=IBE.Enc(mpk, $w_i$, flag)
  l. Return (PKE.Enc(pk,m),$c_1, \ldots, c_n$)
  m. Generating capability or trapdoor for w
    i. d=IBE.Extract(msk, w)
  n. Testing for w
  o. For $1 \leq i \leq n$
    i. z=IBE.Dec(d, $c_i$)
    ii. Output "true" if z=flag
    Decrypt $E_K(m)$ to obtain m Exemplary Networked and Distributed Environments One of ordinary skill in the art can appreciate that the various embodiments of methods and devices for a trustworthy cloud services framework and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 53:
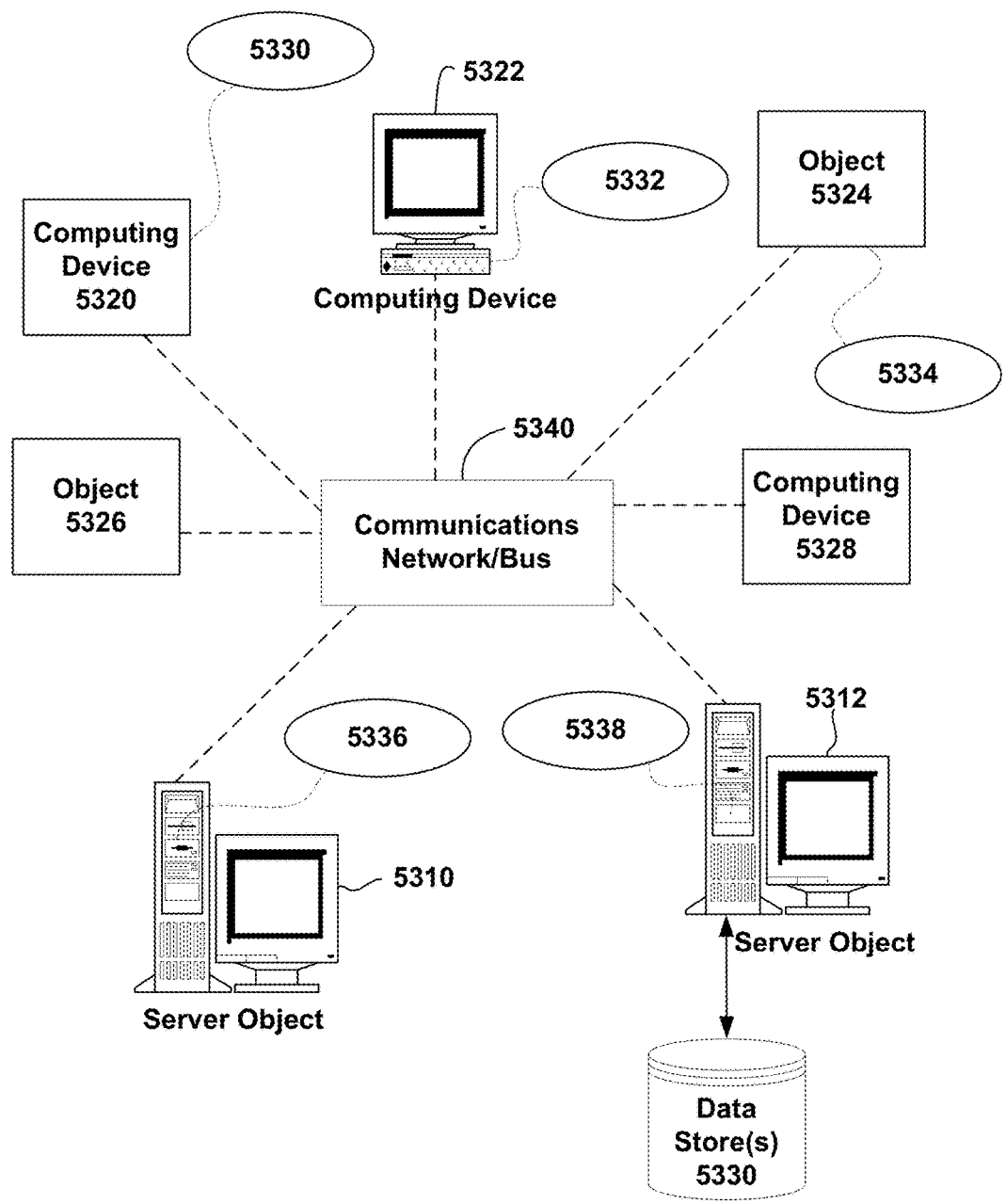
FIG. 53 is a block diagram representing exemplary non-limiting networked environments in which various embodiments described herein can be implemented.

FIG. 53 provides a non-limiting schematic diagram of an exemplary networked or distributed computing environment. The distributed computing environment comprises computing objects 5310, 5312, etc. and computing objects or devices 5320, 5322, 5324, 5326, 5328, etc., which may include programs, methods, data stores, programmable logic, etc., as represented by applications 5330, 5332, 5334, 5336, 5338. It can be appreciated that objects 5310, 5312, etc. and computing objects or devices 5320, 5322, 5324, 5326, 5328, etc. may comprise different devices, such as PDAs, audio/video devices, mobile phones, MP3 players, laptops, etc.

Each object 5310, 5312, etc. and computing objects or devices 5320, 5322, 5324, 5326, 5328, etc. can communicate with one or more other objects 5310, 5312, etc. and computing objects or devices 5320, 5322, 5324, 5326, 5328, etc. by way of the communications network 5340, either directly or indirectly. Even though illustrated as a single element in FIG. 53, network 5340 may comprise other computing objects and computing devices that provide services to the system of FIG. 53, and/or may represent multiple interconnected networks, which are not shown. Each object 5310, 5312, etc. or 5320, 5322, 5324, 5326, 5328, etc. can also contain an application, such as applications 5330, 5332, 5334, 5336, 5338, that might make use of an API, or other object, software, firmware and/or hardware, suitable for communication with or implementation of a trustworthy cloud computing service or application as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 53, as a non-limiting example, computers 5320, 5322, 5324, 5326, 5328, etc. can be thought of as clients and computers 5310, 5312, etc. can be thought of as servers where servers 5310, 5312, etc. provide data services, such as receiving data from client computers 5320, 5322, 5324, 5326, 5328, etc., storing of data, processing of data, transmitting data to client computers 5320, 5322, 5324, 5326, 5328, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 5340 is the Internet, for example, the servers 5310, 5312, etc. can be Web servers with which the clients 5320, 5322, 5324, 5326, 5328, etc. communicate via any of a number of known protocols, such as the hypertext transfer protocol (HTTP). Servers 5310, 5312, etc. may also serve as clients 5320, 5322, 5324, 5326, 5328, etc., as may be characteristic of a distributed computing environment.

EXEMPLARY COMPUTING DEVICE

As mentioned, various embodiments described herein apply to any device wherein it may be desirable to implement one or pieces of a trustworthy cloud services framework. It should be understood, therefore, that handheld, portable and other computing devices and computing objects of all kinds are contemplated for use in connection with the various embodiments described herein, i.e., anywhere that a device may provide some functionality in connection with a trustworthy cloud services framework. Accordingly, the below general purpose remote computer described below in FIG. 54 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 54:
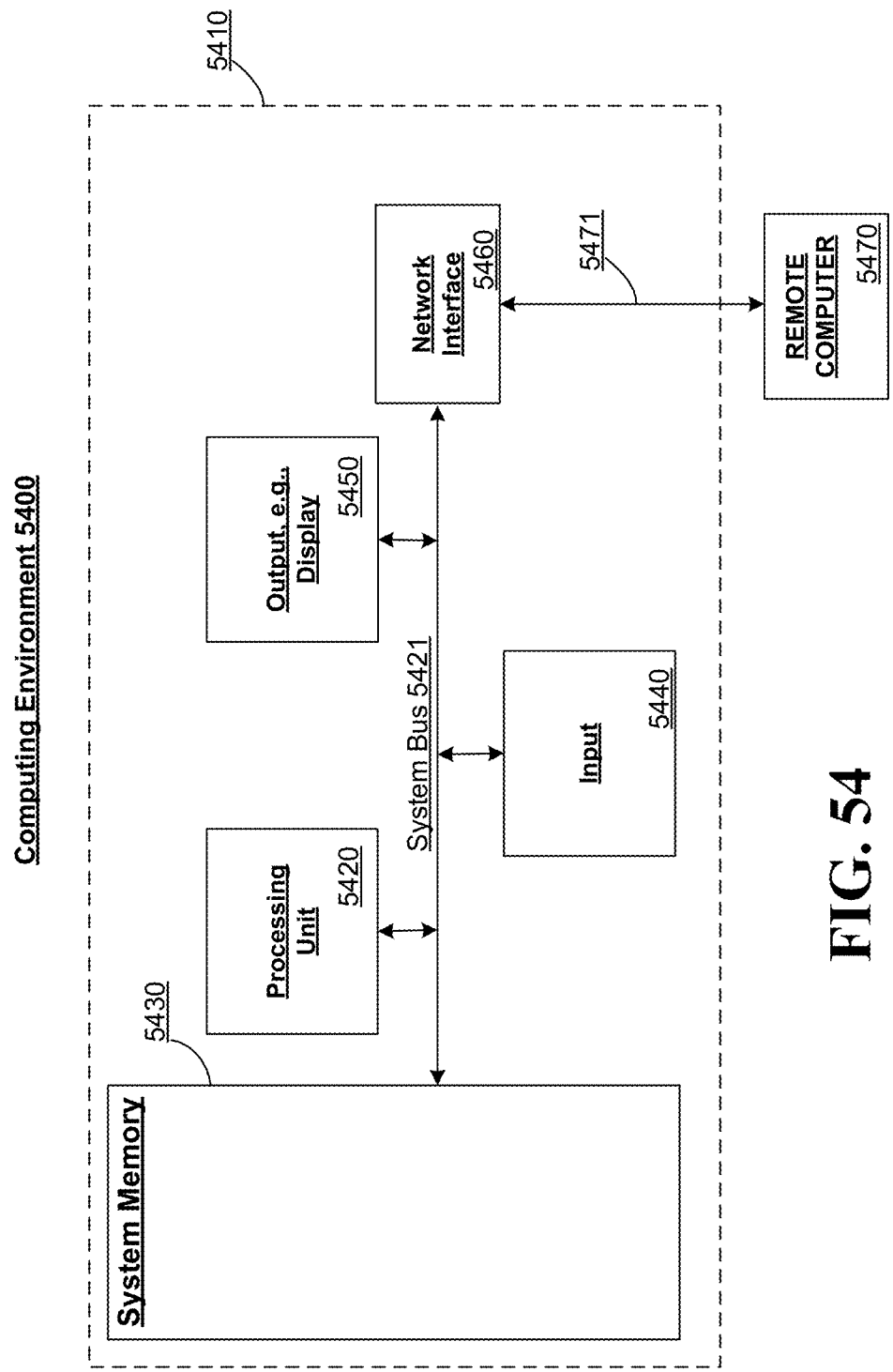
FIG. 54 is a block diagram representing an exemplary non-limiting computing system or operating environment in which one or more aspects of various embodiments described herein can be implemented.

FIG. 54 thus illustrates an example of a suitable computing system environment 5400 in which one or more of the embodiments may be implemented, although as made clear above, the computing system environment 5400 is only one example of a suitable computing environment and is not intended to suggest any limitation as to the scope of use or functionality of any of the embodiments. Neither should the computing environment 5400 be interpreted as having any dependency or requirement relating to any one or combination of components illustrated in the exemplary operating environment 5400.

With reference to FIG. 54, an exemplary remote device for implementing one or more embodiments herein can include a general purpose computing device in the form of a handheld computer 5410. Components of handheld computer 5410 may include, but are not limited to, a processing unit 5420, a system memory 5430, and a system bus 5421 that couples various system components including the system memory to the processing unit 5420.

Computer 5410 typically includes a variety of computer readable media and can be any available media that can be accessed by computer 5410. The system memory 5430 may include computer storage media in the form of volatile and/or nonvolatile memory such as read only memory (ROM) and/or random access memory (RAM). By way of example, and not limitation, memory 5430 may also include an operating system, application programs, other program modules, and program data.

A user may enter commands and information into the computer 5410 through input devices 5440 A monitor or other type of display device is also connected to the system bus 5421 via an interface, such as output interface 5450. In addition to a monitor, computers may also include other peripheral output devices such as speakers and a printer, which may be connected through output interface 5450.

The computer 5410 may operate in a networked or distributed environment using logical connections to one or more other remote computers, such as remote computer 5470. The remote computer 5470 may be a personal computer, a server, a router, a network PC, a peer device or other common network node, or any other remote media consumption or transmission device, and may include any or all of the elements described above relative to the computer 5410. The logical connections depicted in FIG. 54 include a network 5471, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to provide trust in connection with interactions with a cloud service.

There are multiple ways of implementing one or more of the embodiments described herein, e.g., an appropriate API, tool kit, driver code, operating system, control, standalone or downloadable software object, etc. which enables applications and services to use a trustworthy cloud services framework. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A device that fulfills a request by a subscriber for access of an access type over encrypted data, the device comprising:
 at least one hardware processor and at least one memory;
 the at least one hardware processor configured to:
  request, on behalf of a subscriber, a cryptographic key from a key generation component in a first region of control, the cryptographic key specifying at least one access privilege specifically provided for the subscriber over an encrypted data or an encrypted tag;
  send a request for access of the access type the encrypted data or the encrypted tag associated with the encrypted data to a remote data store, the request including the cryptographic key that specifies at least one access privilege of the access type for the subscriber over the encrypted data;
  responsive to sending the request including the cryptographic key, receive the encrypted data or the encrypted tag; and
  decrypt a portion of the received encrypted data or the received encrypted tag based on the at least one access privilege,
  wherein the first region of control, the remote data store and the device are independent entities.

2. The device of claim 1, further comprising a second module that:

validates that the received encrypted data or received encrypted tag is consistent with the request for the encrypted data.

3. The device of claim 1, further comprising a third module that:
verifies that content of the received encrypted data or content of the received encrypted tag was not modified.

4. The device of claim 1, wherein the encrypted data is formatted in one of: extensible markup language (XML); javascript object notation (JSON); electronic data interchange (EDI); or s-expressions.

5. The device of claim 1, wherein the request for the cryptographic key is based on identity information associated with an identity of a subscriber or identity information associated with the device.

6. The device of claim 1, wherein the remote data store is associated with a cloud service or an enterprise data center.

7. The device of claim 1, wherein the at least one access privilege is defined by a publisher of the encrypted data.

8. The device of claim 1, wherein the at least one access privilege is late bound by a publisher of the encrypted data.

9. The device of claim 1, further comprising a fourth module that:
obtains a cryptographic component from a second region of control; and
uses the cryptographic component to decrypt the encrypted data or encrypted tag.

10. A system for fulfilling a request by a subscriber for access of an access type over an encrypted record, the system comprising:
at least one hardware processor; and
at least one memory including at least one module that:
issues a cryptographic challenge to a remote data store for at least one searchable encrypted record, the at least one searchable encrypted record associated with a proof of data possession (PDP);
receives a response to the cryptographic challenge;
verifies that the at least one searchable encrypted record is retrievable with access according to the access type and has not been interfered with in the remote data store by applying a computation on the response to the cryptographic challenge;
responsive to the verifying, formulates a request to transmit to the subscriber to access the at least one searchable encrypted record, the request including key information specifying that the subscriber has at least one access privilege corresponding to access of the access type over the encrypted data; and
transmits the request for the subscriber to access the at least one searchable encrypted record to the remote data store.

11. The system of claim 10, further comprises a second module that:
receives the requested at least one searchable encrypted record; and
decrypts the requested at least one searchable encrypted record in accordance with capabilities based on the at least one access privilege.

12. The system of claim 11, wherein the remote data store computes the response to the cryptographic challenge as a function of the at least one encrypted record, the PDP tag, and the cryptographic challenge.

13. The system of claim 10, wherein a publisher of the encrypted record controls the at least one access privilege in accordance with a policy set at an enterprise level.

14. The system of claim 13, wherein the at least one access privilege is updated at a time when the key information is requested.

15. A computer implemented method, implemented using at least one hardware processor, of fulfilling a request by a subscriber for access of an access type over encrypted data, the method comprising:
request, from a subscriber device, a cryptographic key from a remote source, the cryptographic key associated with encrypted data stored in a remote data store, the cryptographic key specifying at least one access privilege specifically provided for an identity of a subscriber over the encrypted data;
obtain the cryptographic key from the remote source;
transmit a request for the encrypted data from the remote data store, the request including the cryptographic key;
responsive to transmitting the request including the cryptographic key, receive the encrypted data; and
decrypt the received encrypted data using the cryptographic key when the at least one access privilege specified by the cryptographic key permits the access type over the encrypted data requested by the subscriber,
wherein the subscriber device, the remote source, and the remote data store are independent entities.

16. The method of claim 15, further comprising:
prior to the request from a subscriber device for the cryptographic key from a remote source:
verifying the encrypted data through a proof of data possession (PDP) tag associated with the encrypted data.

17. The method of claim 16, further comprising:
creating the proof of data possession (PDP) tag for the encrypted data using a second cryptographic key from the remote source; and
transmitting the PDP tag to the remote data store for storage in the remote data store.

18. The method of claim 17, further comprising:
issuing a challenge to the remote data store, the challenge associated with the encrypted data;
receiving a response to the challenge from the remote data store, the response based on the PDP tag; and
verifying the encrypted data based on the response.

19. The method of claim 18, wherein a publisher of the encrypted data controls the at least one access privilege in accordance with a policy that is implemented by the remote source.

* * * * *